United States Patent
Matsuda et al.

(10) Patent No.: US 9,281,940 B2
(45) Date of Patent: Mar. 8, 2016

(54) INFORMATION PROCESSING APPARATUS, INFORMATION PROCESSING METHOD, AND PROGRAM

(71) Applicant: SONY CORPORATION, Tokyo (JP)

(72) Inventors: Seiichi Matsuda, Tokyo (JP); Shiho Moriai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/374,671

(22) PCT Filed: Feb. 7, 2013

(86) PCT No.: PCT/JP2013/052818
§ 371 (c)(1),
(2) Date: Jul. 25, 2014

(87) PCT Pub. No.: WO2013/129055
PCT Pub. Date: Sep. 6, 2013

(65) Prior Publication Data
US 2015/0039904 A1    Feb. 5, 2015

(30) Foreign Application Priority Data

Mar. 2, 2012   (JP) .................................. 2012-046309

(51) Int. Cl.
| | |
|---|---|
| *H04L 9/00* | (2006.01) |
| *H04L 9/06* | (2006.01) |
| *G06F 21/72* | (2013.01) |

(52) U.S. Cl.
CPC .............. *H04L 9/0618* (2013.01); *G06F 21/72* (2013.01); *H04L 2209/125* (2013.01)

(58) Field of Classification Search
None
See application file for complete search history.

(56) References Cited

U.S. PATENT DOCUMENTS

| | | | |
|---|---|---|---|
| 8,238,557 B2 * | 8/2012 | Reidenbach | 380/277 |
| 8,369,522 B2 * | 2/2013 | Shirai et al. | 380/44 |
| 8,769,279 B2 * | 7/2014 | von Mueller et al. | 713/168 |
| 2009/0310778 A1 * | 12/2009 | Mueller et al. | 380/44 |
| 2010/0115286 A1 * | 5/2010 | Hawkes et al. | 713/189 |
| 2013/0168450 A1 * | 7/2013 | von Mueller et al. | 235/449 |

OTHER PUBLICATIONS

Kilian et al, "How to Protect DES Against Exhaustive Key Search (An Analysis or DESX)", Feb. 2, 2000, p. 1-10.*

(Continued)

*Primary Examiner* — Christopher Revak
(74) *Attorney, Agent, or Firm* — Sony Corporation

(57) ABSTRACT

Speed-up of a cryptographic process by software (program) is realized. A data processing unit which executes a data process according to a program defining a cryptographic process sequence is included, and the data processing unit, according to the program, generates a bit slice expression data based on a plurality of plain text data items which are encryption process targets and a bit slice expression key based on a cryptographic key of each plain text data item, generates a whitening key and a round key based on the bit slice expression key, executes the cryptographic process including operation and movement processes of a block unit of the bit slice expression data, and an operation using the round key, as a process according to a cryptographic algorithm Piccolo, and generates the plurality of encrypted data items corresponding to the plurality of plain text data items by the reverse conversion of the data with respect to the cryptographic process results.

16 Claims, 33 Drawing Sheets

(56) References Cited

OTHER PUBLICATIONS

Song et al, "The Security Weakness of Block Cipher Piccolo against Fault Analysis", Mar. 13, 2014, International Journal of Distributed Sensor Networks, p. 1-10.*

Jeong, "Differential Fault Analysis on Block Cipher Piccolo", no date provided, Center for Information Security Technologies, p. 1-18.*

U.S. Appl. No. 14/373,562, filed Jul. 21, 2014, Matsuda, et al.

U.S. Appl. No. 14/374,942, filed Jul. 28, 2014, Matsuda, et al.

International Search Report issued May 7, 2013 in PCT/JP2013/052818.

Chester Rebeiro, et al., "Bitslice Implementation of AES", Lecture Notes in Computer Science, CANS 2006, LNCS vol. 4301, 2 Bitslice Implementation, (2006), pp. 203-212.

Robert Könighofer, "A Fast and Cache-Timing Resistant Implementation of the AES", Lecture Notes in Computer Science, CT-RSA 2008, LNCS vol. 4964, 2 The General Approach, 3 The Transform Function, (2008), pp. 187-202.

Emilia Kasper, et al., "Faster and Timing-Attack Resistant AES-GCM", Lecture Notes in Computer Science, CHES 2009, LNCS vol. 5747, International Association for Cryptologic Research 2009, 4 Bitsliced Implementation of AES in Counter Mode, (2009), pp. 1-17.

Kyoji Shibutani, et al., "Piccolo: An Ultra-Lightweight Block Cipher", CHES 2011, LNCS vol. 6917, (2011), pp. 342-357.

Thomas Ristenpart, et al., "Hey, You, Get Off of My Cloud: Exploring Information Leakage in Third-Party Compute Clouds", ACM CCS'09, (Nov. 9-13, 2009), 14 pages.

Eli Biham, "A Fast New DES Implementation in Software", Proceedings of Fast Software Encryption Workshop 1997, pp. 260-272.

* cited by examiner

FIG. 16

STEPS S505 AND S507 <Sbox> r8, r9, r10, r11, r12 r8, r9, r10, r11

FIG. 17

<Sbox LOGICAL COMMAND COLUMN>

INPUT REGISTERS: r3, r2, r1, r0, r4
OUTPUT REGISTERS: r0, r1, r2, r3

STEP 1  r0 ← r0 ⊕ r2    r4 ← r1
STEP 2  r1 ← r1 | r2    r3 ← ~r3
STEP 3  r1 ← r1 ⊕ r3    r3 ← r2 | r3
STEP 4  r0 ← r0 ⊕ r3    r3 ← r1
STEP 5  r3 ← r0 | r3
STEP 6  r3 ← r3 ⊕ r4    r4 ← r0 | r4
STEP 7  r2 ← r2 ⊕ r4    r3 ← ~r3

STEP S508 <XOR WITH DATA IN PREVIOUS ROUND>

STEP S510 <Round Permutation>

FIG. 22

STEP S510 <SETTING OF NEXT ROUND INPUT>

FIG. 23

STEP S512 <OUTPUT>
128-BIT REGISTERS

| | | | | | | | | | | | | |
|---|---|---|---|---|---|---|---|---|---|---|---|---|
| r0 | [0,0] | [0,1] | [0,2] | [0,3] | [0,4] | [0,5] | [0,6] | [0,7] | [0,8] | [0,9] | [0,10] | [0,11] |
| r1 | [1,0] | [1,1] | [1,2] | [1,3] | [1,4] | [1,5] | [1,6] | [1,7] | [1,8] | [1,9] | [1,10] | [1,11] |
| r2 | [2,0] | [2,1] | [2,2] | [2,3] | [2,4] | [2,5] | [2,6] | [2,7] | [2,8] | [2,9] | [2,10] | [2,11] |
| r3 | [3,0] | [3,1] | [3,2] | [3,3] | [3,4] | [3,5] | [3,6] | [3,7] | [3,8] | [3,9] | [3,10] | [3,11] |
| r4 | [0,4] | [0,5] | [0,6] | [0,7] | [0,12] | [0,13] | [0,14] | [0,15] | | | | |
| r5 | [1,4] | [1,5] | [1,6] | [1,7] | [1,12] | [1,13] | [1,14] | [1,15] | | | | |
| r6 | [2,4] | [2,5] | [2,6] | [2,7] | [2,12] | [2,13] | [2,14] | [2,15] | | | | |
| r7 | [3,4] | [3,5] | [3,6] | [3,7] | [3,12] | [3,13] | [3,14] | [3,15] | | | | |
| r8 | | | | | | | | | | | | |
| r9 | | | | | | | | | | | | |
| r10 | | | | | | | | | | | | |
| r11 | | | | | | | | | | | | |
| r12 | | | | | | | | | | | | |
| r13 | | | | | | | | | | | | |
| r14 | | | | | | | | | | | | |
| r15 | | | | | | | | | | | | |

FIG. 30

<KEY SCHEDULING PROCESS> INPUT 128-BIT REGISTERS

| | | | | | | | |
|---|---|---|---|---|---|---|---|
| r0 | [0, 0] | [0, 1] | [0, 2] | [0, 3] | [0, 4] | [0, 5] | [0, 6] | [0, 7] |
| r1 | [1, 0] | [1, 1] | [1, 2] | [1, 3] | [1, 4] | [1, 5] | [1, 6] | [1, 7] |
| r2 | [2, 0] | [2, 1] | [2, 2] | [2, 3] | [2, 4] | [2, 5] | [2, 6] | [2, 7] |
| r3 | [3, 0] | [3, 1] | [3, 2] | [3, 3] | [3, 4] | [3, 5] | [3, 6] | [3, 7] |
| r4 | [0, 8] | [0, 9] | [0, 10] | [0, 11] | [0, 12] | [0, 13] | [0, 14] | [0, 15] |
| r5 | [1, 8] | [1, 9] | [1, 10] | [1, 11] | [1, 12] | [1, 13] | [1, 14] | [1, 15] |
| r6 | [2, 8] | [2, 9] | [2, 10] | [2, 11] | [2, 12] | [2, 13] | [2, 14] | [2, 15] |
| r7 | [3, 8] | [3, 9] | [3, 10] | [3, 11] | [3, 12] | [3, 13] | [3, 14] | [3, 15] |
| r8 | [0, 16] | [0, 17] | [0, 18] | [0, 19] | [0, 16] | [0, 17] | [0, 18] | [0, 19] |
| r9 | [1, 16] | [1, 17] | [1, 18] | [1, 19] | [1, 16] | [1, 17] | [1, 18] | [1, 19] |
| r10 | [2, 16] | [2, 17] | [2, 18] | [2, 19] | [2, 16] | [2, 17] | [2, 18] | [2, 19] |
| r11 | [3, 16] | [3, 17] | [3, 18] | [3, 19] | [3, 16] | [3, 17] | [3, 18] | [3, 19] |
| r12 | | | | | | | | |
| r13 | | | | | | | | |
| r14 | | | | | | | | |
| r15 | | | | | | | | |

INFORMATION PROCESSING APPARATUS, INFORMATION PROCESSING METHOD, AND PROGRAM

TECHNICAL FIELD

The present disclosure relates to an information processing apparatus, an information processing method, and a program. More specifically, the present disclosure relates to an information processing apparatus, an information processing method, and a program for realizing speed-up of a cryptographic process of mass data.

BACKGROUND ART

With the development of the information society, importance of an information security technology for protecting information in security has been increased. Cryptography is one constituent element of the information security technology, and the cryptography is currently used in various products and systems.

For example, communication is actively performed through a network such as the Internet, and various devices such as a PC, a mobile phone, an RFID, and various sensors are connected to the network for communication. In such an environment, it is essential to use the information security technology for realizing a network society that increases convenience while protecting individual privacy, and the cryptography capable of increasing security and performing a process at a high speed is required.

A system of which a server collects, for example, information transmitted from a terminal owned by an individual or information acquired through a sensor installed in a house, and which performs various data processes or analysis with respect to the information collected by the sensor, has been used.

Specifically, there are, for example, a system which manages power consumption by disposing a sensor in a house or an office, a service used for health and safety management by disposing a sensor in a house of an aged person living alone, a transportation system used for traffic congestion detection and alleviation by a sensor disposed at a road or in a car, and the like.

In many cases, the data collected in such a system includes information regarding individual privacy, and it is desirable to encrypt the data in order to protect the privacy. However, hardware in which a cryptographic algorithm of the related art is installed, is not a lightweight cryptographic algorithm designed for small hardware installation, has a large module scale and is difficult to be mounted on a small-sized device such as RFID or a sensor, for example. In addition, it is difficult to realize the device at low cost, power consumption is great, and a frequency of battery exchange increases, and therefore there are many problems from the viewpoint of operability.

Meanwhile, there is an increasing requirement for lightweight cryptography suitable for hardware installation to a device with limited hardware scale or resources of a memory, or a device in which energy saving is required.

Research and development of the lightweight cryptography is in progress in response to such needs, and recently, several new lightweight block cryptographies which are excellent from a viewpoint of small hardware installation are proposed. There are PRESENT, CLEFIA, KATAN, Piccolo, and the like, as representative examples.

With this, international standardization of the lightweight cryptography has progressed, and standardization of an international standard of lightweight cryptography ISO/IEC 29192 has progressed in a committee ISO/IEC JTC 1/SC 27 for performing international standardization of the information security technology, in a joint technical committee of the International Organization for Standardization (ISO) and the International Electrotechnical Commission (IEC).

Many examples of the lightweight block cryptogram, which is one of the lightweight cryptography, are optimal for small hardware installation.

That is, in order to realize a small size at the time of hardware installation, many examples of the lightweight block cryptogram are designed with a structure in which a plurality of small S-boxes with four bits and "light" round functions frequently used with a bit operation are repeated.

This structure of the lightweight cryptogram cannot take advantage of a general-purpose processer which continues to be developed, and a problem of a low speed generally occurs in software installation in the PC or the server.

As one example of a process of software installation in the PC or the server, cloud computing using a device connected to the network may be used, but a cross-virtual machine (VM) side-channel attack may also present a threat to the cloud [Non Patent Document 1]. The cloud may have a multi-tenant system in which a plurality of users share one server, and virtual machines VM of the users are separated from each other, but a physical device such as a memory or a cache is shared. The cross-VM side-channel attack is an attack where a cache is continuously attacked by a "malicious VM" which shares a set associative cache and a key is extracted by detecting an access by another VM by a delayed reaction of the cache. As described above, when performing the cryptographic process on the cloud in a state of the software installation, resistance with respect to such a side-channel attack is also the object of the disclosure.

CITATION LIST

Non Patent Literature

NPL 1: Thomas Ristenpart, Eran Tromer, Hovav Shacham, Stefan Savage, "Hey, You, Get Off of My Cloud: Exploring Information Leakage in Third-Party Compute Clouds", ACM CCS '09, Nov. 9-13, 2009

NPL 2: Eli Biham, "A Fast New DES Implementation in Software", FSE '97, 1997

SUMMARY OF INVENTION

Technical Problem

The present disclosure is made in view of such circumstances, and an object thereof is to provide an information processing apparatus, an information processing method, and a program for realizing speed-up of a cryptographic process of mass data.

In addition, in one example of the present disclosure, in a case where the cryptographic process is executed using software (program) which can be operated on a general-purpose processor, an object thereof is to provide an information processing apparatus, an information processing method, and a program for performing a process at a high speed.

Solution to Problem

According to a first aspect of the present disclosure, there is provided an information processing apparatus including: a data processing unit which executes a data process according to a program defining a cryptographic process sequence, in which the data processing unit, according to the program, executes a data conversion process of generating bit slice expression data by performing a bit slice process with respect to a plurality of plain text data items which are encryption process targets, a key conversion process of generating a bit slice expression key by performing a bit slice process with respect to each cryptographic key of the plurality of plain text data items, a key scheduling process of inputting the bit slice expression key to generate a whitening key and a round key for each round to be used in the cryptographic process, a cryptographic process in which the whitening key and the round key are applied with respect to the bit slice expression data, and a reverse data conversion process of generating encrypted data corresponding to the plurality of plain text data items, by performing reverse conversion of the bit slice process with respect to the result of the cryptographic process, and executes a cryptographic process according to a cryptographic algorithm Piccolo by using an operation process and a movement process of a bit slice expression data block unit configured with the same orders of bits or bits at every n bits of each plain text data configuring the bit slice expression data in the cryptographic process, and herein n is a power of 2.

In addition, in one embodiment of the information processing apparatus of the present disclosure, the data processing unit executes a process of storing a bit slice expression data block configured with the plain text data in registers as a processing unit, in the data conversion process, executes a process of storing a bit slice expression key block configured with the same orders of bits or bits at every n bits of each cryptographic key configuring the bit slice expression key, in the register as a processing unit, in the key conversion process, and herein n is a power of 2, and executes the cryptographic process using an operation process and a movement process of the block unit using the bit slice expression data block and the bit slice expression key block stored in the registers as a unit, in the cryptographic process.

In addition, in one embodiment of the information processing apparatus of the present disclosure, the data processing unit changes an aspect of a linear conversion process of F functions of each round depending on the round number in the cryptographic process.

In addition, in one embodiment of the information processing apparatus of the present disclosure, the data processing unit executes a cryptographic process of setting a round keys to be input in each round to be different from setting defined in the cryptographic algorithm Piccolo, in the cryptographic process.

In addition, in one embodiment of the information processing apparatus of the present disclosure, the data processing unit executes a process of dispersing and storing a bit slice expression data block configured with the plain text data in a plurality of registers as a processing unit, in the data conversion process, and performs the cryptographic process by executing an operation process between the plurality of registers with respect to the bit slice expression data block stored in the plurality of registers and a shifting and shuffling process of each register storage block, in the cryptographic process.

In addition, in one embodiment of the information processing apparatus of the present disclosure, the data processing unit further executes an unpacking process of storing a block selected from the storage blocks of the plurality of registers in one register again, in the cryptographic process.

In addition, in one embodiment of the information processing apparatus of the present disclosure, the data processing unit executes an exclusive-OR operation (XOR) with the whitening key or the round key in the register unit configuring the plurality of registers for storing the bit slice expression data blocks, in the cryptographic process.

In addition, in one embodiment of the information processing apparatus of the present disclosure, the data processing unit executes a nonlinear conversion process (Sbox) defined in the cryptographic process sequence, by executing an operation according to a predetermined logical command example with respect to the bit slice expression blocks stored in the plurality of registers, in the cryptographic process.

In addition, according to a second aspect of the present disclosure, there is provided an information processing apparatus including: a data processing unit which executes a data process according to a program defining a decryption process sequence, in which the data processing unit, according to the program, executes a data conversion process of generating bit slice expression data by performing a bit slice process with respect to the plurality of encrypted data items which are decryption process targets, a key conversion process of generating a bit slice expression key by performing a bit slice process with respect to each cryptographic key of the plurality of encrypted data items, a key scheduling process of inputting the bit slice expression key to generate a whitening key and a round key for each round to be used in the decryption process, a decryption process in which the whitening key and the round key are applied with respect to the bit slice expression data, and a reverse data conversion process of generating a plurality of plain text data items corresponding to the plurality of encrypted data items, by performing reverse conversion of the bit slice process with respect to the result of the decryption process, and executes a decryption process according to a cryptographic algorithm Piccolo by using an operation process and a movement process of a bit slice expression data block unit configured with the same orders of bits or bits at every n bits of each encrypted data item configuring the bit slice expression data in the decryption process, and herein n is a power of 2.

In addition, in one embodiment of the information processing apparatus of the present disclosure, the data processing unit executes a process of storing a bit slice expression data block configured with the encrypted data in a register as a processing unit, in the data conversion process, executes a process of storing a bit slice expression key block configured with the same orders of bits or bits at every n bits of each cryptographic key configuring the bit slice expression key, in the register as a processing unit, in the key conversion process, and herein n is a power of 2, and executes a decryption process using an operation process and a movement process of the block unit using the bit slice expression data block and the bit slice expression key block stored in the register as a unit, in the decryption process.

In addition, in one embodiment of the information processing apparatus of the present disclosure, the data processing unit changes an aspect of a linear conversion process of F functions of each round depending on the round number in the decryption process.

In addition, in one embodiment of the information processing apparatus of the present disclosure, the data processing unit executes a cryptographic process of setting a round keys to be input in each round to be different from setting defined in the cryptographic algorithm Piccolo, in the decryption process.

In addition, according to a third aspect of the present disclosure, there is provided an information processing method which is a cryptographic process executed in an information processing apparatus, the method causing a data processing unit of the information processing apparatus, according to a program defining a cryptographic process sequence, to execute: a data conversion process of generating bit slice expression data by performing a bit slice process with respect to a plurality of plain text data items which is an encryption process target, a key conversion process of generating a bit slice expression key by performing a bit slice process with respect to each cryptographic key of the plurality of plain text data items, a key scheduling process of inputting the bit slice expression key to generate a whitening key and a round key for each round to be used in the cryptographic process, a cryptographic process in which the whitening key and the round key are applied with respect to the bit slice expression data, and a reverse data conversion process of generating a plurality of encrypted data items corresponding to the plurality of plain text data items, by performing reverse conversion of the bit slice process with respect to the result of the cryptographic process, in which the data processing unit executes a cryptographic process according to a cryptographic algorithm Piccolo by using an operation process and a movement process of a bit slice expression data block unit configured with the same orders of bits or bits at every n bits of each plain text data configuring the bit slice expression data in the cryptographic process, and herein n is a power of 2.

In addition, according to a fourth aspect of the present disclosure, there is provided an information processing method which is a decryption process executed in an information processing apparatus, the method causing a data processing unit of the information processing apparatus, according to a program defining a decryption process sequence, to execute: a data conversion process of generating bit slice expression data by performing a bit slice process with respect to the plurality of encrypted data items which are decryption process targets, a key conversion process of generating a bit slice expression key by performing a bit slice process with respect to each cryptographic key of the plurality of encrypted data items, a key scheduling process of inputting the bit slice expression key to generate a whitening key and a round key for each round to be used in the decryption process, a decryption process in which the whitening key and the round key are applied with respect to the bit slice expression data, and a reverse data conversion process of generating a plurality of plain text data items corresponding to the plurality of encrypted data items, by performing reverse conversion of the bit slice process with respect to the result of the decryption process, in which the data processing unit executes a decryption process according to a cryptographic algorithm Piccolo by using an operation process and a movement process of a bit slice expression data block unit configured with the same orders of bits or bits at every n bits of each encrypted data item configuring the bit slice expression data in the decryption process, and herein n is a power of 2.

In addition, according to a fifth aspect of the present disclosure, there is provided a program which causes an information processing apparatus to execute a cryptographic process including: causing a data processing unit of the information processing apparatus to execute a data conversion process of generating bit slice expression data by performing a bit slice process with respect to a plurality of plain text items data which is an encryption process target, a key conversion process of generating a bit slice expression key by performing a bit slice process with respect to each cryptographic key of the plurality of plain text data items, a key scheduling process of inputting the bit slice expression key to generate a whitening key and a round key for each round to be used in the cryptographic process, a cryptographic process in which the whitening key and the round key are applied with respect to the bit slice expression data, and a reverse data conversion process of generating a plurality of encrypted data items corresponding to the plurality of plain text data items, by performing reverse conversion of the bit slice process with respect to the result of the cryptographic process, in which the data processing unit executes a cryptographic process according to a cryptographic algorithm Piccolo by using an operation process and a movement process of a bit slice expression data block unit configured with the same orders of bits or bits at every n bits of each plain text data configuring the bit slice expression data in the cryptographic process, and herein n is a power of 2.

In addition, according to a sixth aspect of the present disclosure, there is provided a program which causes an information processing apparatus to execute a decryption process including: causing a data processing unit of the information processing apparatus to execute a data conversion process of generating bit slice expression data by performing a bit slice process with respect to the plurality of encrypted data items which are decryption process targets, a key conversion process of generating a bit slice expression key by performing a bit slice process with respect to each cryptographic key of the plurality of encrypted data items, a key scheduling process of inputting the bit slice expression key to generate a whitening key and a round key for each round to be used in the decryption process, a decryption process in which the whitening key and the round key are applied with respect to the bit slice expression data, and a reverse data conversion process of generating a plurality of plain text data items corresponding to the plurality of encrypted data items, by performing reverse conversion of the bit slice process with respect to the result of the decryption process, in which the data processing unit executes a decryption process according to a cryptographic algorithm Piccolo by using an operation process and a movement process of a bit slice expression data block unit configured with the same orders of bits or bits at every n bits of each encrypted data item configuring the bit slice expression data in the decryption process, and herein n is a power of 2.

Further, the program of the present disclosure is, for example, a program which is provided, for example, by a recording medium with respect to an information processing apparatus or a computer system which can execute various program codes. Such a program is executed by a program execution unit of the information processing apparatus or the computer system and therefore a process according to the program is performed.

Other objects, features, or advantages of the present disclosure will be made clear with detailed description with reference to the following examples or accompanied drawings. In addition, the system in this specification is a logical set configuration of a plurality of apparatuses, and is not limited to a system with the apparatuses having respective configurations in the same housing.

Advantageous Effects of Invention

According to one example of the present disclosure, the rapid cryptographic process by the software (program) is realized.

In detail, the data processing unit which executes the data processing according to the program defining the cryptographic process sequence is included, the data processing unit, according to the program, generates the bit slice expression data based on the plurality of plain text data items which are encryption process targets and the bit slice expression key based on the cryptographic key of each plain text data item, generates the whitening key and the round key based on the bit slice expression key, executes the cryptographic process including operation and movement processes of the block unit of the bit slice expression data, and the operation using the round key, as the process according to the cryptographic algorithm Piccolo, and generates the plurality of encrypted data items corresponding to the plurality of plain text data items by the reverse conversion of the data with respect to the cryptographic process results.

When performing the cryptographic process, the process is performed by the operation or the movement process of the bit slice expression block unit stored in the register, and it is possible to collectively execute the generation of the plurality of the encrypted data items or the decryption process with respect to the plurality of the encrypted data items, and to perform the process of the mass data at a high speed.

In addition, in the decryption process according to one example of the present disclosure, the process is performed by the operation or movement process of the bit slice expression block unit stored in a register, and it is possible to perform the processing of the mass data at a high speed. In detail, in a case where a cryptographic algorithm [PRESENT (key length of 80 bits)] is executed in an Intel Core i7 870 processor, a high speed of 11.06 cycles/byte is achieved, and in a case where a cryptographic algorithm [Piccolo (key length of 80 bits)] is executed, a high speed of 5.59 cycles/byte is achieved. Particularly, the speed of Piccolo exceeds 6.92 cycles/byte, which is a speed record of Advanced Encryption Standard (AES) in the same platform (Intel Core i7 920) which is known in the related art.

In addition, since S-box is calculated by a logic operation without referring to a table in bit slice installation according to one example of the present disclosure, it is possible to increase durability with respect to the side channel attack such as a cache attack or a cross-virtual machine attack. Further, regarding the speed-up of the cryptographic process in the software in the cloud computing process, the cryptographic process can be completed with the smaller number of cycles, and this results in a decrease of power consumption of the cloud or a data center.

In addition, in the system according to one example of the present disclosure, it is not necessary to introduce dedicated hardware for the cryptographic process to the cloud or the data center, and therefore scalability is improved.

Further, it is possible to use the lightweight cryptogram in the cloud which was difficult to be used in the related art, and thus installation of the lightweight cryptogram in the sensor is promoted and it is possible to realize a sensor network at low cost and low power consumption.

BRIEF DESCRIPTION OF DRAWINGS

FIG. 16 is a diagram illustrating register storage data at the time of executing a cryptographic process and a data process example.

FIG. 17 is a diagram illustrating a data process example at the time of executing a cryptographic process.

FIG. 18 is a diagram illustrating register storage data at the time of executing a cryptographic process and a data process example.

FIG. 19 is a diagram illustrating register storage data at the time of executing a cryptographic process and a data process example.

FIG. 22 is a diagram illustrating register storage data at the time of executing a cryptographic process and a data process example.

FIG. 23 is a diagram illustrating register storage data at the time of executing a cryptographic process and a data process example.

FIG. 30 is a diagram illustrating a process of a key scheduling process.

DESCRIPTION OF EMBODIMENTS

Figure 1:
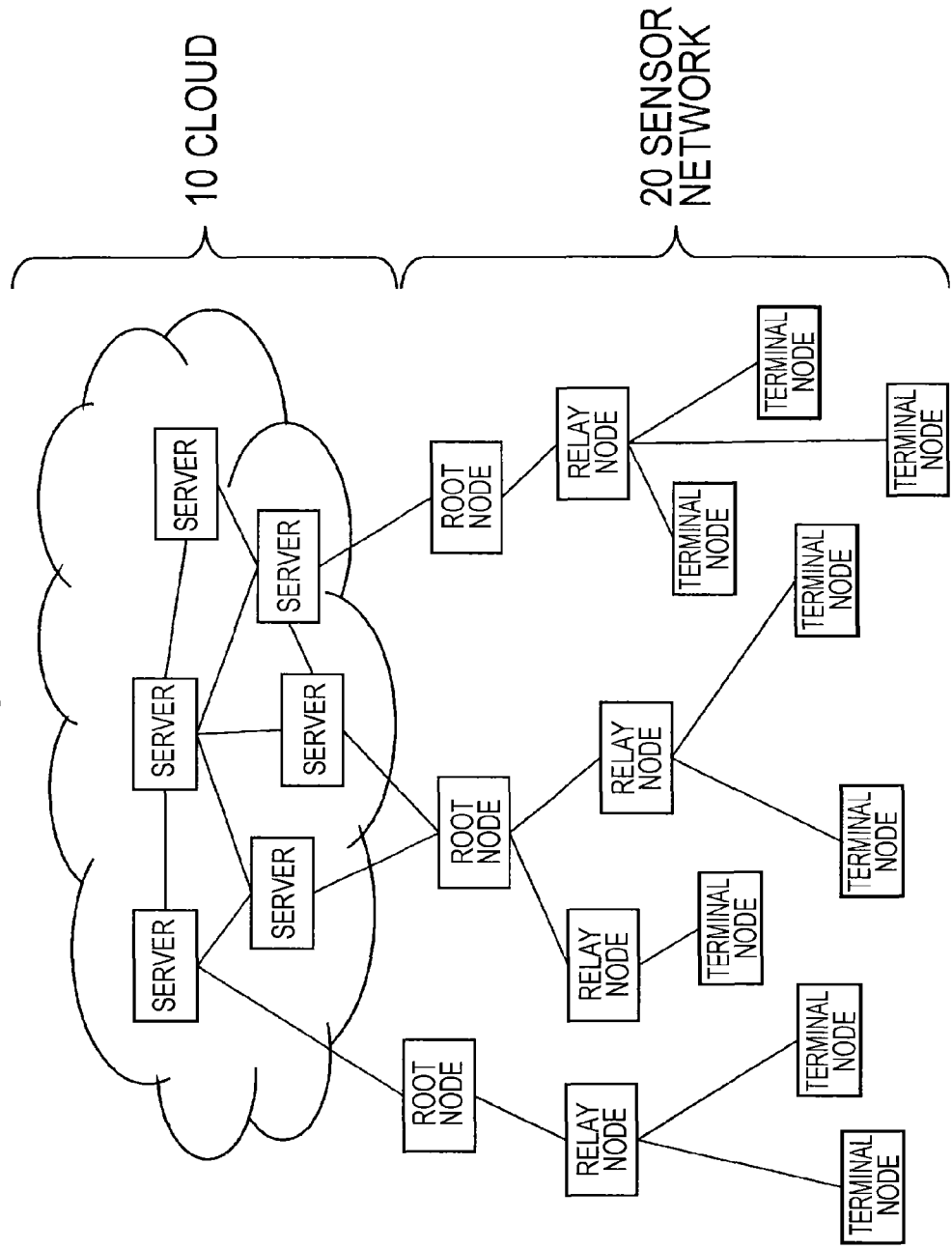
FIG. 1 is a diagram illustrating one example of a system to which a process of the present disclosure is applicable.

Hereinafter, an information processing apparatus, an information processing method, and a program according to the present disclosure will be described in detail with reference to the drawings. The description will be performed according to the following order.

1. One Example of System to which Configuration of Present Disclosure is Applicable
2. Lightweight Block Cryptographic Algorithm "Piccolo"
3. Configuration of Information Processing Apparatus (Cryptographic processing Apparatus) and Outline of Process Sequence
4. Key Conversion Process and Data Conversion Process
5. Cryptographic Process (With Round Permutation)
6. Cryptographic Process (Without Round Permutation)
7. Key Scheduling Process
8. Adjustment of F Function and Adjustment Process of Round Key of Configuration of Present Disclosure
9. Configuration Example of Information Processing Apparatus and Cryptographic processing Apparatus
10. Summary of Configurations of Present Disclosure

[1. One Example of System to which Configuration of Present Disclosure is Applicable]

For example, a configuration of collecting information from communication terminals such as mobile phones or smart phones owned by individuals, RFIDs installed in various products, or sensors disposed in houses, to perform a process in a server is assumed.

Small-sized hardware for executing a cryptographic process algorithm can be installed in a plurality of apparatuses on an information transmission side, to rapidly generate and transmit encrypted data.

However, it is necessary for a server to receive mass encrypted data transmitted by a plurality of terminals or sensors and perform a decryption process. In addition, a case in which a server has to generate a plurality of encrypted data items to be transmitted to the plurality of terminals, is also assumed.

It is expected that necessity of collection, analysis, and usage of big data having massive quantities and covering a wide range, gradually increases in the future.

It is considered that usage of cloud computing is effective in a process of such massive data. For example, by using cloud computing in analysis of mass encrypted data collected from the plurality of terminals or sensors, software operable in a general-purpose processor of a server on a network is used to perform a cryptographic process (including both encryption and decryption processes).

The most important point is to install the hardware in the RFID or the sensor at low cost and low power consumption and the best option is to perform the encryption process with a lightweight cryptogram, but as described above, the process of the lightweight cryptogram is slowly performed in general software installation to be operated in a general-purpose processor of a server on the cloud.

Cloud computing is advantageous when performing a process using a plurality of information processing apparatuses connected to the network, but it is disadvantageous from a viewpoint of cost, when aiming to speed-up the process by installing hardware for executing a specific cryptographic process algorithm on all apparatuses connected to the network.

In a case of collecting mass encrypted data to upload the data to a server having a cloud configuration, and performing analysis thereof with the cloud, it is desirable to perform a scale-out method of using software (program) executable on a plurality of inexpensive servers to perform a process.

As described above, for example, in a case of performing the cryptographic process using a technology of cloud computing or the like, it is necessary to perform the cryptographic process (encryption process and decryption process) using the software (program). However, as described above, there is a problem of a decrease in a process speed of the cryptographic process according to the software in the lightweight cryptography, and a method of realizing an increase in the process speed is required.

There are various cryptographic algorithms, and there is an algorithm called a block cryptogram as one example of a basic technology. In the general software installation of the block cryptogram, Sbox for performing a nonlinear conversion process is mounted with table reference, and accordingly there is a threat of a cache attack. The cache attack is one of side-channel attacks, and is a timing attack for extracting a cryptographic key using a difference in memory access time due to presence or absence of a cache hit.

The configurations of the present disclosure are to solve such problems, for example. An example of a system to which the configurations of the present disclosure are applicable will be described with reference to FIG. 1 and the subsequent drawings.

As the system to which the configurations of the present disclosure are applicable, there is a network system shown in FIG. 1, for example.

FIG. 1 shows a sensor network 20 in which a plurality of terminal nodes are connected to each other, and a cloud 10 which is configured with a network connection server group for collecting transmission data of the terminal nodes to perform a data process.

The terminal nodes include, for example, a portable terminal such as a PC, a mobile phone, a smart phone, or a tablet terminal owned by a user, a power consumption detection sensor disposed in a house or an office, a sensor or a health care device which is disposed in a house of an aged person living alone to collect safety and health management information, a terminal or a sensor provided on a road or in a car to be used for traffic congestion detection and alleviation, or various other devices.

In addition, hereinafter, various devices configuring the terminal nodes will be collectively described as a sensor. The sensor includes various devices described above.

The sensor configuring the terminal node transmits various information items to the cloud 10 configured with the network connection server group for performing the data process.

In addition, in many cases, the transmission data is provided to the network connection server configuring the cloud 10 through relay nodes or the like, for example.

The data collected by such a system includes, for example, individual's private or confidential information in many cases, and the data is encrypted and transmitted in order to prevent data leakage.

The sensor executes encryption of the transmission data and transmits the encrypted data. Dedicated hardware for executing a lightweight cryptographic algorithm, for example, is installed in the sensor, and the sensor performs the encryption using this. As a cryptographic key for this encryption, an individual cryptographic key retained by each sensor in a memory, or a key which can be extracted from a sensor ID with a predetermined operation, for example, is used.

Figure 2:
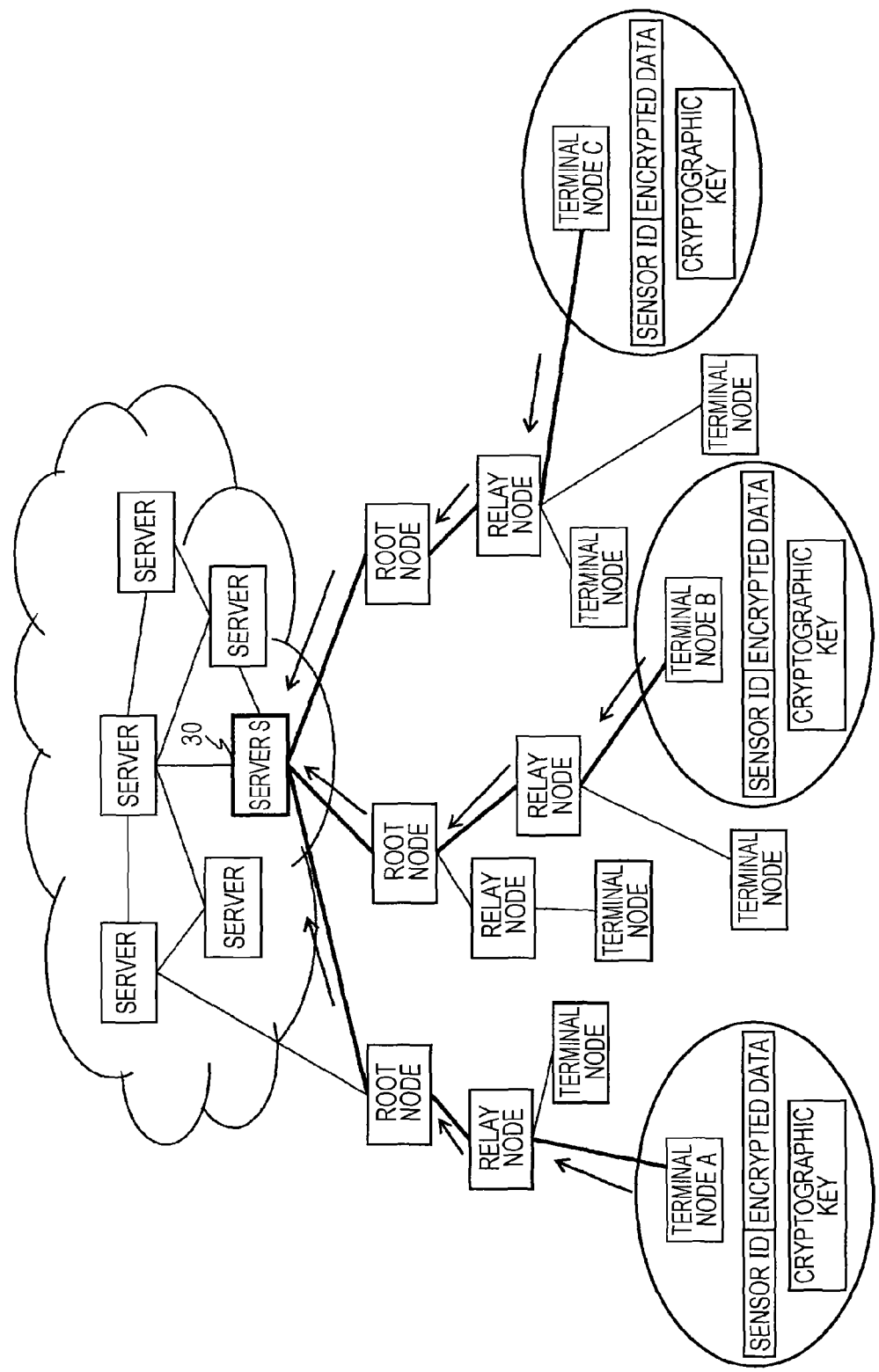
FIG. 2 is a diagram illustrating an operation example of a system to which a process of the present disclosure is applicable.

The number of sensors is huge, and as shown in FIG. 2, each sensor applies a sensor ID to the encrypted data and transmits the encrypted data to the cloud.

In an example shown in FIG. 2, terminal nodes A, B, and C are shown as representative examples of data transmission nodes. Each node executes the encryption of the transmission data using the cryptographic key which is a unique node key to generate a block (for example, 64 bits) configured with the encrypted data, applies a sensor ID which is an identifier of each sensor (terminal node) to the generated encrypted data, and transmits the encrypted data.

Mass encrypted data is transmitted also from the plurality of sensors other than the sensors A to C shown as the representative examples, to the server on the cloud, for example, a server S 30 shown in FIG. 2.

In addition, in examples which will be described later, a data length of the encrypted data generated by each sensor is described as one block of a block length of a lightweight block cryptographic algorithm used for the encryption process. One block is, for example, data having unique bits such as 64 bits. Each sensor generates an encrypted block having 64 bits by performing the encryption process using the unique sensor key (for example, 80 bits) and transmits the encrypted block.

The data of the encrypted data generated by each sensor is not limited to one block, and may be the plurality of blocks. Each sensor transmits data with clear relationship between each encrypted data item and the sensor ID. In addition, in a case where data order information of each block is necessary, for example, serial numbers or time stamps showing the data order are included in the data, and those are applied to the data as block attribute information and transmitted.

Further, in a case where the sensor network is, for example, managed as a tree structure, the transmission data from the sensor which is the terminal node is transmitted to the relay node from the sensor, and then to a root node which is set as a host node of the relay node, and is transmitted to the server on the cloud from the root node.

(Outline of Process in Server on Cloud)

Next, an outline of a process executed by the server on the cloud which collects the transmission data of the sensor (terminal node) to perform the process, in the network system described with reference to FIG. 1 and FIG. 2, will be described.

The server on the cloud collects the plurality of encrypted data blocks transmitted from the plurality of sensors (terminal nodes) and executes the cryptographic process using software (program) which can be operated on a general-purpose processor. For example, the server executes a process of decrypting the plurality of encrypted data. Alternatively, the sensor performs a generation process or the like of the plurality of encrypted data to be transmitted to each terminal node.

The server executes a bit slice cryptographic process, as the cryptographic process (including encryption and decryption processes) using the software (program).

In addition, in the following description, the "cryptographic process" includes both the encryption process and the decryption process of the data.

The bit slice cryptographic process (including encryption and decryption processes) is a process proposed by Biham in 1997, and this shows that a cryptographic algorithm of a certain class is more rapidly installed by bit slice installation, than the software installation of the related art.

The bit slice cryptographic process is, for example, specifically disclosed in Non Patent Document 2 "Eli Biham, "A Fast New DES Implementation in Software", FSE '97, 1997". In the most basic bit slice installation, the process is performed by cutting out data from heads of the plurality of data blocks which are cryptographic process targets, in a bit unit, and setting a new block configured with an assembly of data items (bit slice expression data block) having the same orders of bits or bits at every n bits which are cut out from each data block, and herein n is a power of 2 such as 2, 4, 8, 16, 64, 128, or the like.

For example, a bit slice decryption process example in a case of collectively decrypting each encrypted data item transmitted by each sensor will be described with reference to FIG. 3.

Figure 3:
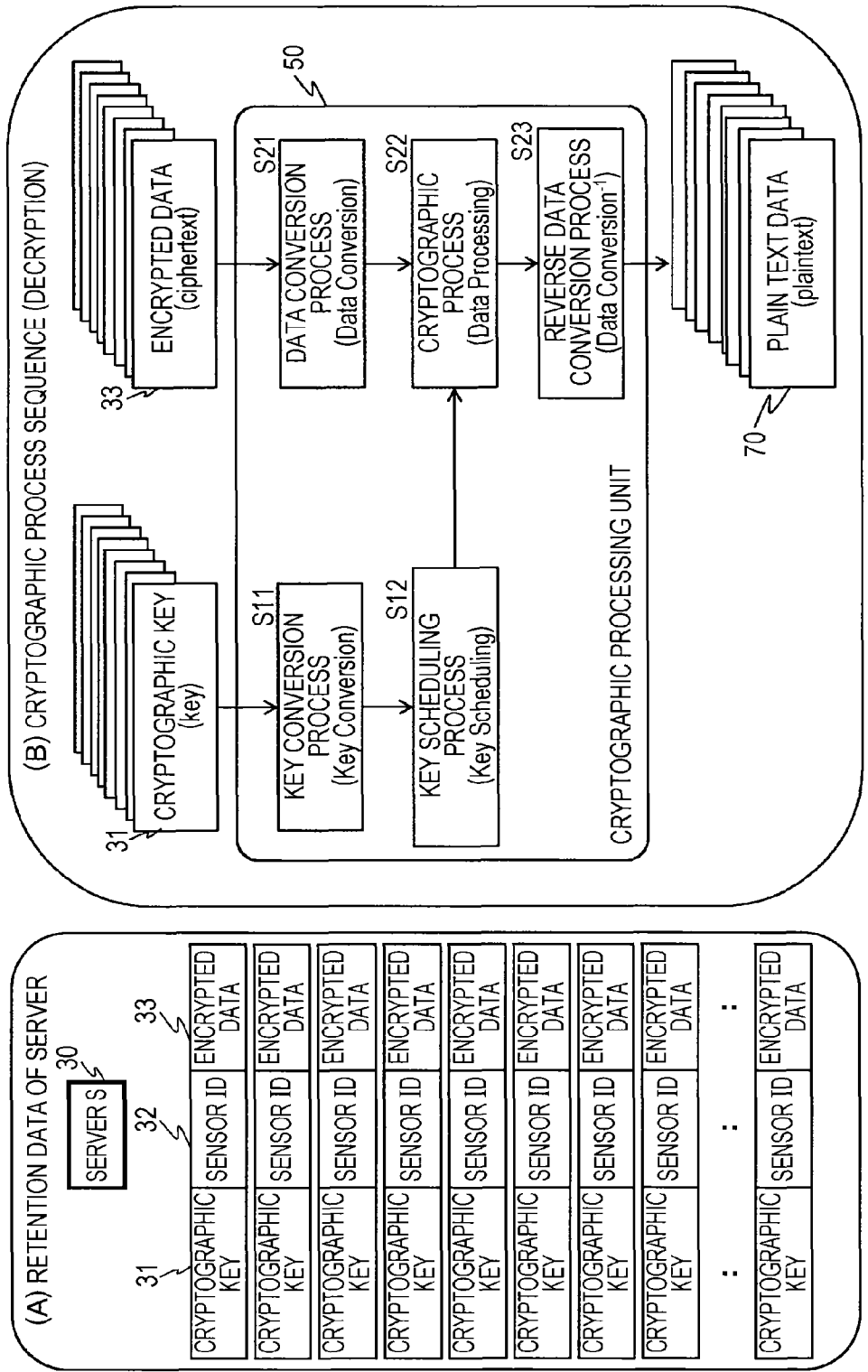
FIG. 3 is a diagram illustrating one example of a process executed in a server configuring a system shown in FIG. 1 and FIG. 2 to which a process of the present disclosure is applicable.

FIG. 3 shows diagrams illustrating (A) retention data and (B) a cryptographic process sequence (decryption) of the server S 30 shown in FIG. 2.

A cryptographic key 31 in the retention data of the server shown in FIG. 3(A) is data previously retained in the server S 30, as a unique key of each sensor (terminal node).

Each data of a sensor ID 32 and encrypted data 33 is data received from each sensor through the network.

The cryptographic key applied to the encryption process of each encrypted data item can be selected based on the sensor ID.

FIG. 3(B) is a diagram illustrating a process executed in a cryptographic processing unit 50 of the server S 30. In addition, the cryptographic processing unit 50 shown in the drawing is a data processing unit configured with a CPU or the like having a program execution function, and executes the cryptographic process (encryption and decryption processes) by performing a data process according to a program defining a sequence of a predetermined cryptographic algorithm. That is, the cryptographic processing unit executes the cryptographic process using the software (program).

FIG. 3(B) shows a process example of a case of performing the decryption process of the encrypted data received from each sensor through the network.

The server, first selects each cryptographic key 31 used for the decryption, using the sensor ID 32 added to the encrypted data 33. The server on the cloud retains the cryptographic key used in each server as management data associated with the sensor ID. Alternatively, the unique cryptographic key of each sensor may be extracted from each sensor ID with a predetermined operation.

In the server, as shown in FIG. 3(B), the cryptographic keys 31 of each sensor are arranged in the order corresponding to each block of the encrypted data 33 generated by each sensor.

When the encrypted data 33 and the cryptographic keys 31 having the predetermined block number which is previously defined as a processing unit of the bit slice cryptographic process are assembled, a data decryption process according to the bit slice cryptographic process is performed.

As described above, in the bit slice cryptographic process, the process is performed by cutting out data from heads of each block which is the cryptographic process target, in a bit unit, and setting an assembly of data items (bit slice expression data block) having the same orders of bits or bits at every n bits of each block, and herein n is a power of 2 such as 2, 4, 8, 16, 64, 128, or the like.

First, the server generates the plurality of bit slice expression data blocks such as a block in which only data items of the order of 1 bit are assembled (bit slice expression data block), a block in which only data items of the order of 2 bit are assembled (bit slice expression data block), and blocks in which only data at the same bit position to the subsequent final bit (bit slice expression data block), from a plurality of encrypted data blocks configuring the encrypted data 33 received from the plurality of sensors.

By doing so, the server generates the plurality of bit slice expression data blocks from the plurality of encrypted data blocks configuring the encrypted data 33.

In addition, the same process is also performed for the cryptographic key 31 used for generation of the encrypted data 33, that is to say, a plurality of bit slice expression key blocks corresponding to a plurality of key data items are generated.

Further, each of the cryptographic key 31 is a cryptographic key block configured with key data of 80 bits, for example, and regarding the cryptographic key 31, an assembly of data (bit slice expression key block) having the same orders of bits or bits at every n bits of each cryptographic key block, is set, and herein n is a power of 2 such as 2, 4, 8, 16, 64, 128, or the like.

This block conversion process is a process executed as a key conversion process (Key Conversion) in Step S11 and a data conversion process (Data Conversion) in Step S21 shown in the cryptographic processing unit 50 shown in FIG. 3(B).

The process using the bit slice expression block generated by the bit slice process as a processing unit is executed, and the process according to the predetermined cryptographic algorithm is executed.

In the apparatus of the present disclosure, an operation (AND, OR, XOR, or the like) using the bit slice expression block as a processing unit, a shifting process of register storage data, or a transposition process of a bit position such as shuffling, is executed as an application process of the software (program) to perform the process according to the predetermined cryptographic algorithm.

A round key is generated by performing a key scheduling process (Key Scheduling) in Step S12, with respect to the bit slice key data based on the plurality of cryptographic keys 31 generated by the key conversion process (Key Conversion) in Step S11 in the cryptographic processing unit 50.

Meanwhile, in the data conversion process (Data Conversion) in Step S21, a bit slice encrypted data block is generated by the bit slice process with respect to the plurality of encrypted data items 33 received from the sensor. This bit slice block is set as a processing target of the cryptographic process (encryption process or decryption process) in a cryptographic process (Data Processing) step in subsequent Step S22.

In the cryptographic process (Data Processing) in Step S22, the cryptographic process using the round key, herein the decryption process of the encrypted data is executed with respect to the bit slice expression data block generated based on the encrypted data in the data conversion process (Data Conversion) in Step S21.

In this cryptographic process step, for example, the process according to the predetermined cryptographic algorithm such as an addition (XOR) process with the round key, a linear conversion process, or a nonlinear conversion process, is executed according to the software (program).

In addition, in a key scheduling process (Key Scheduling) in Step S12, a round key used in each round of this round operation is generated.

In subsequent Step S23, a reverse data conversion process (Data Conversion$^{-1}$) is executed with respect to a block group obtained as a result of the cryptographic process (Data Processing) in Step S22. With this process, a process of returning the bit-sliced block to the original block is performed. With this process, plain text data 70 corresponding to the encrypted data 33 transmitted from the sensor is generated.

Figure 4:
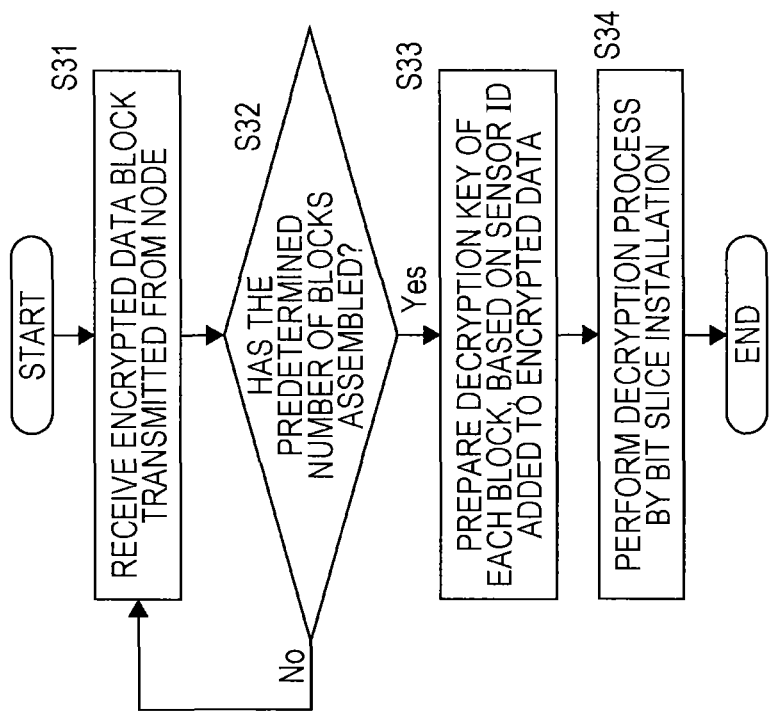
FIG. 4 is a diagram illustrating a sequence example of a process executed in a server configuring a system shown in FIG. 1 and FIG. 2 to which a process of the present disclosure is applicable.
Figure 5:
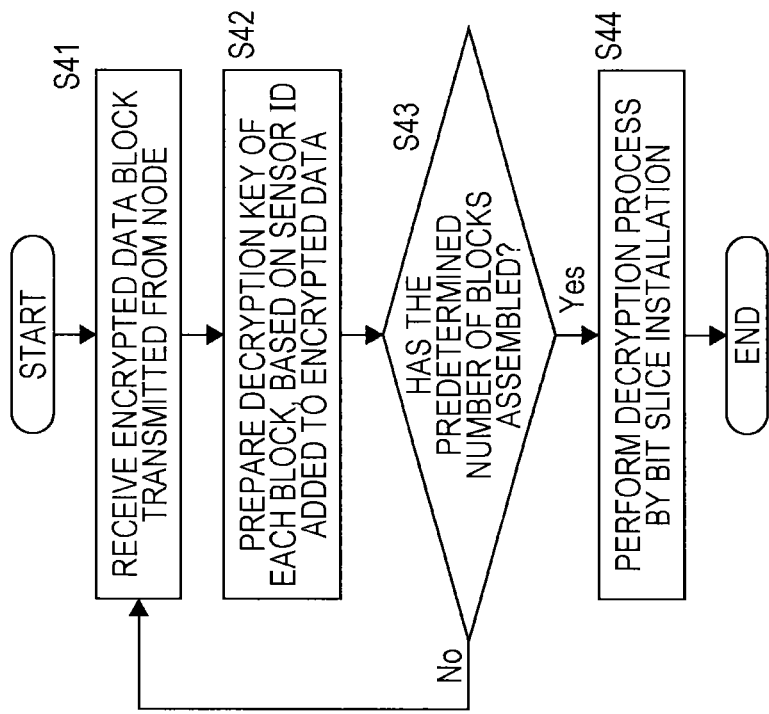
FIG. 5 is a diagram illustrating a sequence example of a process executed in a server configuring a system shown in FIG. 1 and FIG. 2 to which a process of the present disclosure is applicable.

FIG. 4 and FIG. 5 show two sequence examples of the process executed in the server.

A flowchart shown in FIG. 4 is a flowchart illustrating a sequence of a case of performing a step of preparing a decryption key of each block based on the sensor ID added to the encrypted data after assembling the encrypted data items having the predetermined number of blocks.

The flowchart shown in FIG. 5 is a flowchart illustrating a sequence of a case of performing a step of preparing a decryption key of each block based on the sensor ID added to the encrypted data each time when each cryptographic text data block arrives.

First, a process of each step of the flow shown in FIG. 4 will be described.

First, in Step S31, the encrypted data block transmitted from the node is received. This is combined data of the sensor ID 32 and the encrypted data 33 shown in FIG. 3(A).

Next, in Step S32, it is determined whether or not the encrypted data having the predetermined block number previously defined as a processing unit is received. In a case where the number thereof does not reach the predetermined block number, the process returns to Step S31 and the reception process is continued.

In a case where the number thereof has reached the predetermined block number, the process proceeds to Step S33, and the cryptographic key (=decryption key) of each encrypted data item is selected using the sensor ID added to the encrypted data.

Finally, in Step S34, a corresponding set of the encrypted data and the cryptographic key is input to the cryptographic processing unit 50 to execute the decryption process according to the bit slice cryptographic process.

The flow shown in FIG. 5 is a sequence of executing a process each time of arrival of the cryptographic text data block.

First, in Step S41, the encrypted data block transmitted from the node is received. This is combined data of the sensor ID 32 and the encrypted data 33 shown in FIG. 3(A).

Next, in Step S42, the cryptographic key (=decryption key) of each encrypted data item is selected using the sensor ID added to the encrypted data.

Next, in Step S43, it is determined whether or not the encrypted data having the predetermined block number previously defined as a processing unit is received. In a case where the number thereof does not reach the predetermined block number, the process returns to Step S41 and the reception process is continued.

In a case where the number thereof has reached the predetermined block number, the process proceeds to Step S44, and a corresponding set of the encrypted data and the cryptographic key is input to the cryptographic processing unit 50 to execute the decryption process according to the bit slice cryptographic process.

In addition, in the process example described above, the example of receiving the plurality of encrypted data items from the sensor and performing the decryption process in the server has been described, but for example, in a case of generating the encrypted data to be transmitted to the plurality of user terminals or the like, the server generates the plurality of encrypted data items by applying the bit slice cryptographic process with respect to the plurality of plain text data items. This encryption process is also executed by using the configuration of the cryptographic processing unit 50 shown in FIG. 3.

In a case of performing the encryption process, the plurality of blocks formed of the plain text data and the cryptographic key corresponding to each plain text data are input to execute the process, and the plurality of encrypted data items are generated.

For example, the cryptographic key corresponding to each plain text data item is selectively acquired from a storage unit based on a device ID of a transmission destination to which the encrypted data is transmitted, and a bit slice expression key is generated by the bit slice process with respect to the cryptographic key selectively acquired from the storage unit.

In addition, the encryption process is executed according to the process sequence shown in the cryptographic processing unit 50 shown in FIG. 3(B) by using the bit slice expression data block based on the plain text data and the bit slice expression key block based on the cryptographic key, and the encrypted data is generated and output.

The bit slice cryptographic process executed by the cryptographic processing unit 50 is executed as a process using the software (program) operable on a general-purpose processor, as described above. That is, in a device such as a PC which does not have a dedicated hardware configuration for a specific cryptographic algorithm, the process is performed by executing the software (program) defining an execution sequence of the cryptographic process algorithm which will be described later.

The process executed according to the software (program) includes, for example, an operation (AND, OR, XOR, or the like) between block data items using the bit slice expression block data stored in the register, a shifting process of the data stored in the register, a movement and transposition process of the bit position such as shuffling, or the like.

In a case of performing the cryptographic process according to the software (program) by a processor including a 64-bit register, for example, the cryptographic process can be executed as a single instruction multiple data stream (SIMD) type parallel process of processing 64 blocks in parallel with each other. In a basic bit slice installation method, the parallel process can be performed for a bit width of the processor. Transposition of the bit position frequently used in the cryptographic algorithm can be realized by a renaming process of the register at zero cost and therefore speed-up of the process is realized.

In addition, the number of blocks which can be subjected to the parallel process in the bit slice cryptographic process varies depending on the cryptographic algorithm or the bit slice installation algorithm, processor architecture, or a size of the register used, and for example, 8, 16, 32, 64, 128, or the like can be set as the number parallel process block.

In addition, in the bit slice cryptographic process, since the cryptographic text block subjected to the parallel process is independent from each other, the block received from the plurality of sensors may be mixed or the blocks may be arranged in any order regardless of the received order, as long as the block is associated with the key data block. A function of performing the decryption process regardless of the order of encrypted sensing data received from the plurality of sensors in asynchronous manner, is also an advantage of this system which uses the bit slice cryptographic process.

In this bit slice type cryptographic process, there is a nonlinear conversion process (Sbox) as one element which is a major influencing factor to the process speed. It is important point to express this nonlinear conversion process with a small logical operation (command) to realize the speed-up of the process.

In addition, since the processor in recent years simultaneously issues the plurality of commands, the speed-up of the process can be realized, if a restriction of dependency of the register is reduced and the command is expressed by a command system which can be executed with the small cycle number as possible.

[2. Lightweight Block Cryptographic Algorithm "Piccolo"]

Next, a lightweight block cryptographic algorithm "Piccolo" which is one example of the cryptographic process algorithm executed in the present disclosure will be described.

In the apparatus of the present disclosure, as the cryptographic process using the bit slice, "Piccolo" which is a lightweight block cryptographic algorithm corresponding to a block size of 64 bits, and key lengths of 80 bits and 128 bits, is executed.

An outline of a cryptographic process sequence according to the lightweight block cryptographic algorithm "Piccolo" will be described with reference to FIG. 6 and FIG. 7.

Figure 6:
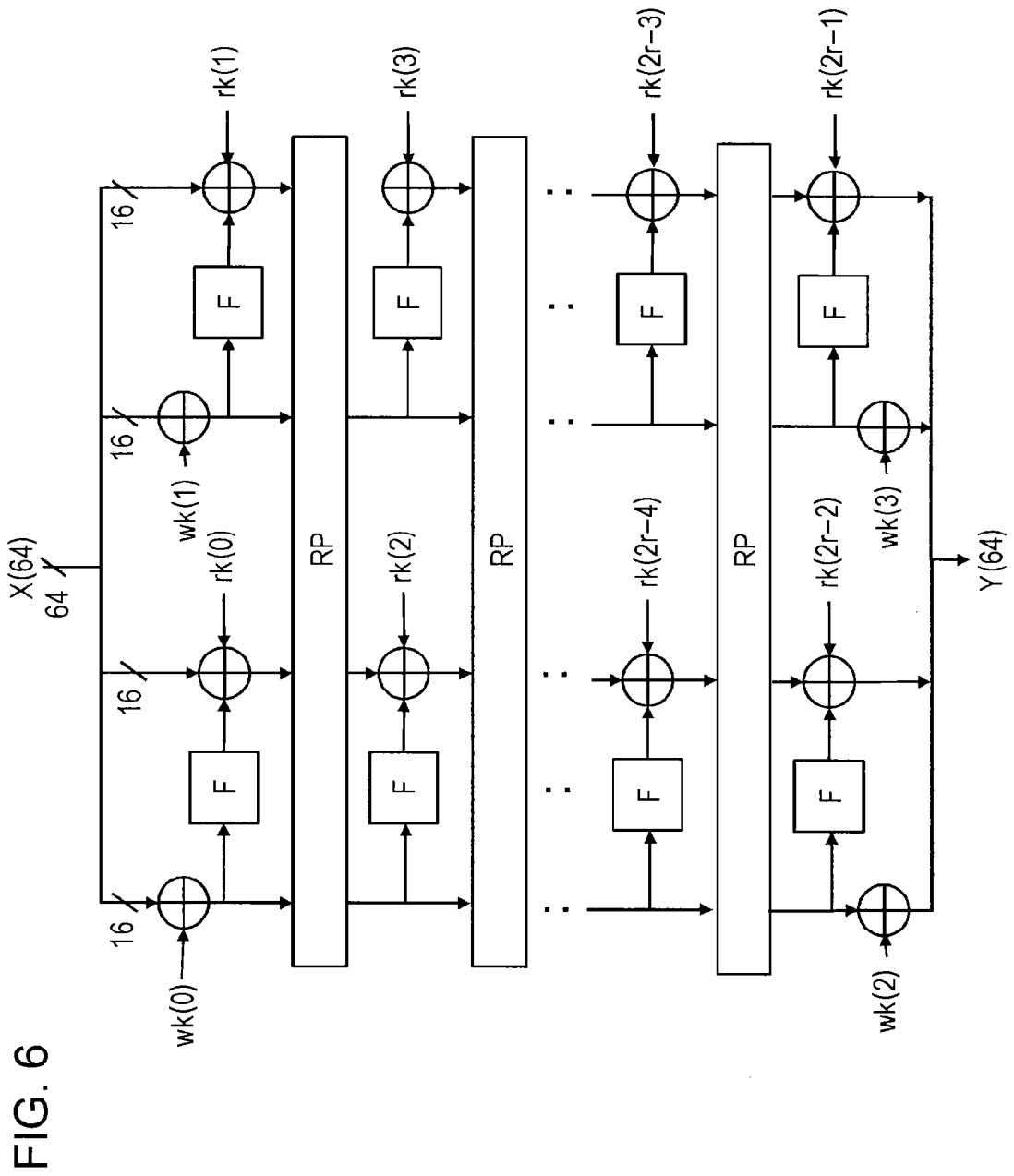
FIG. 6 is a diagram illustrating a process sequence of a cryptographic process algorithm Piccolo.

As shown in FIG. 6, in the lightweight block cryptographic algorithm "Piccolo", 64-bit plain text as the encryption process target is divided into four 16-bit data items to perform the process.

As the cryptographic keys, whitening keys (wk (0) to wk (3)) as initial keys and last keys and round keys (rk (r1) to rk (2r−1)) are used, and an exclusive-OR operation (XOR) of the keys and 16-bit data items is executed.

Figure 7:
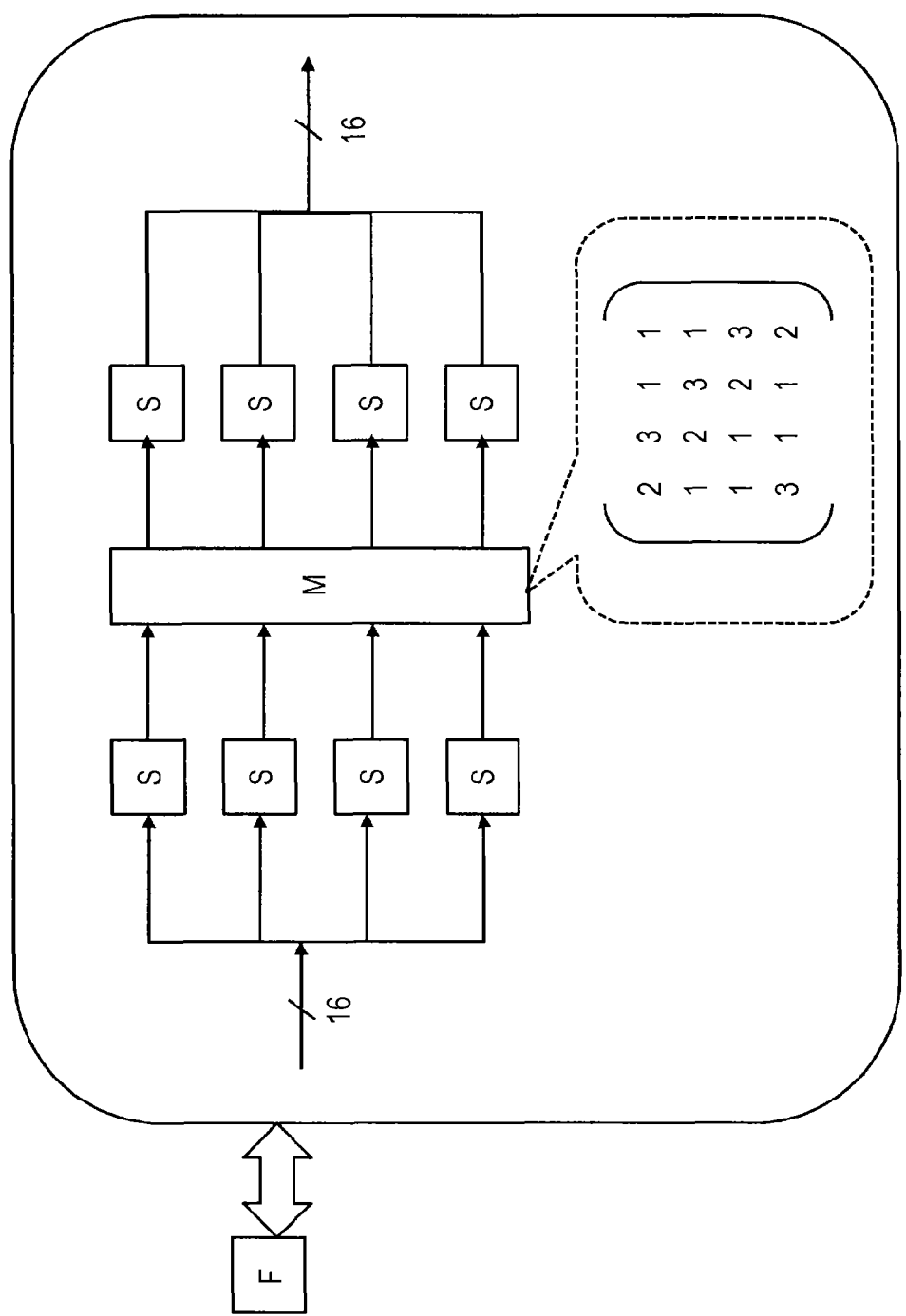
FIG. 7 is a diagram illustrating a process sequence of a cryptographic process algorithm Piccolo.

[F] shown in the drawing is an F function, and as shown in FIG. 7, the F function is configured as a data conversion unit which sequentially executes each process of (a) four first nonlinear conversion (Sbox) units in the unit of four bits, (b) a matrix operation (M) unit as a linear conversion unit with respect to Sbox output, and (c) four second nonlinear conversion (Sbox) units in the unit of four bits which inputs the output of the linear conversion unit (M).

In addition, in the lightweight block cryptographic algorithm "Piccolo", the predetermined number of rounds in a case of using 80-bit keys is set to 25 rounds, and the predetermined number of rounds in a case of using 128-bit keys is set to 31 rounds.

[RP] shown in FIG. 6 is a processing unit which executes round permutation which is a replacement process of four 16-bit inputs which are input from the upper stage.

As shown in FIG. 6, 64-bit plain text X which is the encryption target is divided into and input as four 16-bit data items, and round operation with two exclusive-OR operation portions of the 16-bit data items and the whitening keys (wk) or the round keys (rk) and two F functions are repeatedly performed multiple times, for example, 25 times, to output encrypted data Y.

In addition, the round permutation as the replacement process of the input and output data items between the rounds can be executed or not executed.

The apparatus of the present disclosure executes the cryptographic process according to the lightweight block cryptographic algorithm "Piccolo" shown in FIG. 6, according to the software (program), by using the bit slice expression data block generated by the bit slice process as a processing unit. In detail, the cryptographic process according to the software (program) defining the process such as the inter-block operation (AND, OR, XOR, or the like), the shifting process of the register storage data, or the transposition process of the bit position, is realized.

[3. Configuration of Information Processing Apparatus (Cryptographic processing Apparatus) and Outline of Process Sequence]

A configuration of the information processing apparatus (cryptographic processing apparatus) for executing the cryptographic process according to "Piccolo" of the present disclosure and a Process Sequence will be described with reference to FIG. 8.

Figure 8:
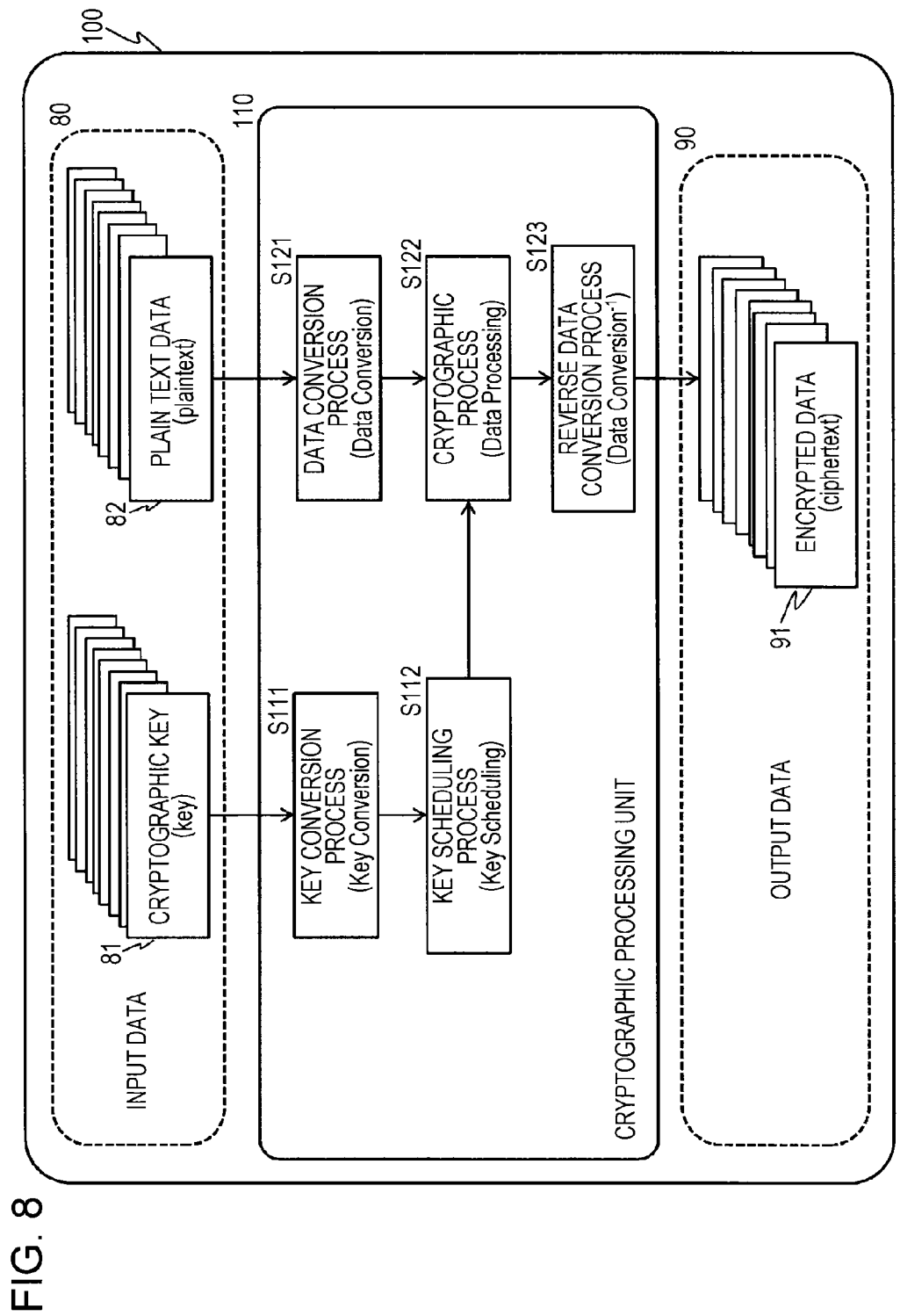
FIG. 8 is a diagram illustrating a process sequence of a cryptographic process of the present disclosure.

FIG. 8 is a diagram illustrating a configuration and a process of an information processing apparatus 100.

The information processing apparatus 100 can be configured with a PC or the like, for example, and can be configured as an apparatus which does not include dedicated hardware for executing the cryptographic process according to a specific algorithm as an essential configuration.

The information processing apparatus stores the software (program) for executing the cryptographic process in a memory and executes the process according to the program to perform the cryptographic process.

A cryptographic processing unit 110 of the information processing apparatus 100 shown in FIG. 8 is configured with, for example, a data processing unit configured with a CPU or the like having a program execution function, and a memory (RAM, ROM, a register, or the like) which stores data, various parameters, and programs, and the data processing unit (CPU or the like) executes processes in Steps S111 to S112 and Steps S121 to S123 shown in the drawing, according to the program, to perform the cryptographic process.

In addition, hereinafter, an encryption process example of inputting plain text data 82 and a cryptographic key 81 as input data 80, and generating and outputting encrypted data 91 as output data 90 will be described.

Further, as described above, the cryptographic processing unit 110 performs the cryptographic process according to the processes in Step S111 and S112 and Step S121 to S123 shown in the drawing, both in an encryption process of encrypting the plain text data to generate the encrypted data and in a decryption process of decrypting the encrypted data to generate the plain text data.

Hereinafter, an example of a case of performing the encryption process will be described as a representative example of the encryption process and the decryption process.

The input data 80 is the plurality of cryptographic keys 81 and the plurality of plain text data items 82.

The cryptographic keys and the plain text data items are associated in a one-to-one manner. That is, plain text data a encrypted by a cryptographic key a, plain text data b encrypted by a cryptographic key b, plain text data c encrypted by a cryptographic key c, . . . , and plain text data N encrypted by a cryptographic key N. The cryptographic processing unit 110 inputs N cryptographic keys and plain text data items as a processing unit, and executes the cryptographic process.

In addition, each of the plain text data items a, b, and c is configured with a data block (for example, 64 bits) having a predetermined data length.

In the same manner as described above, each of the cryptographic keys a, b, and c is also configured with a key data block (for example, 80 bits) having a predetermined data length.

In addition, the bit size is one example, and various bit sizes can be set for the data or the key.

The encrypted data 91 generated as the output data 90 is the following data, such as encrypted data a encrypted by the cryptographic key a, encrypted data b encrypted by the cryptographic key b, encrypted data c encrypted by the cryptographic key c, . . . , and encrypted data N encrypted by the cryptographic key N. The cryptographic processing unit 110 generates and outputs N encrypted data items.

For example, N encrypted data items are individually transmitted to N sensors (terminal nodes) through the network shown in FIG. 1 or FIG. 2, and the decryption process is executed in each sensor. In addition, the key used for the encryption and the key used for the decryption process can be set in the same manner, and the cryptographic key shown in FIG. 8 as the input data is configured as a unique sensor key retained in each sensor, for example.

Processes executed by the cryptographic processing unit 110 shown in FIG. 8 are the following processes, such as Step S111: the key conversion process, Step S112: the key scheduling process, Step S121: the data conversion process, Step S122: the cryptographic process, and Step S123: the reverse data conversion process.

The cryptographic processing unit 110 realizes the cryptographic process according to the lightweight block cryptographic algorithm "Piccolo" using the bit slice cryptographic process, by executing the steps described above.

First, the outline of each process and the flow of all processes will be briefly described, and then each process will be described in detail.

The key conversion process in Step S111 is a process of generating bit slice expression key data configured with the bit slice expression block which is an assembly of the data having the same orders of bits or bits at every n bits of the cryptographic keys 81, that is, the plurality of cryptographic key blocks formed of key data having 80 bits, for example, and herein n is a power of 2 such as 2, 4, 8, 16, 64, 128, or the like.

The data conversion process in Step S121 is a process of generating bit slice expression plain text data configured with the bit slice expression block which is an assembly of the data having the same orders of bits or bits at every n bits of the plain text data items 82, that is, the plurality of data blocks formed of plain text data having 64 bits, for example, and herein n is a power of 2 such as 2, 4, 8, 16, 64, 128, or the like.

The key scheduling process (Key Scheduling) in Step S112 is a process of generating the plurality of keys to be used in the cryptographic process, that is, the whitening keys and the round keys, by using the bit slice expression key data generated in the key conversion process (Key Conversion) in Step S111.

The cryptographic process (Data Processing) in Step S122 is a step of executing the cryptographic process using the whitening keys and the round keys, with respect to the bit slice expression data generated based on the plain text data in the data conversion process (Data Conversion) in Step S121.

The process according to the cryptographic algorithm such as the addition (XOR) process with the whitening key or the round key, the linear conversion process, or the nonlinear conversion process using the block configuring the bit slice expression data generated by the bit slice process as a unit, is executed according to the software (program).

In subsequent Step S123, the reverse data conversion process (Data Conversion$^{-1}$) is executed with respect to the result of the cryptographic process (Data Processing) in Step S122. This process is a process of returning the bit slice expression data to the assembly of encrypted data corresponding to the plain text data 82 before the bit slice process. With this process, the encrypted data 91 corresponding to the plain text data 82 is generated as the output data 90.

Hereinafter, the process in each step will be described in detail, in order.

[4. Key Conversion Process and Data Conversion Process]

First, the following processes of the cryptographic processing unit 110 shown in FIG. 8, that is, Step S111: the key conversion process and Step S121: the data conversion process will be described.

First, the key conversion process in Step S111 will be described with reference to FIGS. 9 and 10.

The key conversion process in Step S111 is a process of generating the bit slice expression key block which is the assembly of data having the same orders of bits or bits at every n bits of the cryptographic keys 81 shown in FIG. 8 as the input data, that is, the plurality of cryptographic key blocks formed of the key data having 80 bits, for example, and herein n is a power of 2 such as 2, 4, 8, 16, 64, 128, or the like.

Figure 9:
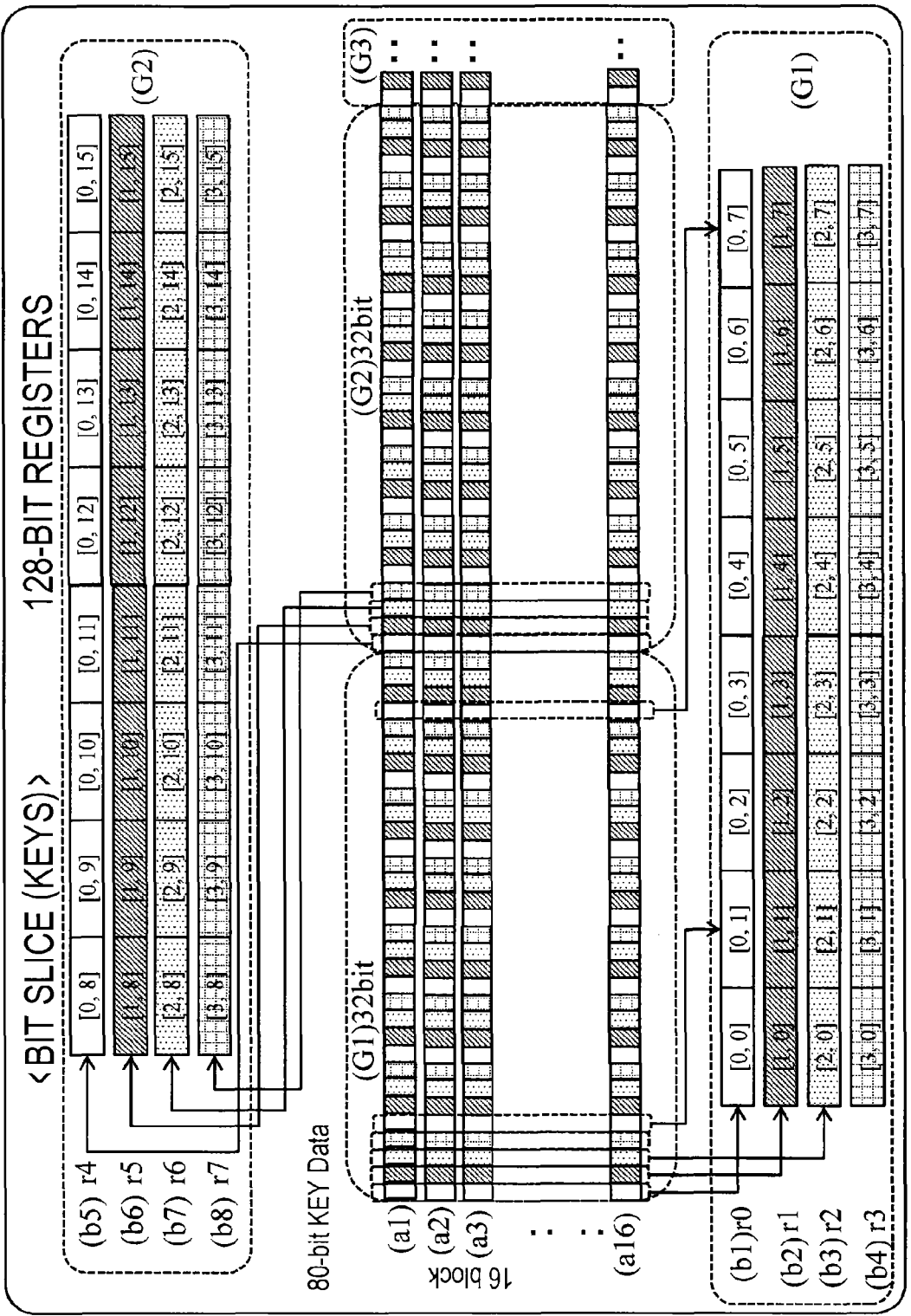
FIG. 9 is a diagram illustrating a generation process example of bit slice expression key data obtained by a key conversion process of key data.

FIG. 9 shows 16 key data items (a1) to (a16), each having 80 bits, as the cryptographic keys 81 which are the input data.

In Step S111, the bit slice expression key block is generated from the 16 key data items (a1) to (a16) each having 80 bits, and is stored in registers (rn: XMM registers and the like) configuring a memory in the information processing apparatus.

(b1) to (b12) shown in FIG. 9 are register storage data items which are the processed result of the key conversion process in Step S111, that is, storage data items of the bit slice expression key block. Herein, 12 128-bit registers are used as storage areas of the bit slice expression key block.

Figure 16:
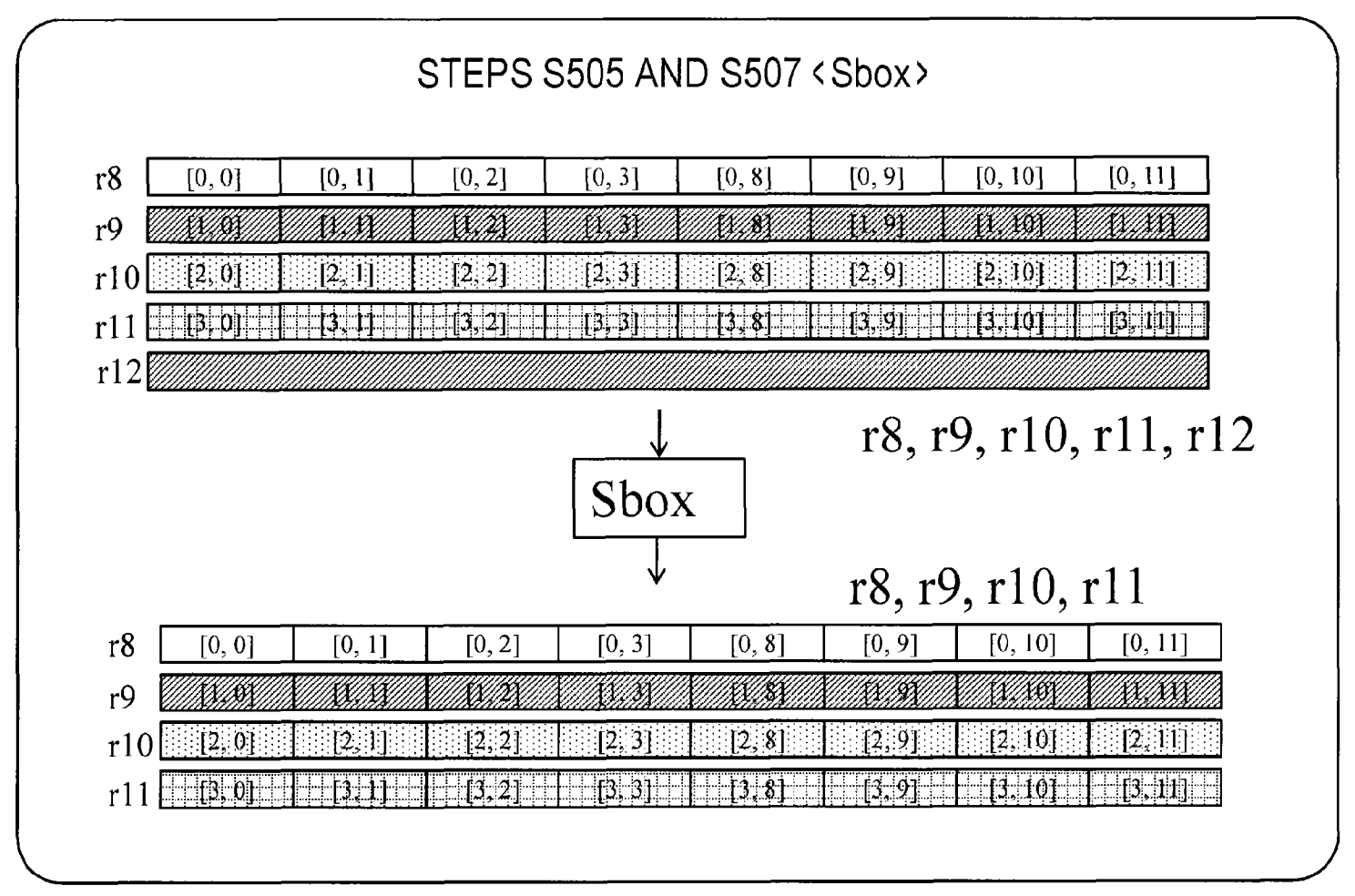

The cryptographic processing unit 110, for example, stores 16-bit data [0,0] in which only first bits of 16 sixteen 80-bit key data items (a1) to (a16) which are input data item shown in FIG. 9 are assembled, in the XMM register r0, as shown in (b1) of FIG. 16.

The 16-bit data [0,0] is an assembly formed of only first bits of 16 80-bit key data items, and corresponds to one bit slice expression block, and 16-bit data.

Next, 16-bit data [1,0] in which only second bits of input data items (a1) to (a16) are collected, is stored in an XMM register r1, as shown in (b2) of FIG. 9.

Next, 16-bit data [2,0] in which only third bits of input data items (a1) to (a16) are collected, is stored in an XMM register r2, as shown in (b3) of FIG. 9.

Next, 16-bit data [3,0] in which only fourth bits of input data items (a1) to (a16) are collected, is stored in an XMM register r3, as shown in (b4) of FIG. 9.

Next, 16-bit data [0,1] in which only fifth bits of input data items (a1) to (a16) are collected, is stored in an XMM register r0, as shown in (b1) of FIG. 8.

As described above, the data is stored in the unit of 16 bits in the XMM registers r0 to r3, in the unit of four bits, and the data of first 32 bits of the input data items (a1) to (a16) (16×32=512 bits) are stored in four 128-bit XMM registers r0 to r3.

This data group is set as (G1).

As described above, the data items of the first to $32^{nd}$ bits of the input data (a1) to (a16) are stored in the 128-bit registers r0 to r3, as the bit slice expression key blocks [0,0] to [3,7] in which only the data of the same orders of bits are assembled. Each of the bit slice expression key blocks [0,0] to [3,7] is 16-bit data.

In addition, 32-bit data items (G2) of $33^{rd}$ to $64^{th}$ bits of 16 80-bit key data items of the input data (a1) to (a16) are stored in registers r4 to r7. Those are the registers r4 to r7 shown in (b5) to (b8) of FIG. 9.

The data items of the $33^{rd}$ to $64^{th}$ bits of the input data (a1) to (a16) are stored in the registers r4 to r7, as the bit slice expression key blocks [0,8] to [3,15] in which only the data of the same orders of bits are assembled. Each of the bit slice expression key blocks [0,8] to [3,15] is 16-bit data.

Figure 10:
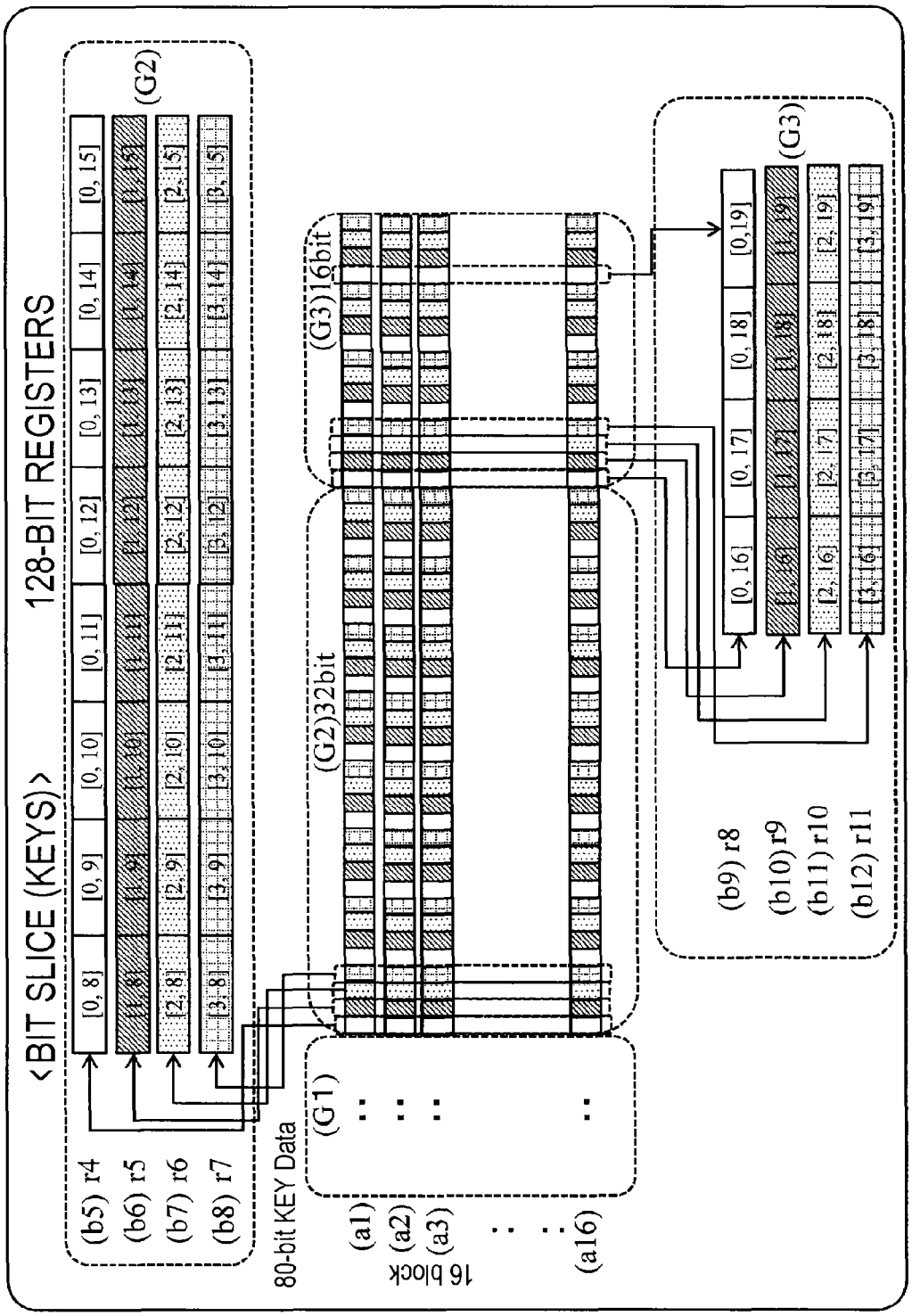
FIG. 10 is a diagram illustrating a generation process example of bit slice expression key data obtained by a key conversion process of key data.

In addition, as shown in FIG. 10, 16-bit data items (G3) of $65^{th}$ to $80^{th}$ bits of 16 80-bit key data items of the input data (a1) to (a16) are stored in registers r8 to r11. Those are the registers r8 to r11 shown in (b9) to (b12) of FIG. 10.

The data items of the $65^{th}$ to $80^{th}$ bits of the input data (a1) to (a16) are stored in the registers r8 to r11, as the bit slice expression key blocks [0,16] to [3,19] in which only the data of the same orders of bits are assembled. Each of the bit slice expression key blocks [0,16] to [3,19] is 16-bit data.

As described above, the cryptographic processing unit 110 performs the bit slice process on 16 80-bit keys and stores the keys in the plurality of registers. In detail, for example, in a case where the information processing apparatus 100 has a configuration of including the plurality of XMM registers for Intel extension SIMD command, or general-purpose registers, the bit slice data is dispersed and stored in the unit of 16 bits by using the registers.

As described above, first to $32^{nd}$ bits of the input data are repeatedly stored in four registers r0 to r3 using the registers, in the unit of four bits.

In addition, 32 bits of $33^{rd}$ to 64 bits are also repeatedly stored in four registers r4 to r7 using the registers, in the unit of four bits.

Further, $65^{th}$ to $80^{th}$ bits are also repeatedly stored in four new registers r8 to r11 using the registers, in the unit of four bits.

In addition, any register storage data [i,j] shown in FIG. 9 and FIG. 10 is the bit slice expression block as the assembly of the same order of bits of 16 key data items (a1) to (a16), and is 16-bit data.

Further, in [i,j] shown as an identifier of the register storage data, i is a parameter which is repeatedly set as 0, 1, 2, and 3 in the unit of four bits from the head of each input data of 16 80-bit key data blocks (a1) to (a16), and shows a variable indicating which bit is stored among the unit of four bits.

j corresponds to a parameter indicating the order of the data of the units of four bits, from the data of the unit of four bits of 16 key data items (a1) to (a16).

For example, in a case where the data is divided from the head of each input data in the unit of four bits, since i is set as 0 in the first bit in the data of the unit of four bits, i is set as 1 in the second bit in the data of the unit of four bits, i is set as 2 in the third bit in the data of the unit of four bits, and i is set as 3 in the fourth bit in the data of the unit of four bits, i=2 when [i,j]=[2,1], indicates the third bit of the data of the unit of four bits.

In addition, j=1 when [i,j]=[2,1], is a parameter indicating the order of the data of the unit of four bits, from the data of the unit of four bits from the head of each input data.

j is set as 0 in the first data of the unit of four bits, j is set as 1 in the second data of the unit of four bits, and j is set as 2 in the third data of the unit of four bits.

When [i,j]=[2,1], j is 1, and therefore it is identified that the data is the second data of the unit of four bits.

As described above, in [2,1], for example, j is 1 and therefore it is identified that the data is the second data of the unit of four bits, and i is 2 and therefore it is identified that the data is the third data in the second data of the unit of four bits.

That is, it is identified that the block is configured with the assembly of data items of seventh bits from the head.

As described above, in the key conversion process in Step S111, the cryptographic processing unit 110 shown in FIG. 8 generates the bit slice expression key data formed of the bit slice expression blocks [0,0] to [3,19] and stores the bit slice expression key data in the register.

Next, the data conversion process in Step S121 will be described with reference to FIG. 11.

This data conversion process is the same conversion process of the data into the bit slice expression data as the key conversion process described with reference to FIG. 9 and FIG. 10. However, it is different therefrom in a point that the input is 16 64-bit plain text data items.

Figure 11:
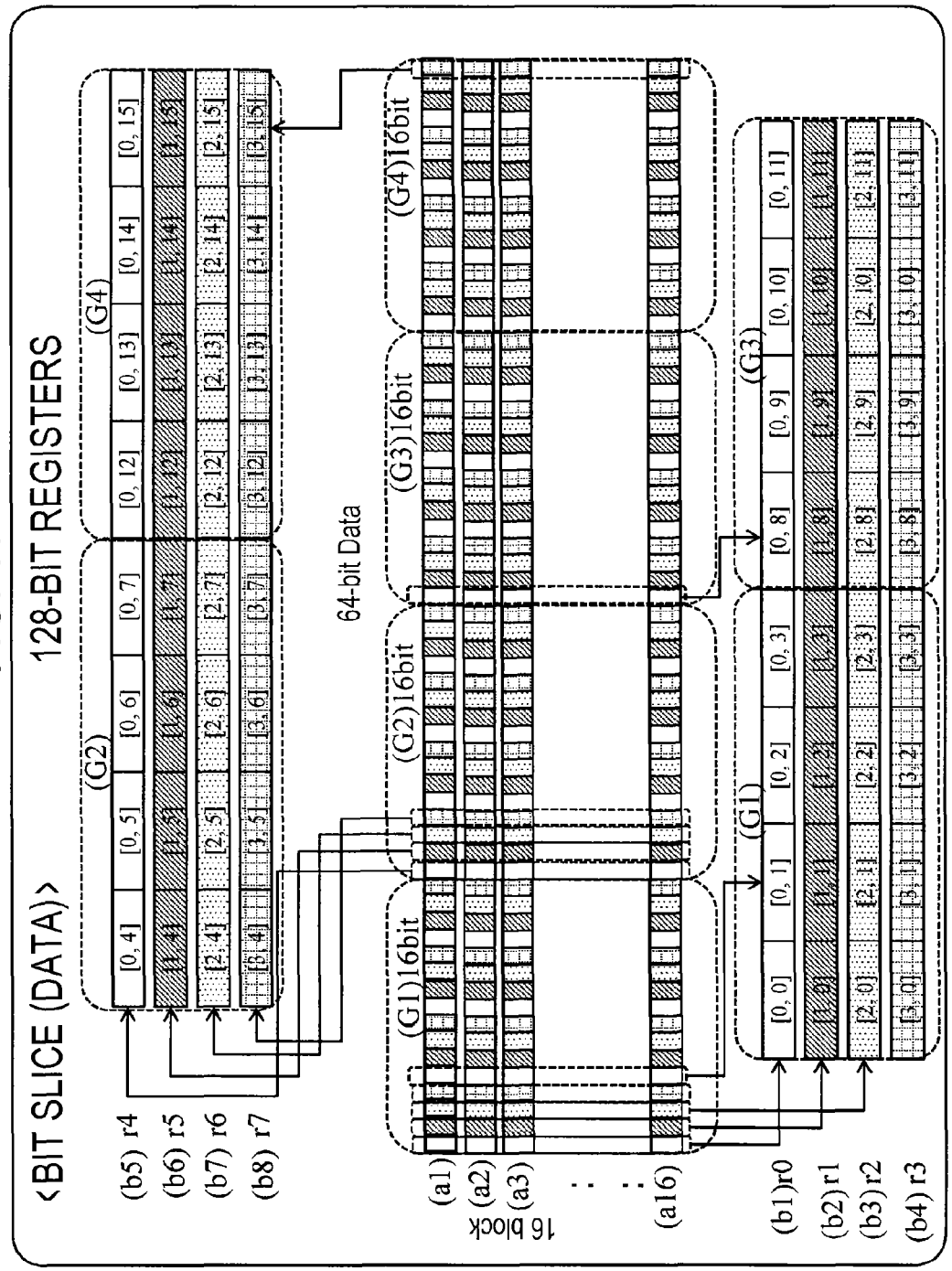
FIG. 11 is a diagram illustrating a generation process example of bit slice expression data obtained by a conversion process of data.

Each register storage data in the example shown in FIG. 11 is as follows.

The 16 64-bit data blocks (a1) to (a16) which are the input data are divided into the following four groups of the unit of 16 bits, as shown in FIG. 11.

(G1) First to $16^{th}$ bits
(G2) $17^{th}$ to $32^{nd}$ bits
(G3) $33^{rd}$ to $48^{th}$ bits
(G4) $49^{th}$ to $64^{th}$ bits

[0,0] to [3,3] which are the bit slice expression data items of the first to $16^{th}$ bits (G1) are sequentially stored in the front half of the four 128-bit registers r0 to r3. Those are the registers r0 to r3 shown in (b1) to (b4) of FIG. 11.

The first bits to $16^{th}$ bits of the input data (a1) to (a16) are stored in the front half of the registers r0 to r3, as bit slice expression data blocks [0,0] to [3,3] in which only the bit data of the same orders of bits are assembled. Each of the bit slice expression data blocks [0,0] to [3,3] is 16-bit data.

In addition, [0,4] to [3,7] which are the bit slice expression data items of the $17^{th}$ to $32^{nd}$ bits (G2) are sequentially stored in the front half of the four 128-bit registers r4 to r7. Those are the registers r4 to r7 shown in (b5) to (b8) of FIG. 11.

The $17^{th}$ to $32^{nd}$ bits of the input data (a1) to (a16) are stored in the front half of the registers r4 to r7, as bit slice expression data blocks [0,4] to [3,7] in which only the bit data of the same orders of bits are assembled. Each of the bit slice expression data blocks [0,4] to [3,7] is 16-bit data.

In addition, [0,8] to [3,11] which are the bit slice expression data items of the $33^{rd}$ to $48^{th}$ bits (G3) are sequentially stored in the latter half of the four 128-bit registers r0 to r3. Those are the registers r0 to r3 shown in (b1) to (b4) of FIG. 11.

The $33^{rd}$ to $48^{th}$ bits of the input data (a1) to (a16) are stored in the latter half of the registers r0 to r3, as bit slice expression data blocks [0,8] to [3,11] in which only the bit data of the same orders of bits are assembled. Each of the bit slice expression data blocks [0,8] to [3,11] is 16-bit data.

In addition, [0,12] to [3,15] which are the bit slice expression data items of the $49^{th}$ to $64^{th}$ bits (G4) are sequentially stored in the latter half of the four 128-bit registers r4 to r7. Those are the registers r4 to r7 shown in (b5) to (b8) of FIG. 11.

The $49^{th}$ to $64^{th}$ bits of the input data (a1) to (a16) are stored in the latter half of the registers r4 to r7, as bit slice expression data blocks [0,12] to [3,15] in which only the bit data of the same orders of bits are assembled. Each of the bit slice expression data blocks [0,12] to [3,15] is 16-bit data.

As described above, first to $16^{th}$ bits of the input data are repeatedly stored in four registers r0 to r3 using the registers, in the unit of four bits.

In addition, 16 bits of $17^{th}$ to $32^{nd}$ bits thereof are also repeatedly stored in four registers r4 to r7 using the registers, in the unit of four bits.

In addition, 16 bits of $33^{rd}$ to $48^{th}$ bits thereof are also repeatedly stored in four registers r0 to r3 using the registers, in the unit of four bits.

In addition, 16 bits of $49^{th}$ to $64^{th}$ bits thereof are also repeatedly stored in four registers r4 to r7 using the registers, in the unit of four bits.

As described above, 64 bits of the input data are repeatedly stored in four registers using the registers, in the unit of four bits.

Any register storage data [i,j] shown in FIG. 11 is the assembly of the same orders of bits of the 16 plain text data items (a1) to (a16), and is 16-bit data.

i is a parameter which is repeatedly set as 0, 1, 2, and 3 in the unit of four bits from the head of each input data of 16 64-bit plain text data blocks (a1) to (a16), and shows a variable indicating which bit is stored among the unit of four bits.

j is a parameter indicating the order of the data of the units of four bits, from the data of the unit of four bits of 16 plain text data items (a1) to (a16).

Each block stored in the registers of FIG. 9 to FIG. 11 is a block (bit slice expression block) formed of 16-bit data with the assembly of the same orders of bits of 16 keys or the plain text data items.

As will be described hereinafter, by executing the process of the block unit using this block as a unit, the same process as the cryptographic process individually using the 16 keys can be executed in a single cryptographic process.

In Step S112, the round keys are generated using the 16 bit-slice expressed 80-bit keys stored in the registers. 25 round keys corresponding to the round number are necessary in the cryptographic process algorithm "Piccolo" described above with reference to FIG. 6 and FIG. 7, and in Step S112, the plurality of round keys are generated using the bit slice expression data stored in the registers.

In addition, the round keys generated by the process described below are round keys used in the process of the block (bit slice expression block) unit.

For example, in the normal Piccolo algorithm shown in FIG. 6, the round keys of each round used in the 16-bit input which are 4-divided data of 64-bit plain text which is the encryption target, has 16 bits, but the cryptographic process in Step S122 of executing the cryptographic process using the bit slice data described above with reference to FIG. 9 to FIG. 11, is executed as the process of the bit slice expression block unit.

That is, the plain text is subjected to the cryptographic process using 64 blocks as a unit, and therefore the round keys to be used in this cryptographic process are the round keys with 16 blocks which are obtained by dividing 64 blocks into four.

In the example, in one key block (bit slice expression key block), the data of the same order of bits of the 16 original cryptographic keys 81, that is, 16 bits, are stored.

The round keys to be used in the bit slice cryptographic process of the present disclosure are the round keys with 16 blocks, that is, the round keys with 16×16 bits=256.

The plain text which is the encryption process target is processed in the same manner as described above, and the plain text input has 64 bits in the normal Piccolo algorithm shown in FIG. 6, but in the bit slice cryptographic process of the present disclosure, 64 blocks of the bit slice expression data, that is, 64 blocks with 64×16 bits=1024 bits are input to execute the process.

[5. Cryptographic Process (With Round Permutation)]

Next, the process in Step S122 executed by the cryptographic processing unit 110 shown in FIG. 8, that is, the cryptographic process will be described in detail.

The cryptographic algorithm [Piccolo] described above with reference to FIG. 6 and FIG. 7 can have two configurations of executing or not executing the round permutation as the replacement process of the input and output data items between the rounds.

First, a process in Step S122 when executing the round permutation will be described.

The cryptographic process (Data Processing) in Step S122 is a step of executing the cryptographic process using the whitening key or the round key, with respect to the bit slice expression data generated based on the plain text data in the data conversion process (Data Conversion) in Step S121.

In addition, the whitening keys or the round keys are necessary in this cryptographic process, and such keys are generated in the key scheduling process (Key Scheduling) in Step S112 executed by the cryptographic processing unit 110 shown in FIG. 8. This process will be described later.

Hereinafter, first, it is assumed that the whitening keys or the round keys are generated, and the cryptographic process (Data Processing) in Step S122 executed using the keys will be described in detail.

In the cryptographic process (Data Processing) in Step S122, a process using the block configuring the bit slice expression data generated by the bit slice process in Step S121 as a unit, is performed. The process according to the cryptographic algorithm such as the addition (XOR) process with the whitening keys or the round keys, the linear conversion process, or the nonlinear conversion process is executed according to the software (program).

This cryptographic process will be described in detail with reference to FIG. 12 and the subsequent drawings.

Figure 12:
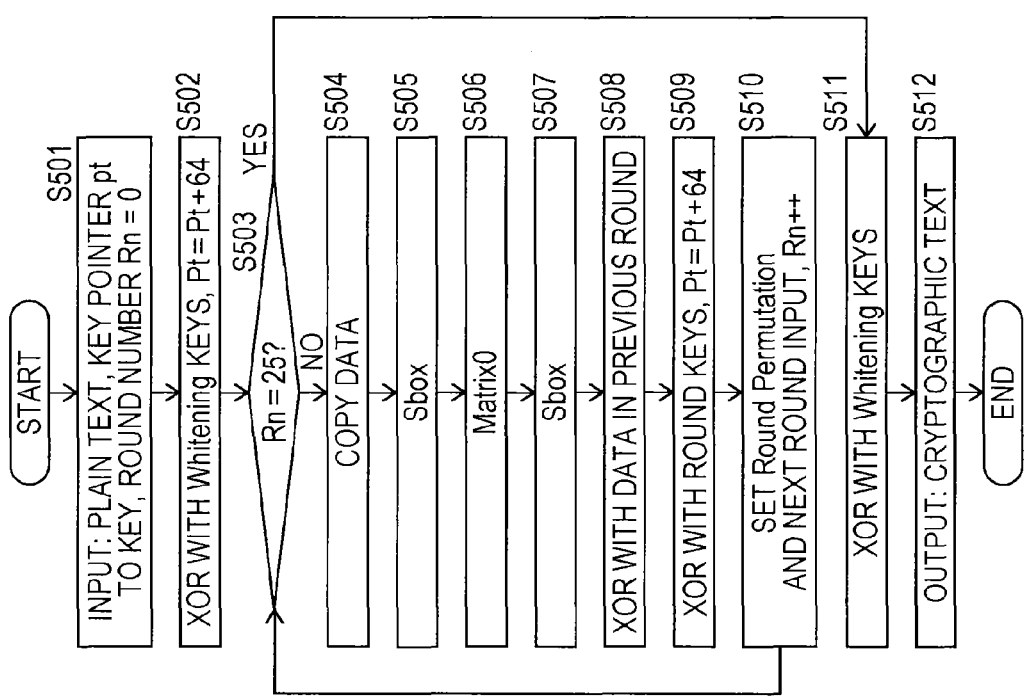
FIG. 12 is a diagram showing a flowchart illustrating a specific sequence of a cryptographic process.

A flowchart shown in FIG. 12 is a flowchart illustrating a specific sequence of the process in Step S122 executed by the cryptographic processing unit 110 shown in FIG. 8, that is, the cryptographic process.

The data input and initial setting are performed in Step S501.

In detail, the bit slice expression data of the plain text data which is the encryption process target stored in the register is input.

This is the data generated in the data conversion process in Step S121 of FIG. 8, and is the bit slice expression data generated by the conversion process of the plain text data 82 described above with reference to FIG. 11. That is, 64 blocks of the bit slice expression blocks [0,0] to [3,15] shown in FIG. 11 are input.

In the example, the bit slice expression blocks [0,0] to [3,15] shown in FIG. 11 are blocks in which the same orders of bits of 16 plain text items which are the cryptographic process targets are stored, and are 16-bit data items, respectively.

Figure 13:
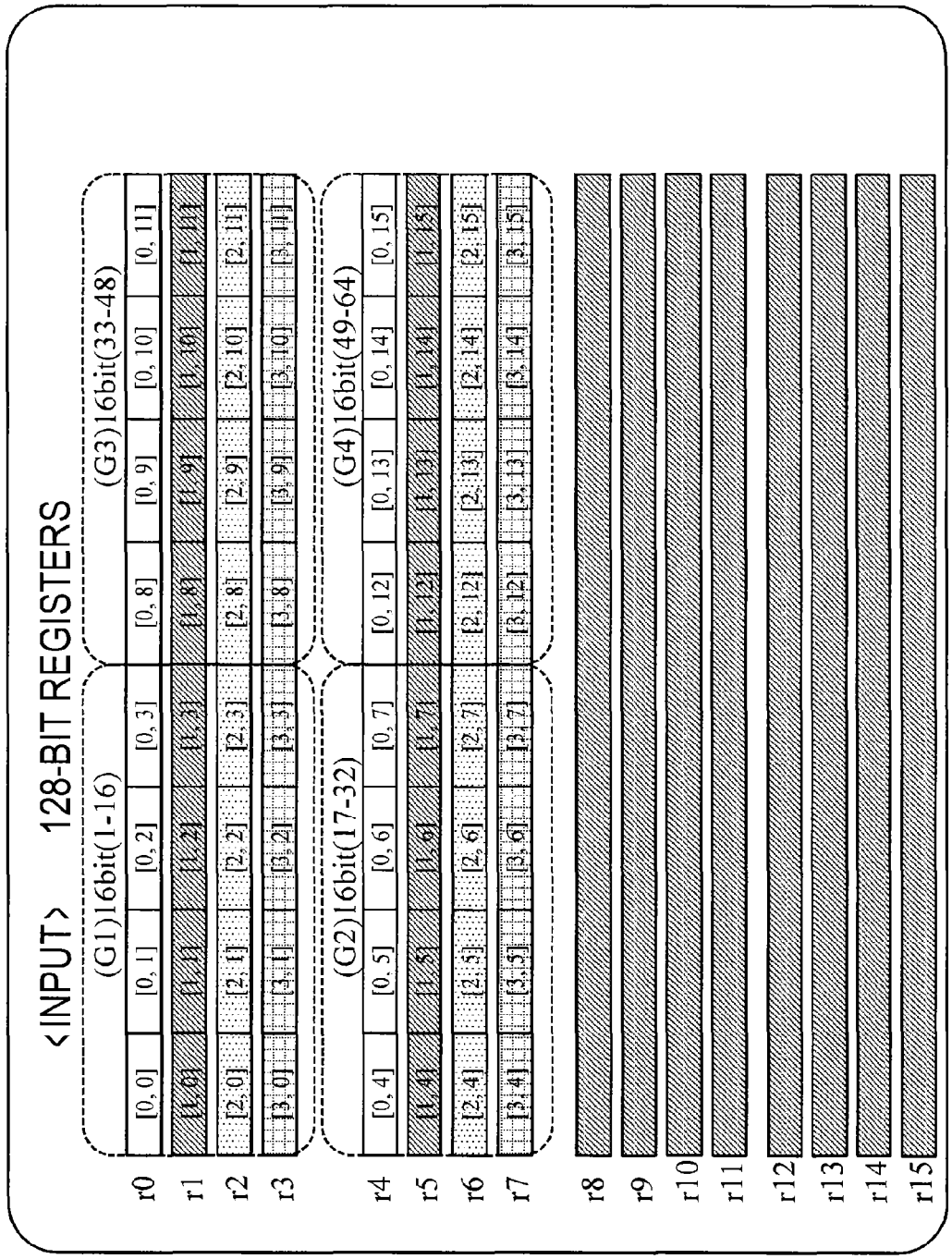
FIG. 13 is a diagram illustrating register storage data at the time of executing a cryptographic process and a data process example.

FIG. 13 shows an example of the input data.

As shown in FIG. 13, bit slice expression blocks [0,0] to [3,15] generated by the bits slice process described with reference to FIG. 11 are stored in the eight 128-bit registers r0 to r7.

As shown in FIG. 13, (G1) the bit slice data items of first to $16^{th}$ bits of the original 16 plain text data items, (G2) the bit slice data items of $17^{th}$ to $32^{nd}$ bits of the original 16 plain text data items, (G3) the bit slice data items of $33^{rd}$ to $48^{th}$ bits of the original 16 plain text data items, and (G4) the bit slice data items of $49^{th}$ to $64^{th}$ bits of the original 16 plain text data items are stored in the registers r0 to r7.

Registers r8 to r15 shown in FIG. 13 are registers to be used when executing each step of the flow shown in FIG. 12.

In addition, the data items G1 to G4 are set in accordance with the input of four 16-bit items of the cryptographic algorithm Piccolo shown in FIG. 6, for example.

The data (G1) corresponds to 16-bit input on the left end of FIG. 6, the data (G2) corresponds to second 16-bit input from the left end of FIG. 6, the data (G3) corresponds to third 16-bit input from the left end of FIG. 6, and the data (G4) corresponds to fourth 16-bit input from the left end of FIG. 6.

However, in the process example, the entire process is performed as the process of the block unit of one bit slice block [i,j] shown in FIG. 13, not the process of the bit unit.

In Step S501, the bit slice expression data shown in FIG. 13 is input, and the initial setting of setting the round number Rn corresponding to the count value of the round number of the cryptographic process as 0, and the initial setting of a key pointer (pt) indicating the memory area in which the whitening key or the round key is stored, are performed. The key pointer (pt) represents a memory address of the whitening key or the round key written in the memory area. In addition, the key pointer in the initial state indicates the whitening key. The initial value of the round number Rn is set to 0, and Rn increases after the completion of each round.

The processes from Step S505 to Step S510 correspond to the round process and up to eight registers are used as temporary areas.

The input data is the bit slice data formed of the bit slice expression blocks shown in FIG. 13.

The bit slice expression data items are stored in the registers r0, r1, r2, r3, r4, r5, r6, and r7.

After data input and initial setting in Step S501, the process proceeds to Step S502.

Figure 14:
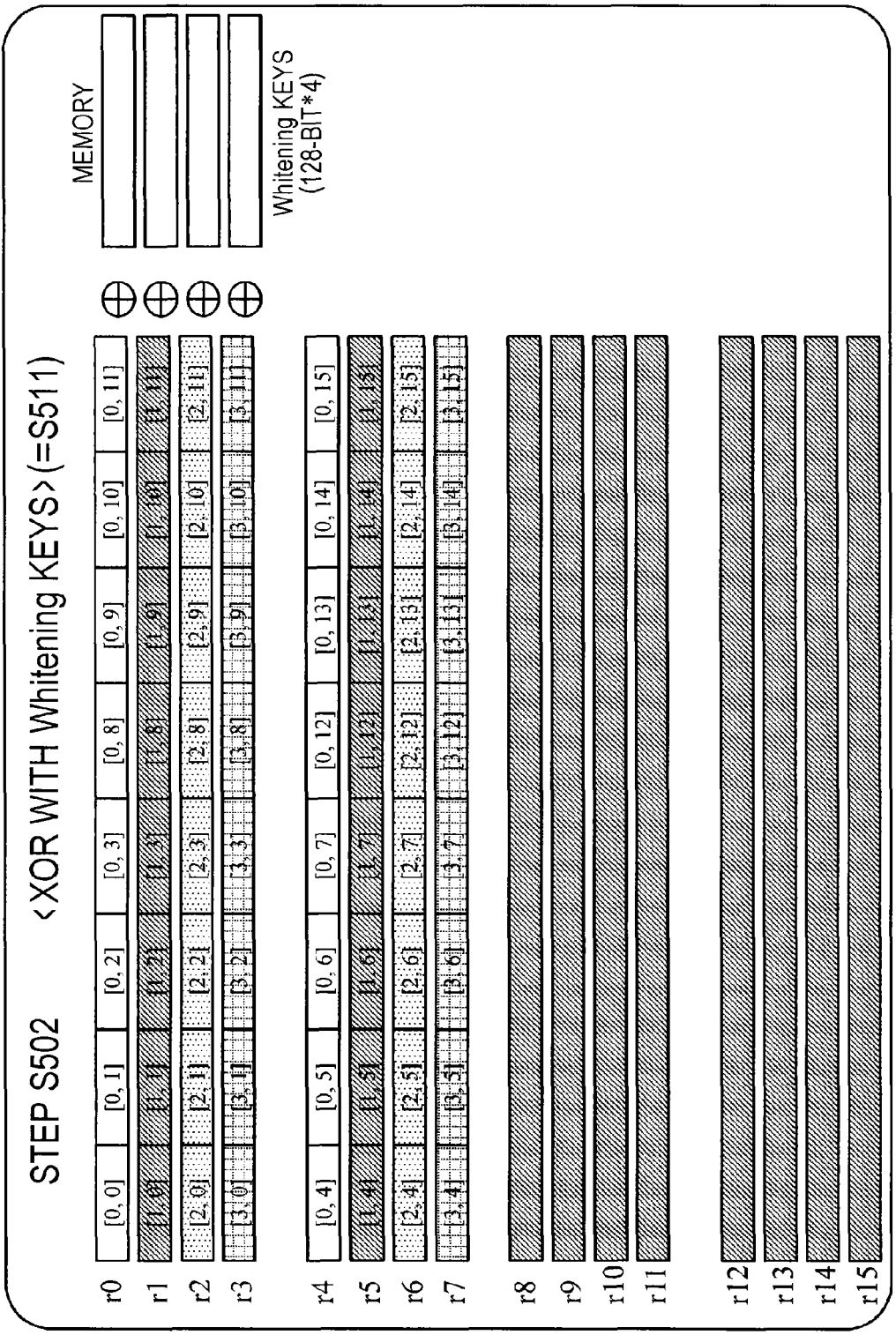
FIG. 14 is a diagram illustrating register storage data at the time of executing a cryptographic process and a data process example.

In Step S502, as shown in FIG. 14, the exclusive-OR operation (XOR) with the whitening keys is executed.

As shown in FIG. 14, the exclusive-OR operation (XOR) of the registers r0, r1, r2, and r3 and the whitening keys which are generated in the key scheduling process in Step S112 shown in FIG. 8 and stored in the memory is calculated, and the calculation results are stored in the registers r0, r1, r2, and r3.

In addition, in this step, a process of adding 64 bytes corresponding to the amount of data of the key used to the value of the current pointer is performed, as the updating process of the key pointer (pt) indicating an access destination of the next whitening key or the round key to be used.

Next, in Step S503, the number of rounds are confirmed, that is, it is confirmed whether or not the number of rounds has reached 25 rounds that is the predetermined number of rounds in a case of using the 80-bit key in "Piccolo". In a case where the number of rounds has reached 25, the process proceeds to Step S511, and in a case where the number of rounds has not reached 25, the process proceeds to Step S504.

Figure 15:
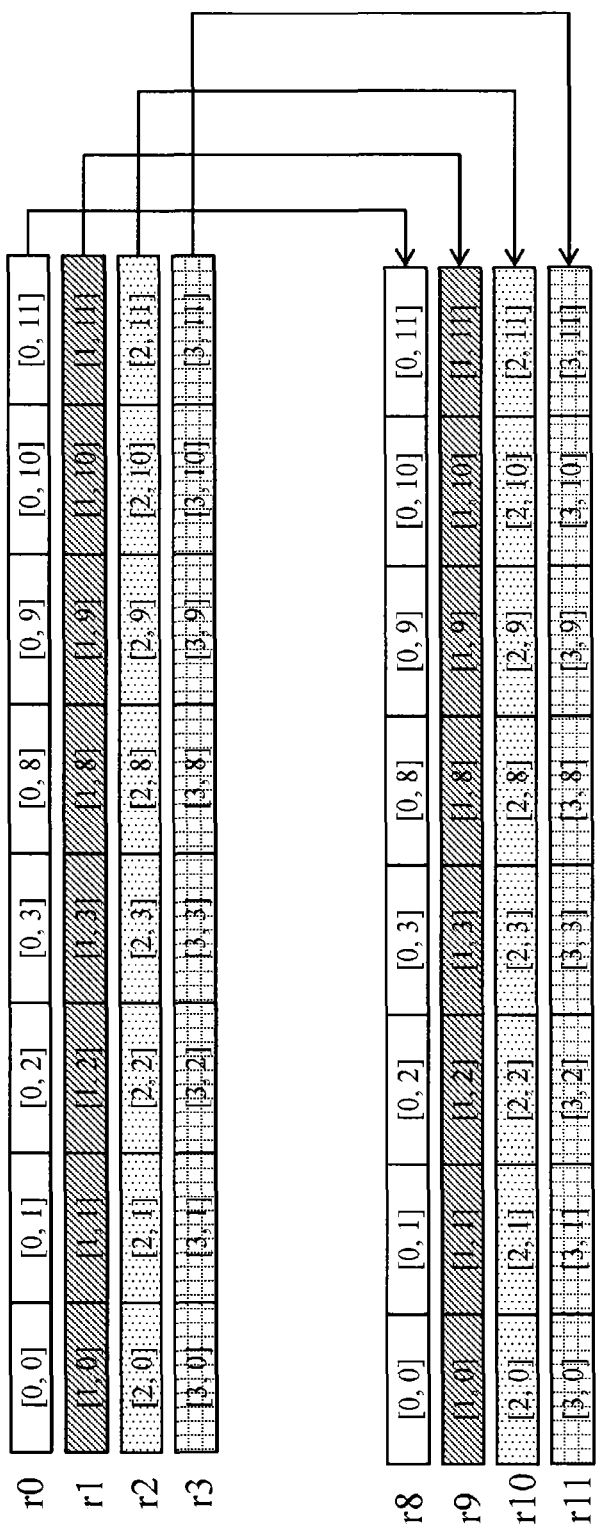
FIG. 15 is a diagram illustrating register storage data at the time of executing a cryptographic process and a data process example.

Next, in Step S504, as shown in FIG. 15, the data in registers r0, r1, r2, and r3 is copied to the registers r8, r9, r10, and r11.

Next, in Step S505, as shown in FIG. 16, the nonlinear conversion process (Sbox) with respect to the storage data in the registers r8, r9, r10, r11 and r12 is executed. The process results are stored in the registers r8, r9, r10, and r11. In addition, the register r12 is used as the temporary register for storing the data during the operation.

The nonlinear conversion process (Sbox) corresponds to the process of Sbox in the F function of the algorithm Piccolo shown in FIG. 6 and corresponds to the process of Sbox at the front stage of the matrix (M) shown in FIG. 7.

The nonlinear conversion process (Sbox) is performed by executing the predetermined logical command example with respect to the storage data items in the registers r8, r9, r10, r11 and r12.

FIG. 17 shows the logical command example used in the nonlinear conversion process (Sbox).

Figure 18:
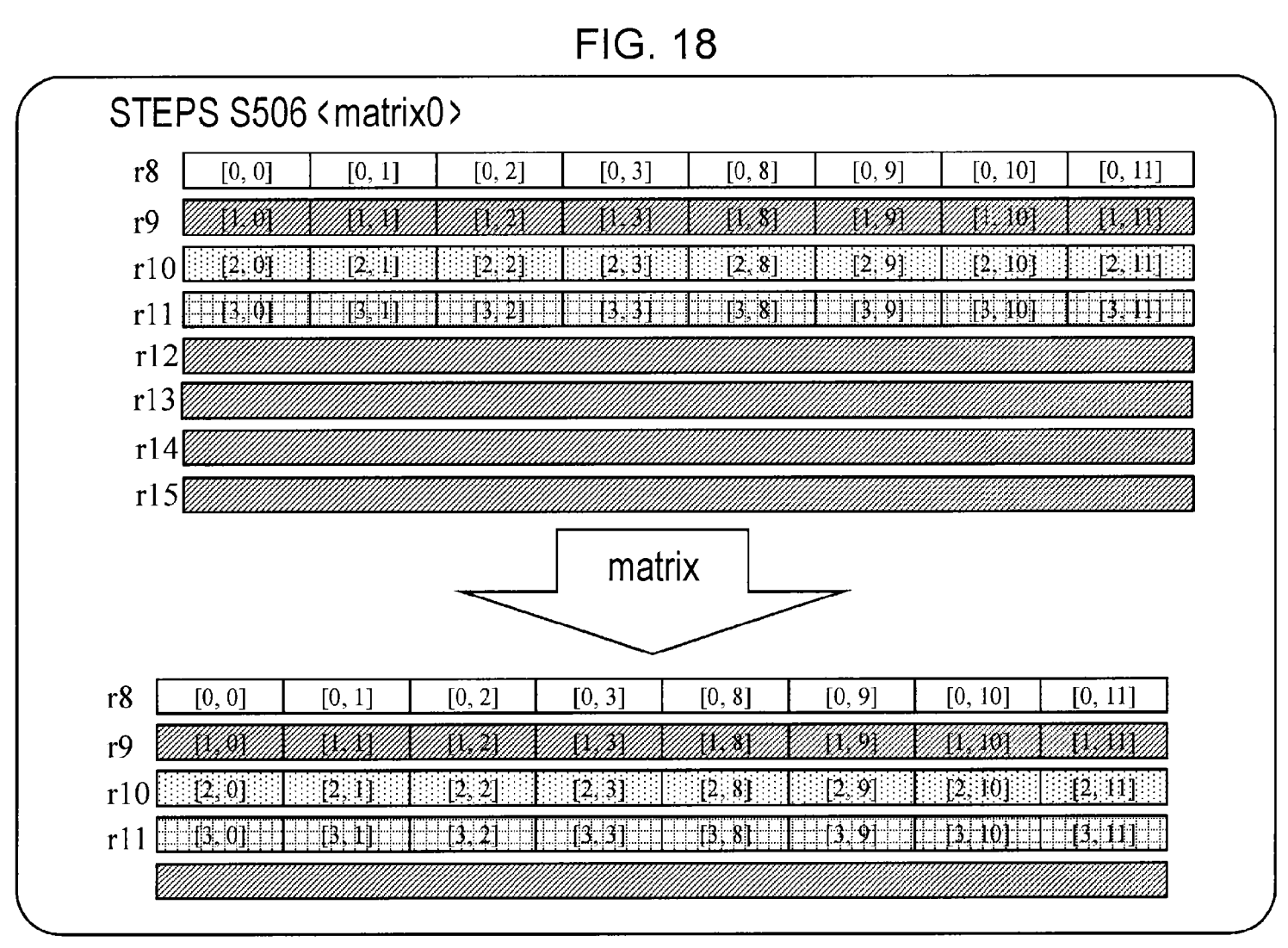

Next, in Step S506, as shown in FIG. 18, the linear conversion process, that is, the linear conversion process according to the matrix (M) is executed.

As shown in FIG. 18, the results of the linear conversion process according to a matrix0 are calculated, using the data items in the registers r8, r9, r10, and r11 and the registers r12, r13, r14, and r15. This output is stored in the registers r8, r9, r10, and r11.

This matrix process corresponds to the process of the matrix in the F function of the algorithm Piccolo shown in FIG. 6, that is, the matrix (M) shown in FIG. 7.

In addition, the matrix process in Step S506 will be described later in detail.

Next, Step S507 is the same as the process in Step S505 described above, as shown in FIG. 16, the nonlinear conversion process (Sbox) with respect to the storage data in the registers r8, r9, r10, r11 and r12 is executed. The process results are stored in the registers r8, r9, r10, and r11.

The nonlinear conversion process (Sbox) corresponds to the process of Sbox in the F function of the algorithm Piccolo shown in FIG. 6 and corresponds to the process of Sbox at the back stage of the matrix (M) shown in FIG. 7.

Figure 19:
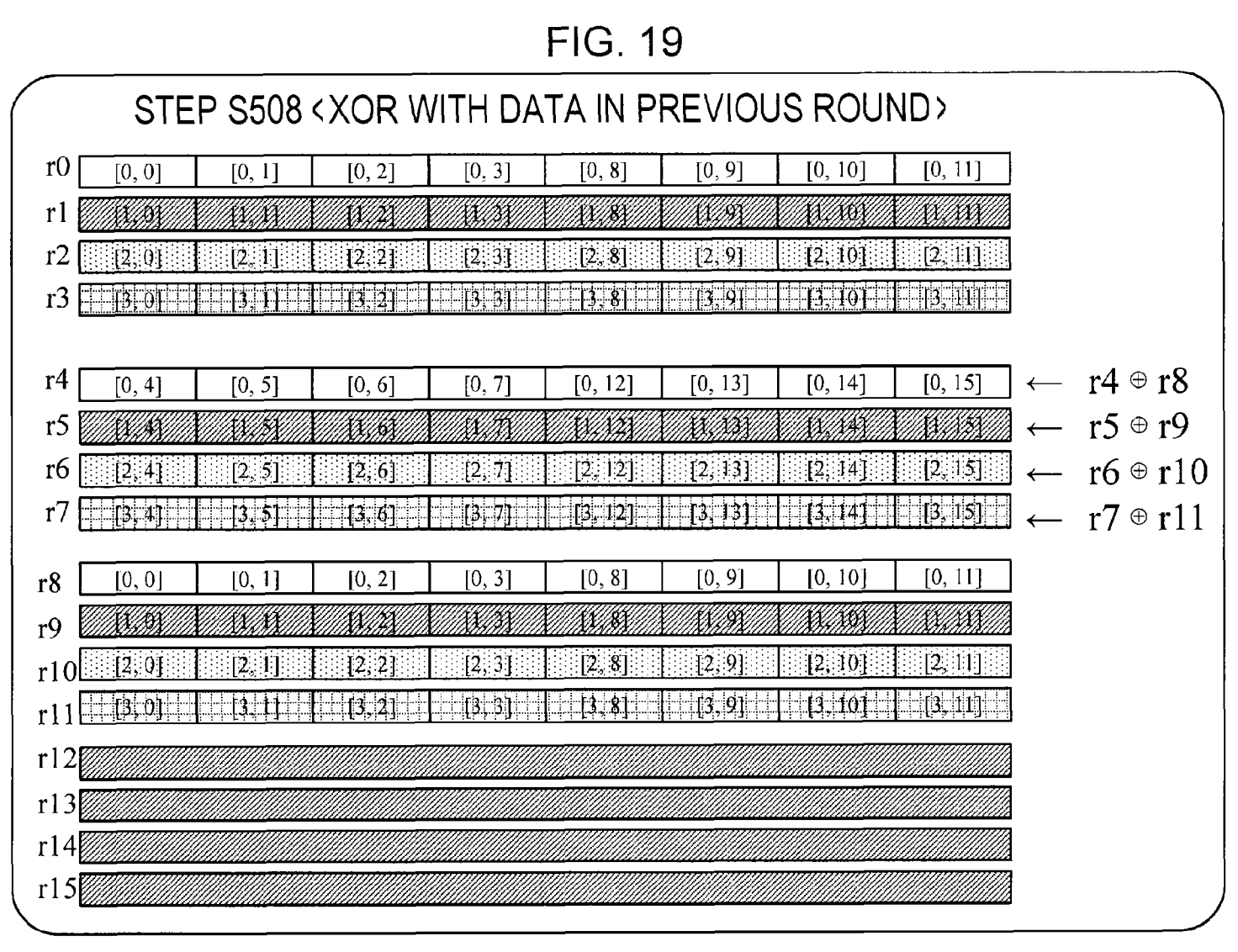

Next, in Step S508, as shown in FIG. 19, the exclusive-OR operation (XOR) of the registers r4, r5, r6, and r7 and the registers r8, r9, r10, and r11 is executed. The calculation results are stored in the registers r4, r5, r6, and r7.

Figure 20:
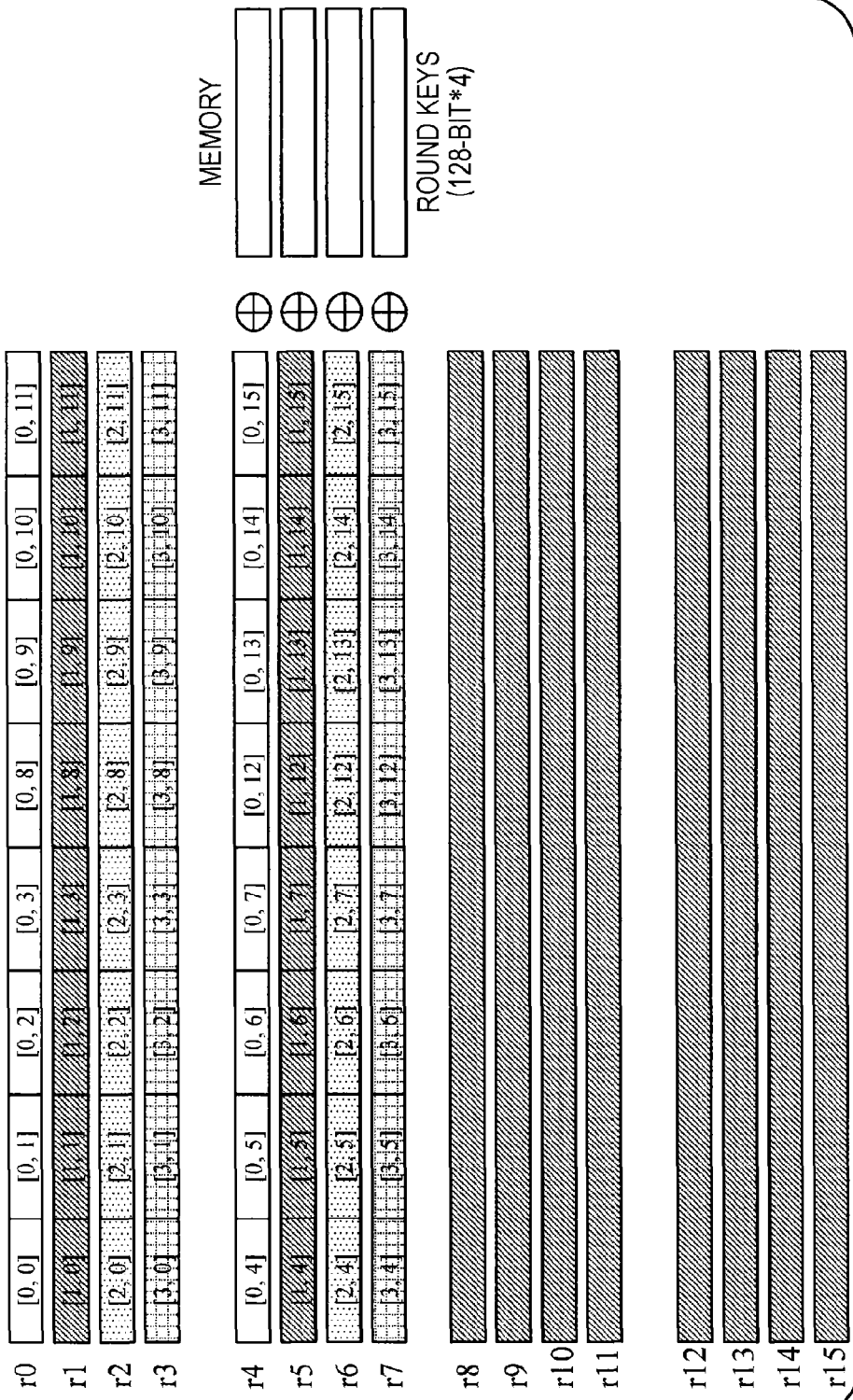
FIG. 20 is a diagram illustrating register storage data at the time of executing a cryptographic process and a data process example.

Next, in Step S509, as shown in FIG. 20, the exclusive-OR operation (XOR) of the storage data items in the registers r4, r5, r6, and r7 and the round keys in the memory indicated by the key pointer pt is calculated and the results are stored in the registers r4, r5, r6, and r7.

In addition, when using the keys, 64 bits are added to the key pointer pt in order to set the address of the next key to be used.

The processes in Steps S508 and S509 are processes corresponding to two exclusive-OR operations (XOR) with respect to output of two F functions in the same round of the algorithm Piccolo shown in FIG. 6.

Figure 21:
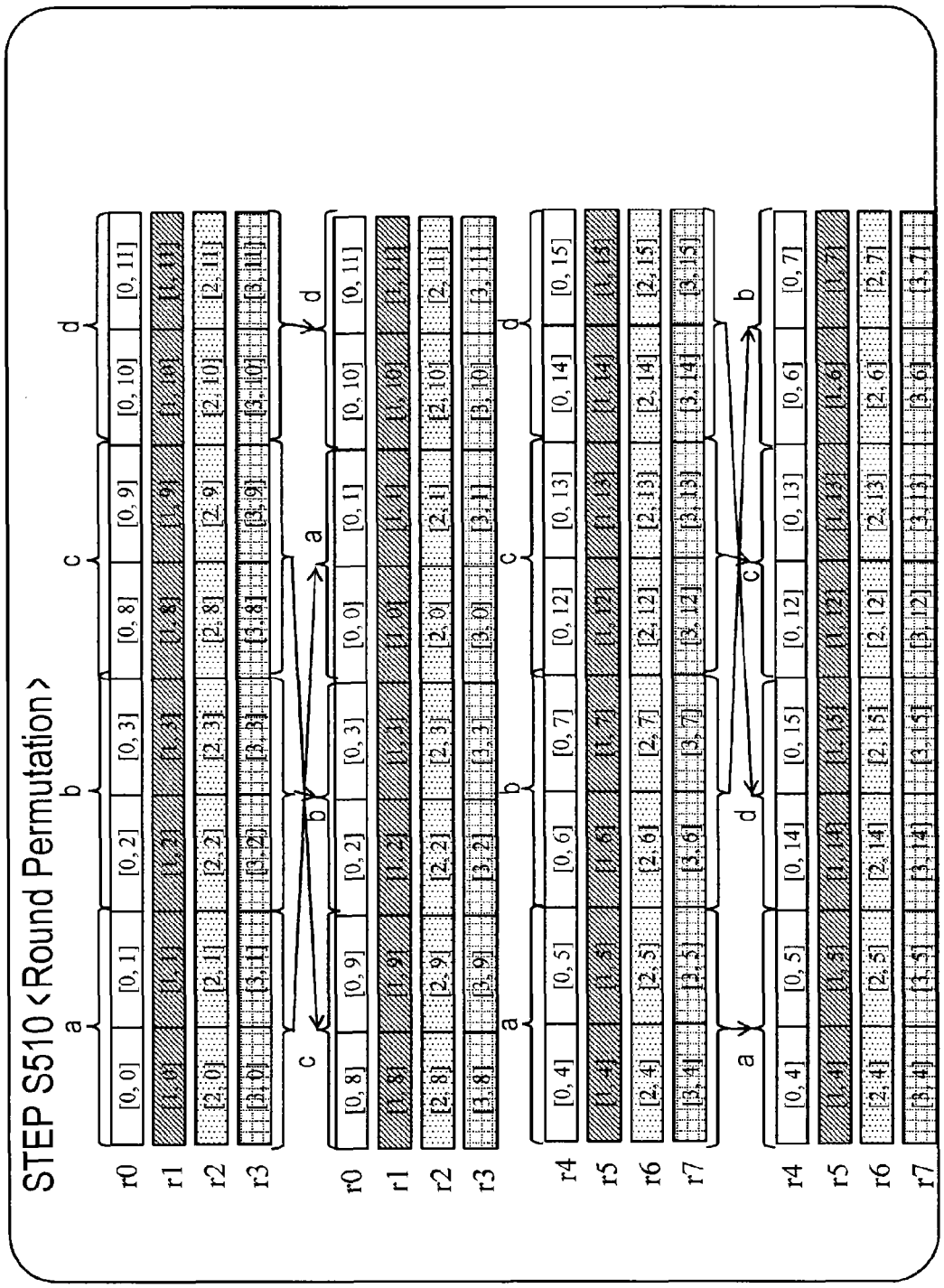
FIG. 21 is a diagram illustrating register storage data at the time of executing a cryptographic process and a data process example.

Next, in Step S510, as shown in FIG. 21, the round permutation process is executed.

As shown in FIG. 21, the round permutation process is performed by executing the shuffling command with respect to the registers r0, r1, r2, r3, r4, r5, r6, and r7.

In addition, the shuffling executed in the apparatus of the present disclosure is a process of replacing the data stored in one register in the block unit and storing the data in the same register. That is, this is a process of replacing the data of the block unit in the register, in the block unit.

As shown in FIG. 21, the following shuffling operation is executed with respect to the register r0.

([0,0], [0,1], [0,2], [0,3], [0,8], [0,9], [0,10], [0,11])→([0,8], [0,9], [0,2], [0,3], [0,0], [0,1], [0,10], [0,11])

That is, as shown in FIG. 21, a process of replacing the order of block assemblies a, b, c, and d of 2-block unit, with the order of c, b, a, and d is performed.

The same shuffling process as the register r0 is also performed with respect to the registers r1, r2, and r3.

In addition, as shown in FIG. 21, the following shuffling operation is executed with respect to the register r4.

([0,4], [0,5], [0,6], [0,7], [0,12], [0,13], [0,14], [0,15])→ ([0,4], [0,5], [0,14], [0,15], [0,12], [0,13], [0,6], [0,7])

That is, as shown in FIG. 21, a process of replacing the order of block assemblies a, b, c, and d of 2-block unit, with the order of a, d, c, and b is performed.

The same shuffling process as the register r5 is also performed with respect to the registers r5, r6, and r7.

This process corresponds to the round permutation (RP) between the rounds of the algorithm "Piccolo" shown in FIG. 6.

In addition, in Step S510, a process of setting the input to the next round is performed.

Figure 22:
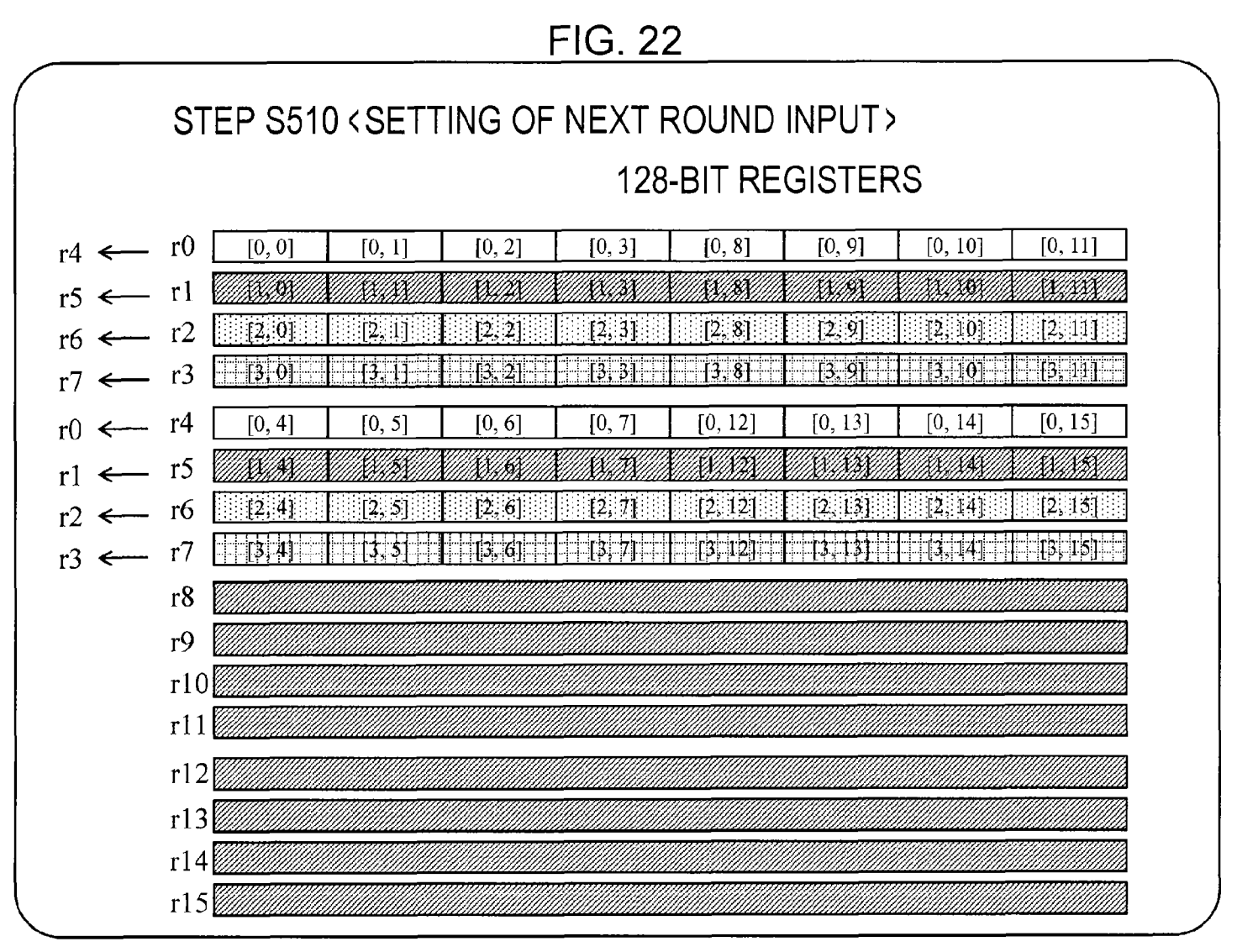

As shown in FIG. 22, the registers r0, r1, r2, and r3 are renamed as the registers r4, r5, r6, and r7. In addition, the registers r4, r5, r6, and r7 are renamed as r0, r1, r2, and r3.

The renamed registers r0 to r7 are set as input with respect to the next round.

Step S511 is executed after the completion of 25 rounds which are all round operations defined by "Piccolo" is determined in Step S503.

In Step S511, the exclusive-OR operation (XOR) of the register storage data and the whitening key is executed.

This process is the same process as the process of FIG. 14 described as the process in Step S502.

The exclusive-OR operation (XOR) of the registers r0, r1, r2, and r3 and the whitening keys in the memory previously calculated by the key scheduling unit is executed, and the results thereof are stored in the registers r0, r1, r2, and r3.

In addition, in the original specification of "Piccolo", the target data items for the first and last exclusive-OR operation (XOR) are different from each other, but in the example, since the process proceeds while renaming the registers r0, r1, r2, and r3 and the registers r4, r5, r6, and r7 for each round, any target data items for performing the first and last XOR are the storage data items in the registers r0, r1, r2, and r3.

As shown in FIG. 23, the setting process of the output data in Step S512 is executed as a process of outputting the registers r0, r1, r2, r3, r4, r5, r6, and r7 as the process results.

The cryptographic process in Step S122 shown in FIG. 8 is executed as the process according to the process flow of FIG. 12.

In Step S123 shown in FIG. 8, the results of the cryptographic process in Step S122 are input. That is, the registers r0, r1, r2, r3, r4, r5, r6, and r7 shown in FIG. 23 are input, and the storage data items are converted into the normal expression from the bit slice expression to be output as the cryptographic text data 91 shown in FIG. 8.

In addition, a function for converting the data from the normal expression to the bit slice expression and a function for converting the data from the bit slice expression to the normal expression is in a relationship of inverse function.

Next, a specific sequence of the matrix operation, that is, the linear conversion process in Step S506 of the flow shown in FIG. 12 will be described with reference to FIG. 24 and the subsequent drawings.

Figure 24:
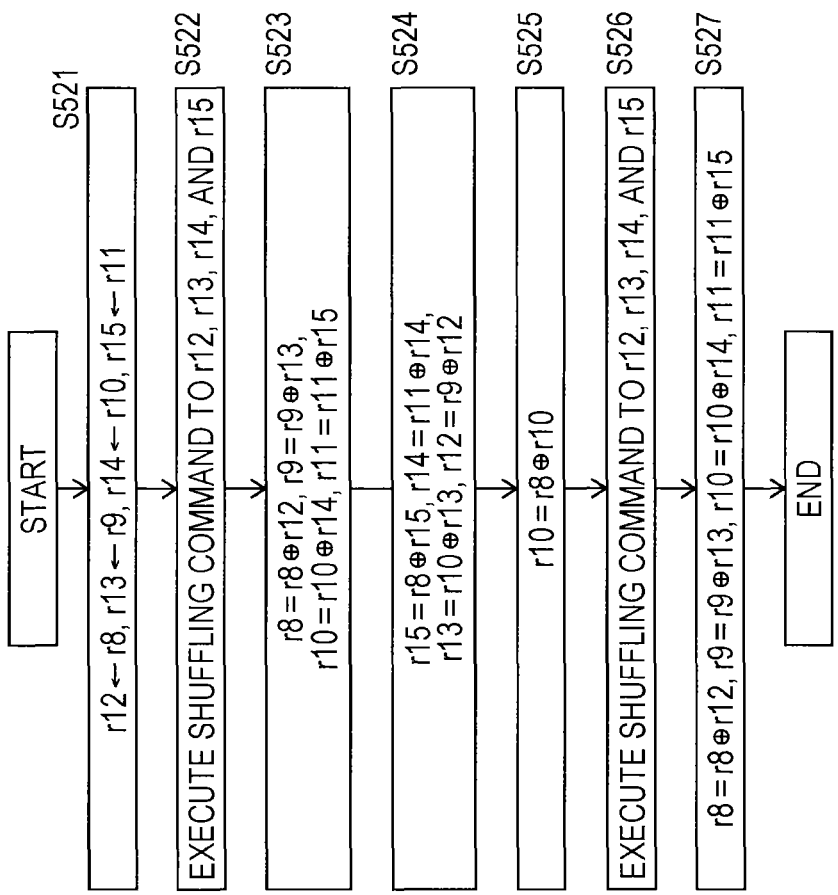
FIG. 24 is a diagram showing a flowchart illustrating a specific sequence of a matrix operation.

FIG. 24 is a flowchart illustrating a specific sequence of the matrix operation in Step S506 of the flow shown in FIG. 12.

In addition, for example, Non Patent Document 3 "Emilia Kasper and Peter Schwabe, "Faster and Timing-Attack Resistant AES-GCM", CHES 2009, LNCS 5747, pp. 1-17, 2009" discloses matrix calculation method of AES bit slice installation. The structure of Piccolo is a GFN type whereas the structure of AES is an SPN type, and the bit slice expression of the former structure has an 8-bit interval whereas the bit slice expression of the latter structure has a 4-bit interval, and therefore the two structures have some different points, but they can both, in the same manner, realize the process according to matrix using the shuffling command and the exclusive-OR operation (XOR) in combination.

When the input is set as a[0] to a[3] and the output is set as b[0] to b[3], the linear conversion process by the matrix of Piccolo is the process according to the following (Formula A).

$$b[3]=(a[2])(\text{XOR})(rot16(a[2]))(\text{XOR})(rot16(a[3]))$$
$$(\text{XOR})(rot32((a[3])(\text{XOR})(rot16(a[3]))))$$

$$b[2]=(a[1])(\text{XOR})(rot16(a[1]))(\text{XOR})(rot16(a[2]))$$
$$(\text{XOR})(rot32((a[2])(\text{XOR})(rot16(a[2]))))$$

$$b[1]=(a[0])(\text{XOR})(rot16(a[0]))(\text{XOR})(rot16(a[1]))$$
$$(\text{XOR})(a[3])(\text{XOR})(rot16(a[3]))(\text{XOR})(rot32((a[1]))(\text{XOR})(rot16(a[1]))))$$

$$b[0]=(a[3])(\text{XOR})(rot16(a[3]))(\text{XOR})(rot16(a[0]))$$
$$(\text{XOR})(rot32((a[0])(\text{XOR})(rot16(a[0])))) \quad \text{(Formula A)}$$

Herein, (a) (XOR) (b) means the exclusive-OR operation (XOR) of a and b.

In addition, hereinafter, the expression formula of matrix of Piccolo used in the example is called matrix0.

a[3], a[2], a[1], and a[0] shown in (Formula A) represent data items stored in four registers as the input data, and each of them corresponds to the data in the registers r0, r1, r2, and r3.

In addition, in (Formula A), rot16 and rot32 represent the following rotation process of the block unit.

When the blocks stored in a 128-bit register rn are set as ([0,0], [0,1], [0,2], [0,3], [0,4], [0,5], [0,6], [0,7]) from the left, rot16 is the following rotation process of the block unit.

rot16: ([0,0], [0,1], [0,2], [0,3], [0,4], [0,5], [0,6], [0,7])→ ([0,1], [0,2], [0,3], [0,0], [0,5], [0,6], [0,7], [0,4])

rot32 is the following rotation process of the block unit.

rot32: ([0,0], [0,1], [0,2], [0,3], [0,4], [0,5], [0,6], [0,7])→ ([0,2], [0,3], [0,0], [0,1], [0,6], [0,7], [0,4], [0,5])

A flowchart shown in FIG. 24 illustrating the specific sequence of the matrix operation in Step S506 of the flow shown in FIG. 12 is a flowchart illustrating a process of setting the input data items a[0] to a[3] shown in (Formula A) as the data items stored in the registers r8 to r11, and calculating the data items of b[0] to b[3] as the matrix operation results to store the data items in the registers r8 to r11.

Figure 25:
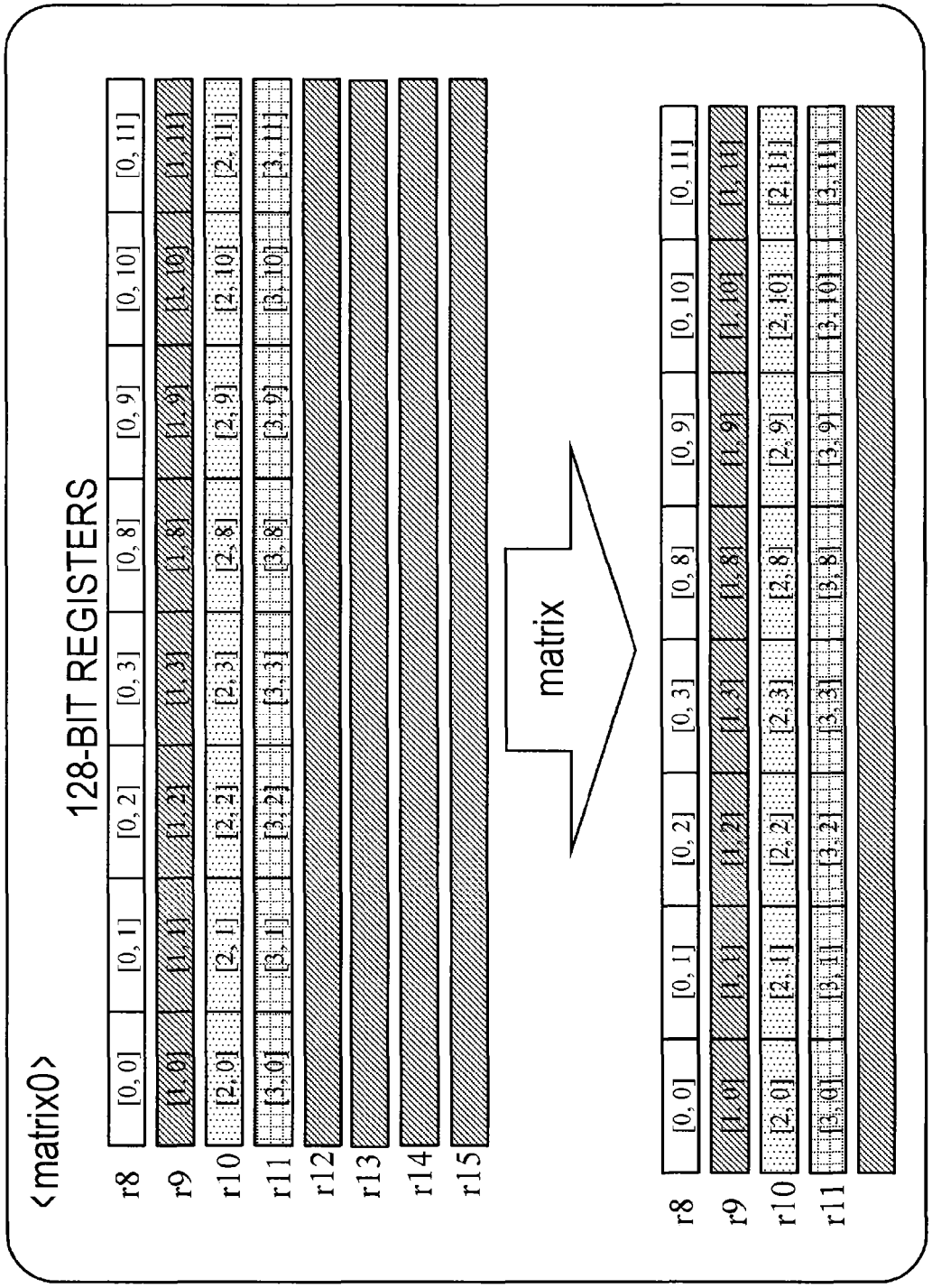
FIG. 25 is a diagram illustrating a process example of a matrix operation.

As shown in the upper part of FIG. 25, the data items (corresponding to a[0] to a[3] of the formula described above) which is the target of the matrix operation process are stored in the registers r8 to r11.

The process in each step of the flow of FIG. 24 is executed as the following process.

(Step S521)

The data items in the registers r8, r9, r10, and r11 are stored in the registers r12, r13, r14, and r15.

(Step S522)

The shuffling command rot16 is executed in the registers r12, r13, r14, and r15.

(Step S523)

The exclusive-OR operation (XOR) of the registers r12, r13, r14, and r15 and the registers r8, r9, r10, and r11 is executed, and the results thereof are stored in the registers r8, r9, r10, and r11.

(Step S524)

The exclusive-OR operation (XOR) of the registers r8, r11, r10, and r9 and the registers r15, r14, r13, and r12 is executed, and the results thereof are stored in the registers r15, r14, r13, and r12.

(Step S525)

The exclusive-OR operation (XOR) of the register r10 and the register r8 is executed, and the result is stored in the register r10.

(Step S526)

The shuffling command rot32 is executed in the registers r8, r9, r10, and r11.

(Step S527)

The exclusive-OR operation (XOR) of the registers r12, r13, r14, and r15 and the registers r8, r9, r10, and r11 is executed, and the results thereof are stored in the registers r8, r9, r10, and r11.

The data items stored in the registers r8, r9, r10, and r11 as the results of the processes, are the results of the linear conversion by matrix0 in Step S506 of the flow of FIG. 12.

[6. Cryptographic Process (Without Round Permutation)]

The cryptographic algorithm [Piccolo] described above with reference to FIG. 6 and FIG. 7 can have two configurations of executing or not executing the round permutation as the replacement process of the input and output data items between the rounds.

In [5. Cryptographic Process (With Round Permutation)] described above, the configuration example of executing the round permutation which is the replacement process of the input and output data items between the rounds has been described.

Hereinafter, a configuration example of not executing the round permutation will be described.

In the process example, in the cryptographic process (Data Processing) in Step S122, the cryptographic processing unit 110 shown in FIG. 8 executes the cryptographic according to algorithm Piccolo for not executing the round permutation, as the cryptographic process using the block configuring the bit slice expression data generated by the bit slice process in Step S121 as a unit.

This cryptographic process will be described in detail, with reference to FIG. 26 and the subsequent drawings.

Figure 26:
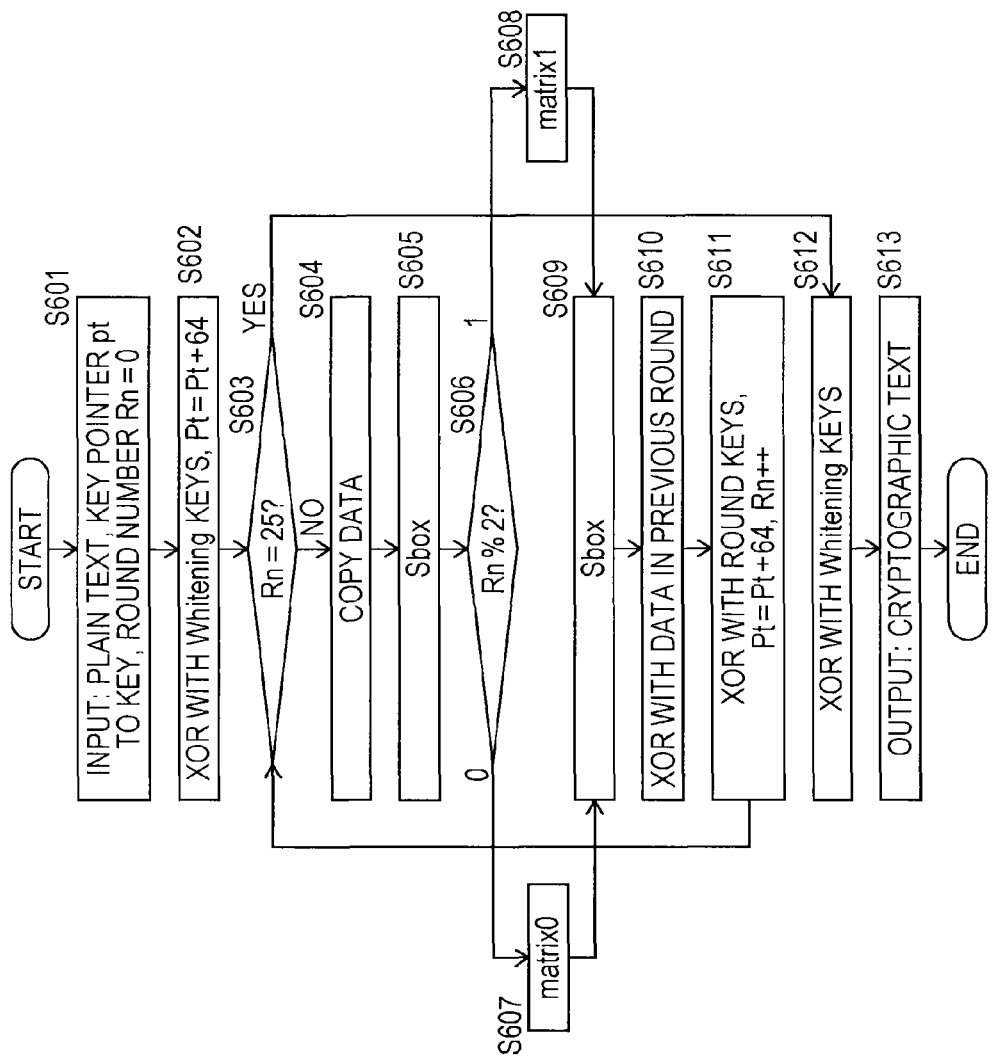
FIG. 26 is a diagram showing a flowchart illustrating a specific sequence of a cryptographic process.

A flowchart shown in FIG. 26 is a flowchart illustrating a specific sequence of the process in Step S122 executed by the cryptographic processing unit 110 shown in FIG. 8, that is, the cryptographic process.

The main differences between the flow shown in FIG. 26 and the cryptographic process sequence according to algorithm Piccolo for executing the round permutation described above with reference to FIG. 12 are two points described below.

(1) The round permutation process in Step S510 shown in FIG. 12 is omitted.

(2) For the matrix0 that is, the linear conversion process in Step S506 of the flow of FIG. 12, two different linear conversion processes which are the same process of switching and using two types of matrices (matrix0, 1) according to the value of the round number Rn, are executed.

The switching and using process of the two types of matrices (matrix0, 1) is set as follows.

matrix0 when the round number Rn is divisible by 2
matrix1 when the round number Rn is not divisible by 2

The switching of the matrices are performed with the setting described above.

However, in the configuration of the present disclosure, the matrix application process is executed with the operation of the block unit. The aspect of this operation process is changed according to the rounds.

In addition, the data conversion by matrix0 applied when the round number Rn is divisible by 2, is the process according to (Formula A) described above.

That is, a process in Step S607 of the flow of FIG. 26, that is, the data conversion by matrix0 applied when the round number Rn is divisible by 2, is the same process as described above with reference to the flowchart of FIG. 24.

Meanwhile, when the input is set as a[0] to a[3] and the output is set as b[0] to b[3], the linear conversion process according to matrix1 applied when the round number Rn is not divisible by 2, is the process according to the following (Formula B).

$$b[3] = (shf0(a[2]))(XOR)(shf1(a[2]))(XOR)(shf1(a[3]))$$
$$(XOR)(shf2(shf0(a[3]))(XOR)(shf1(a[3])))$$
$$b[2] = (shf0(a[1]))(XOR)(shf1(a[1]))(XOR)(shf1(a[2]))$$
$$(XOR)(shf2(shf0(a[2]))(XOR)(shf1(a[2])))$$

(Formula B)

-continued $b[1] = (shf0(a[0]))(XOR)(shf1(a[0]))(XOR)$ $(shf1(a[1]))(XOR)(shf0(a[3]))(XOR)(shf1(a[3]))$ $(XOR)(shf2(shf0(a[1]))(XOR)(shf2(a[1])))$ $b[0] = (shf0(a[3]))(XOR)(shf1(a[3]))(XOR)(shf1(a[0]))$ $(XOR)(shf2(shf0(a[0]))(XOR)(shf1(a[0])))$ Herein, in (Formula B), (a) (XOR) (b) means the exclusive-OR operation (XOR) of a and b.

In addition, shuffling processes shf0, shf1, and shf2 are defined as follows.

The storage data in the register before the shuffling is set as follows, in the block (bit slice expression block) unit.

([0,0], [0,1], [0,2], [0,3], [0,4], [0,5], [0,6], [0,7])

At that time, the shuffling processes shf0, shf1, and shf2 are defined as follows.

shf0: ([0,0], [0,1], [0,2], [0,3], [0,4], [0,5], [0,6], [0,7])→ ([0,4], [0,5], [0,6], [0,7], [0,0], [0,1], [0,2], [0,3])

shf1: ([0,0], [0,1], [0,2], [0,3], [0,4], [0,5], [0,6], [0,7])→ ([0,5], [0,2], [0,7], [0,0], [0,1], [0,6], [0,3], [0,4])

shf2: ([0,0], [0,1], [0,2], [0,3], [0,4], [0,5], [0,6], [0,7])→ ([0,6], [0,7], [0,4], [0,5], [0,2], [0,3], [0,0], [0,1])

Figure 27:
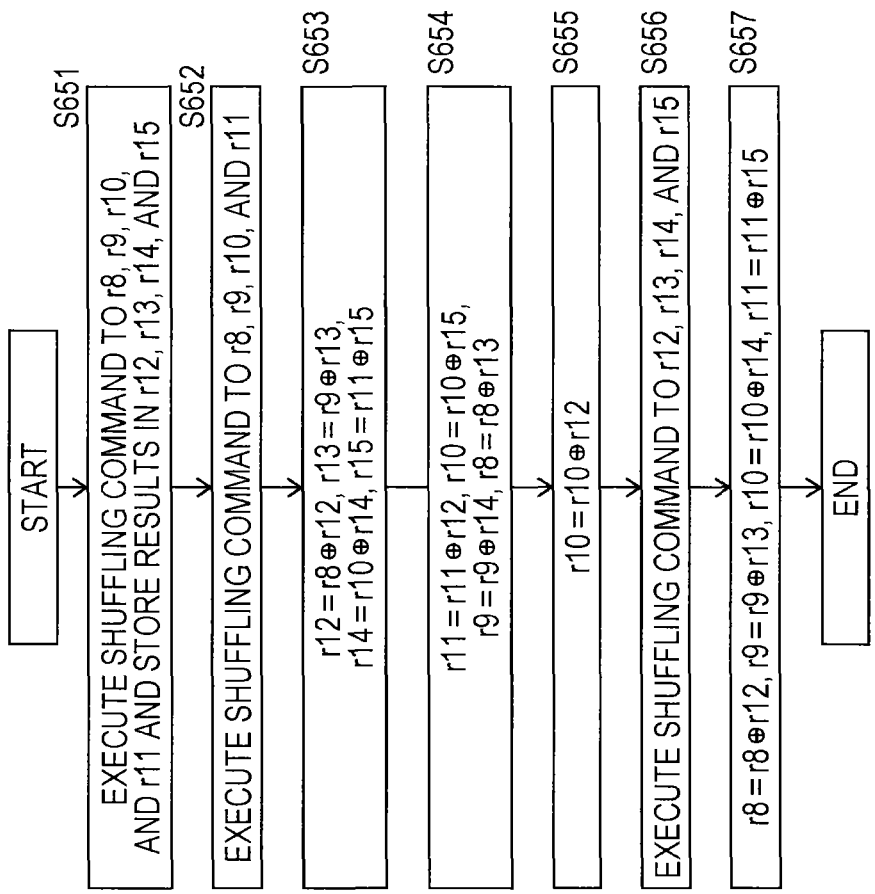
FIG. 27 is a diagram showing a flowchart illustrating a specific sequence of a matrix operation.

A process in Step S608 shown in the flow of FIG. 26, that is, the data conversion process by matrix1 applied when the round number Rn is not divisible by 2, is the process according to the flowchart of FIG. 27.

The flowchart shown in FIG. 27 corresponds to the flow illustrating the process of setting the input data items a[0] to a[3] shown in (Formula B) as the data items stored in the registers r8 to r11, and calculating the data items of b[0] to b[3] as the matrix operation results to store the data items in the registers r8 to r11.

As shown in the upper part of FIG. 25, the data items (corresponding to a[0] to a[3] of the formula described above) which are the target of the matrix operation process are stored in the registers r8 to r11.

The process in each step of the flow of FIG. 27 is executed as the following process.

(Step S651)

The shuffling command shf0 is executed to the data items in the registers r8, r9, r10, and r11 and the data items are stored in the registers r12, r13, r14, and r15.

(Step S652)

The shuffling command shf1 is executed to the data items in the registers r8, r9 , r10, and r11.

(Step S653)

The exclusive-OR operation (XOR) of the registers r8, r9, r10, and r11 and the registers r12 , r13, r14, and r15 is executed, and the results thereof are stored in the registers r12, r13, r14, and r15.

(Step S654)

The exclusive-OR operation (XOR) of the registers r11, r10, r9, and r8 and the registers r12, r15, r14, and r13 is executed, and the results thereof are stored in the registers r11, r10, r9, and r8.

(Step S655)

The exclusive-OR operation (XOR) of the register r10 and the register r12 is executed, and the result is stored in the register r10.

(Step S656)

The shuffling command shf2 is executed to the data items in the registers r8, r9, r10, and r11.

(Step S657)

The exclusive-OR operation (XOR) of the register r12, r13, r14, and r15 and the registers r8, r9, r10, and r11 is executed, and the results thereof are stored in the registers r8, r9, r10, and r11.

The data items stored in the registers r8, r9, r10, and r11 as the results of the processes, are the results of the linear conversion by matrix1 in Step S608 of the flow of FIG. 26.

[7. Key Scheduling Process]

Next, the process in Step S112 executed by the cryptographic processing unit 110 shown in FIG. 8, that is, the key scheduling process will be described in detail.

The key scheduling process (Key Scheduling) in Step S112 is a process of generating the whitening keys or the round keys to be used in the cryptographic process, by using the bit slice expression key blocks generated in the key conversion process (Key Conversion) in Step S111.

First, as described above with reference to FIG. 9 and FIG. 10, the bit slice expression key data items of 16 80-bit keys are dispersed and stored in the registers by the key conversion process in Step S111.

In Step S112, a generation process of the whitening keys or the round keys is performed using the bit slice expression key data items stored in the registers.

In addition, the key scheduling process of the cryptographic algorithm "Piccolo" is disclosed in Non Patent Document 4 "Kyoji Shibutani, Takanori Isobe, Harunaga Hiwatari, Atsushi Mitsuda, Toru Akishita, and Taizo Shirai, "Piccolo: An Ultra-Lightweight Block Cipher", CHES 2011, LNCS6917, pp. 342-357, 2011".

Specification of the key scheduling unit disclosed in this document is as follows.

An 80-bit key K is divided into five sub-keys k0, k1 , k2, k3, and k4 (each sub-key has 16 bits).

$K = k0|k1|k2|k3|k4$

Whitening keys wk0, wk1, wk2, wk3, and a round key rk_j ($0 \le j < 50$) are generated from the sub-keys by the following algorithm.

$wk0 \leftarrow k0(L)|k1(R),$ [Expression 1]

$wk1 \leftarrow k1(L)|k0(R),$ $wk2 \leftarrow k4(L)|k3(R),$ $wk3 \leftarrow k3(L)|k4(R)$ for $i \leftarrow 0$ to 24 do $(rk\_2i, rk\_(2i+1)) \leftarrow (con80\_2i, con80\_(2i+1)) \oplus$ $\begin{cases} (k2, k3) & \text{if } i \bmod 5 = 0 \text{ or } 2 \\ (k0, k1) & \text{if } i \bmod 5 = 1 \text{ or } 4 \\ (k4, k4) & \text{if } i \bmod 5 = 3 \end{cases}$ In addition, in the formula described above, ki(L) and ki(R) each represent left eight bits and right eight bits.

$Ki = ki(L)|ki(R)$

A constant con80_x is calculated by the following algorithm.

for $i \leftarrow 0$ to 24 do $(con80\_2i|con80\_(2i+1)) \leftarrow (c\_(i+1)|c\_0|c\_(i+1) |\{00\}2|c\_(i+1)|c\_0|c\_(i+1))?\{0f1e2d3c\}$ Herein, c_i shows i in 5-bit expression. For example, c_11={01011}$_2$ In the example, the 16 80-bit keys are converted into the bit slice expression as described above with reference to FIG. 9 and FIG. 10, and are stored in 12 128-bit registers.

In Step S112, the cryptographic processing unit 110 of FIG. 8 performs a process of executing the key scheduling process using the bit slice expression key data stored in the registers, and generating the whitening keys or the round keys to write the keys in the memory.

Regarding the keys generated in the key scheduling process in Step S112, first, two round keys rk__2i and rk_(2i+1) are stored in one register. As described above with reference to FIG. 9 and FIG. 10, since the bit slice expression data generated in the process example is the bit slice expression data stored by sequentially switching the four registers with a 4-bit interval, the total number of registers for storing the round keys rk__2i and rk_(2i+1) is four.

Figure 28:
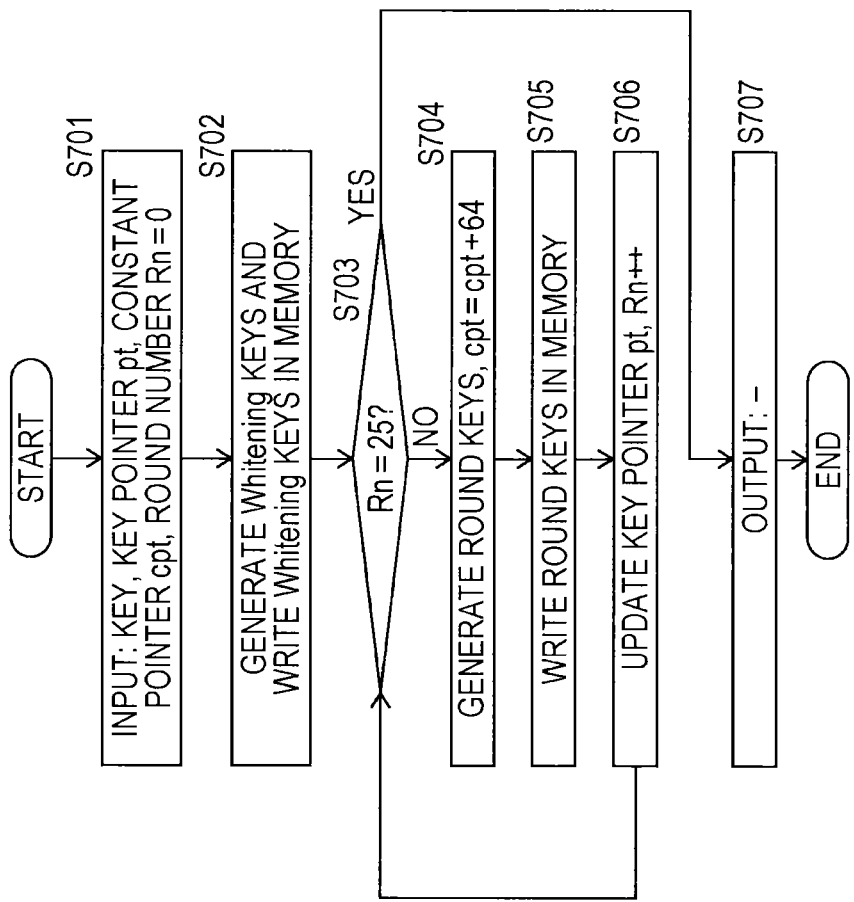
FIG. 28 is a diagram showing a flowchart illustrating a process sequence of a key scheduling process.

FIG. 28 shows a process flow of the key scheduling process of generating the keys (whitening keys and the round keys) used in the cryptographic process of executing the round permutation which is to be executed in [5. Cryptographic Process (With Round Permutation)] described above.

Figure 29:
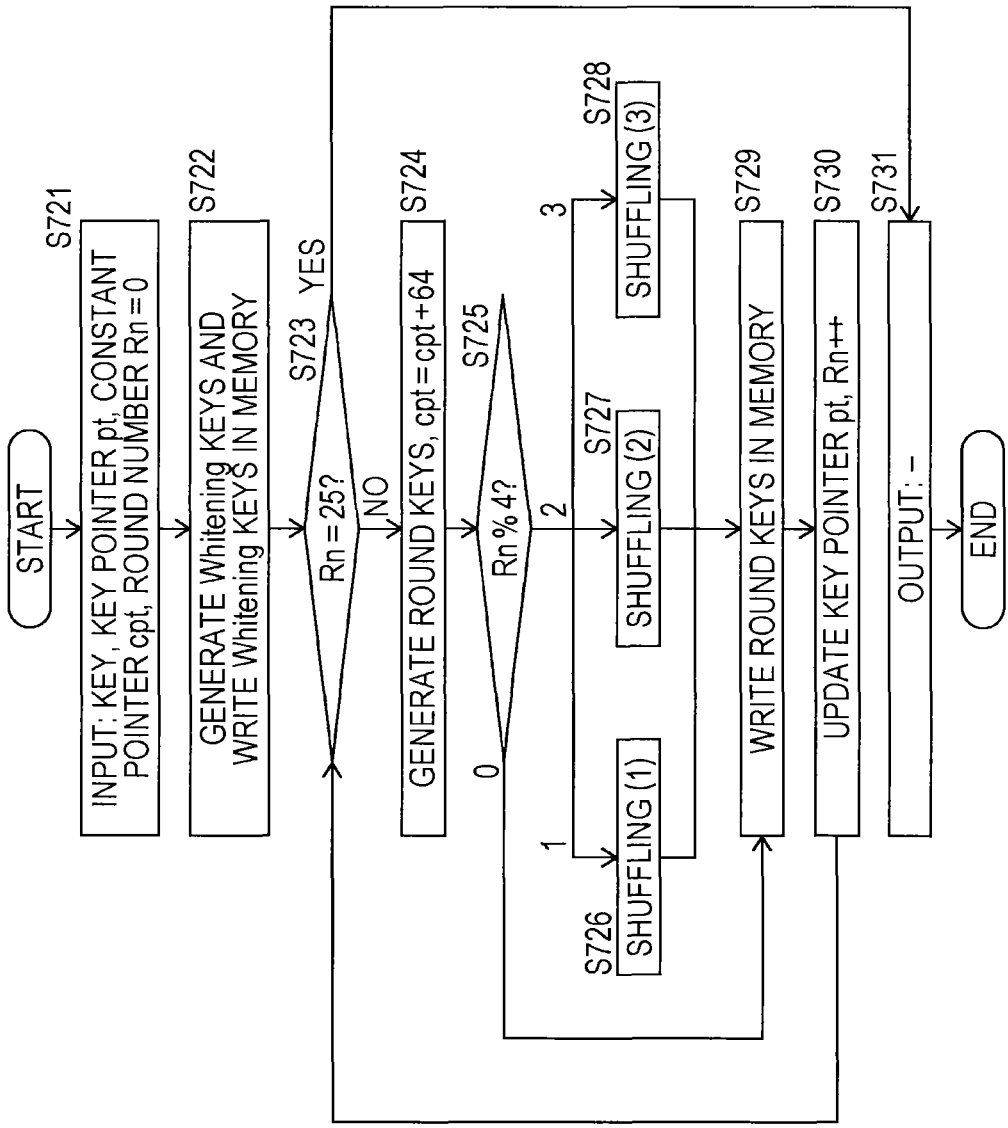
FIG. 29 is a diagram showing a flowchart illustrating a process sequence of a key scheduling process.

In addition, FIG. 29 shows a process flow of the key scheduling process of generating the keys (whitening keys and the round keys) used in the cryptographic process of not executing the round permutation which is to be executed in [6. Cryptographic Process (Without Round Permutation)].

A difference between the flows shown in FIG. 28 and FIG. 29 is presence and absence of the process of executing the shuffling operation according to the value of the round key Rn, and the other processes are in common.

The key data to be input when starting the key scheduling process in Step S112 of FIG. 8 is data shown in FIG. 30.

The data shown in FIG. 30 is the bit slice expression key data items of 16 80-bit key data items described above with reference to FIG. 9 and FIG. 10.

All registers r0 to r15 are 128-bit registers.

The data of first to 32$^{nd}$ bits of the 16 80-bit key data items are stored in the register r0 to r3.

The data of 33$^{rd}$ to 64$^{th}$ bits of the 16 80-bit key data items are stored in the register r4 to r7.

The data of 65$^{th}$ to 80$^{th}$ bits of the 16 80-bit key data items are stored in the register r8 to r11.

The data of 65$^{th}$ to 80$^{th}$ bits of the 16 80-bit key data items are stored in the first 64-bit areas of the registers r8 to r11, and the copied data items thereof are also retained in the last 64-bit areas thereof.

As described above, the bit slice expression key data items are stored in the registers r0, r1, r2, r3, r4, r5, r6, r7, r8, r9, r10, and r11.

The sub-keys k0 and k1 are stored in the registers r0, r1, r2, and r3, the sub-keys k2 and k3 are stored in the registers r4, r5, r6, and r7, and the sub-keys k4 and k4 are stored in the registers r8, r9, r10, and r11.

That is, the sub-keys correspond to five sub-keys k0, k1, k2, k3, and k4 generated by dividing the 80-bit key K disclosed in Non Patent Document 4.

The whitening keys wk0, wk1, wk2, wk3 and the round key rk_j (0≦j<50) are generated from the sub-keys.

Since the sub-key to be used changes depending on the round number, the group of the registers (r0, r1, r2, r3), (r4, r5, r6, r7) and (r8, r9 , r10, r11) are appropriately designated.

The process of each step of the flow shown in FIG. 28 and the flow shown in FIG. 29 will be described in detail. The common process will be collectively described.

(Steps S701 and S721)

In Step S701 shown in the flow of FIG. 28 and in Step S721 of the flow of FIG. 29, the input of data necessary for the key scheduling process and initial setting are performed.

The input data is the bit slice expression key data shown in FIG. 30.

In addition, the generated whitening keys, a pointer (pt) and a constant pointer (cpt) indicating a memory area for writing the round key, and the round number Rn of the round key to be generated are set. Rn is set as 0, in the initial setting, and subsequently Rn increases to 1, 2, 3, . . . and 25, and 25 round keys are generated.

(Step S702 and Step S722)

In Step S702 shown in the flow of FIG. 28 and in Step S722 of the flow of FIG. 29, a process of generating the whitening keys and writing the whitening keys in the memory is executed.

Figure 31:
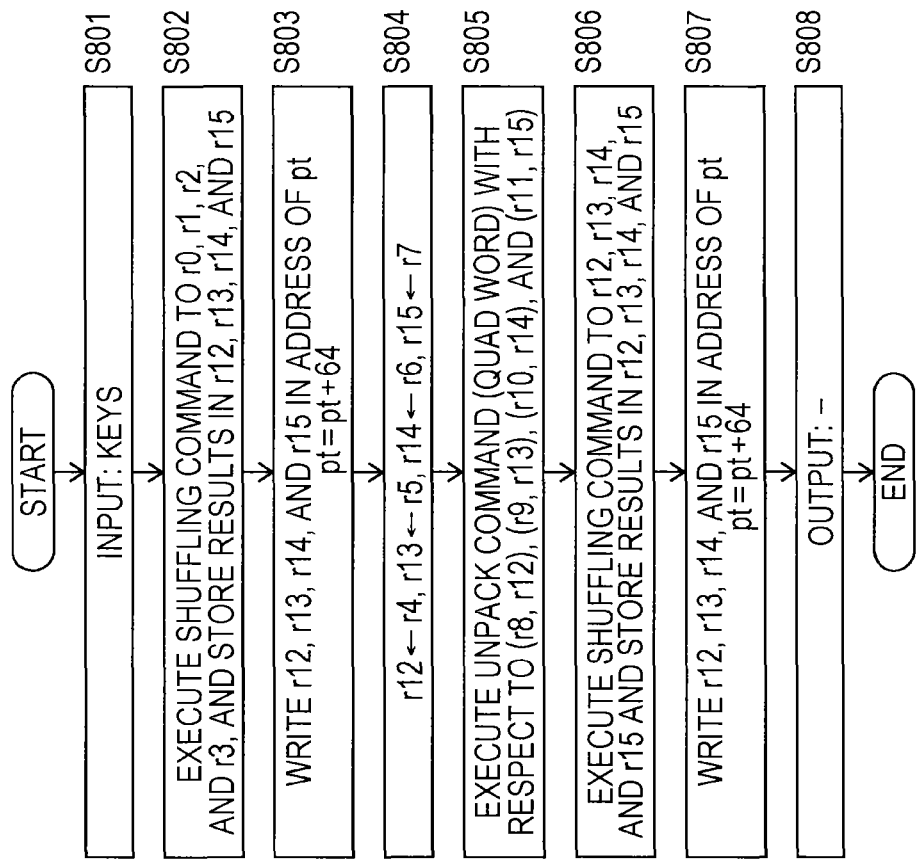
FIG. 31 is a diagram showing a flowchart illustrating a specific sequence of generation of a whitening key and a writing process of the whitening key in a memory.

A flow of FIG. 31 shows a specific sequence of the process of generating the whitening keys and writing the whitening keys in the memory.

The process of each step of the flow of FIG. 31 will be described.

(Step S801)

In Step S801, the bit slice expression key data items stored in the registers in Step S701 of the flow of FIG. 28 and Step S721 of the flow of FIG. 29 are input.

(Step S802)

The shuffling command is executed to the registers r0, r1, r2, and r3, and the results are stored in the registers r12, r13, r14, and r15.

When the bit slice expression blocks stored in each register are set as ([0,0], [0,1], [0,2], [0,3], [0,4], [0,5], [0,6], [0,7]) from the head, the shuffling pattern is as follows.

([0,0], [0,1], [0,2], [0,3], [0,4], [0,5], [0,6], [0,7])→([0,0], [0,1], [0,6], [0,7], [0,4], [0,5], [0,2], [0,3])

(Step S803)

The content of the registers r12, r13, r14, and r15 are written in the memory area indicated by the key pointer pt, and 64 bits are added to the key pointer pt.

(Step S804)

The registers r4, r5, r6, and r7 are copied to the registers r12, r13, r14, and r15.

(Step S805)

The unpacking command is executed with respect to left 64 bits of the registers r8, r9, r10, and r11 and the registers r12, r13, r14, and r15 in a quad word unit, and the results are stored in the registers r12, r13, r14, and r15.

In addition, the unpacking process in the process of the present disclosure is a process of selecting the data stored in two registers, for example, from a high order or a low order using the block as a minimum unit, and alternately storing the data in one register of the two registers.

In detail, for example, this is a process of selecting half blocks of all blocks stored in each register from two registers, and storing the blocks in one register again.

(Step S806)

The shuffling command is executed to the registers r12, r13, r14, and r15 and the results are stored in the registers r1, r13, r14, and r15.

When the bit slice expression blocks stored in each register are set as ([0,0], [0,1], [0,2], [0,3], [0,4], [0,5], [0,6], [0,7]) from the head, the shuffling pattern is as follows.

([0,0], [0,1], [0,2], [0,3], [0,4], [0,5], [0,6], [0,7])→([0,4], [0,5], [0,2], [0,3], [0,0], [0,1], [0,6], [0,7])

(Step S807)

The content of the registers r12, r13, r14, and r15 are written in the memory area indicated by the key pointer pt, and 64 bits are added to the key pointer pt.

(Step S808)

The key data written in the memory area indicated by the key pointer pt is set as the whitening key.

With such processes, in Step S702 shown in the flow of FIG. 28 and Step S722 of the flow of FIG. 29, the process of generating the whitening keys and writing the whitening keys in the memory is executed.

(Step S703 and Step S723)

In Step S703 shown in the flow of FIG. 28 and Step S723 of the flow of FIG. 29, it is determined whether or not the round number Rn has reached 25.

In a case where the round number Rn has reached 25, the process proceeds to Step S707 in the flow of FIG. 28 and the process proceeds to Step S731 in the flow of FIG. 29, and the generated key is output to end the process.

In a case where the round number Rn has not reached 25, the process proceeds to Step S704 in the flow of FIG. 28 and the process proceeds to Step S724 in the flow of FIG. 29.

(Step S704 and Step S724)

In Step S704 shown in the flow of FIG. 28 and Step S724 of the flow of FIG. 29, a generation process of the round key is performed.

The input data is any of the registers (r0, r1, r2, r3), (r4, r5, r6, r7) and (r8, r9, r10, r11) (each corresponds to sub keys (k0, k1), (k2, k3), and (k4,k4)) and the temporary registers r12, r13, r14, and r15.

Herein, a process in which the registers r0, r1, r2, and r3 are selected will be described as an example.

The generation process of the round key is executed according to the following process procedures (process 1) to (process 3).

(process 1) The registers r0, r1, r2, and r3 are copied to the registers r12, r13, r14, and r15.

(process 2) The exclusive-OR operation (XOR) of the data in the memory area indicated by the constant pointer cpt, and the registers r12, r13, r14, and r15 and the results thereof are stored in the registers r12, r13, r14, and r15.

(process 3) The constant pointer is updated as cpt=cpt+64.

The data items stored in the registers r12, r13, r14, and r15 by the processes described above are set as the round keys.

(Steps S725 to S728 shown in FIG. 29)

Steps S725 to S728 shown in FIG. 29 are unique processes in the key scheduling process in a case of using the algorithm for not executing the round permutation.

In the key scheduling process of not executing the round permutation, the shuffling command is executed with respect to the round keys generated according to the round number Rn.

In this case, when a remainder of 0 is obtained by dividing the round number Rn by 4 in Step S725 of the flow of FIG. 29, the shuffling process is not executed and the process proceeds to Step S729.

When a remainder thereof is 1, the process proceeds to Step S726 and the shuffling (1) is executed.

When a remainder thereof is 2, the process proceeds to Step S727 and the shuffling (2) is executed.

When a remainder thereof is 3, the process proceeds to Step S728 and the shuffling (3) is executed.

In detail, in the shuffling (1) to (3) in Steps S726 to S728, the shuffling having the following patterns is executed with respect to the registers r12, r13, r14, and r15 in which the round keys generated in Step S724 of the flow of FIG. 29 are stored.

Arrangement of the storage blocks in the registers r12, r13, r14, and r15 from the head is set as follows.

([0,0], [0,1], [0,2], [0,3], [0,4], [0,5], [0,6], [0,7])

Shuffling (1):

([0,0], [0,1], [0,2], [0,3], [0,4], [0,5], [0,6], [0,7])→([0,4], [0,5], [0,2], [0,3], [0,0], [0,1], [0,6], [0,7])

Shuffling (2):

([0,0], [0,1], [0,2], [0,3], [0,4], [0,5], [0,6], [0,7])→([0,4], [0,5], [0,6], [0,7], [0,0], [0,1], [0,2], [0,3])

Shuffling (3):

([0,0], [0,1], [0,2], [0,3], [0,4], [0,5], [0,6], [0,7])→([0,0], [0,1], [0,6], [0,7], [0,4], [0,5], [0,2], [0,3])

(Step S705 and Step S729)

In Step S705 shown in the flow of FIG. 28 and Step S729 of the flow of FIG. 29, a process of writing the round keys in the memory is performed.

The data items in the registers r12, r13, r14, and r15 are written in the memory areas indicated by the key pointer pt.

(Step S706 and Step S730)

In Step S706 shown in the flow of FIG. 28 and Step S730 of the flow of FIG. 29, a key pointer updating process of updating the key pointer as the key pointer pt=pt+64 is executed.

(Step S707 and Step S731)

Step S707 shown in the flow of FIG. 28 and Step S731 of the flow of FIG. 29 are processes executed when it is determined that the generation of all round keys is finished (Yes in determination in Step S703 of FIG. 28 and Step S723 of FIG. 29), and are steps of outputting the generated whitening keys and the round keys.

[8. Adjustment of F Function and Adjustment Process of Round Key of Configuration of Present Disclosure]

In the cryptographic process of the present disclosure, as described above, both the data which is the encryption process data and the keys are stored in the registers as the bit slice expression blocks, and operation or movement (shifting or shuffling) of the bit slice expression block unit is executed to perform the process according to the cryptographic algorithm (Piccolo).

The process according to the cryptographic algorithm (Piccolo) described above with reference to FIG. 6 and FIG. 7 is realized by the operation or movement of the bit slice expression block unit.

However, there are some restrictions in the process executable by operation or movement of the bit slice expression block unit. In order to solve a problem due to such restrictions, the process specification such as the linear conversion process (M: Matrix) of the F function, or the process of the application of the round keys, or the permutation are designed to be set so as to obtain the same input and output relationship as the process according to the normal cryptographic algorithm (Piccolo).

The process example will be described with reference to FIG. 32.

Figure 32:
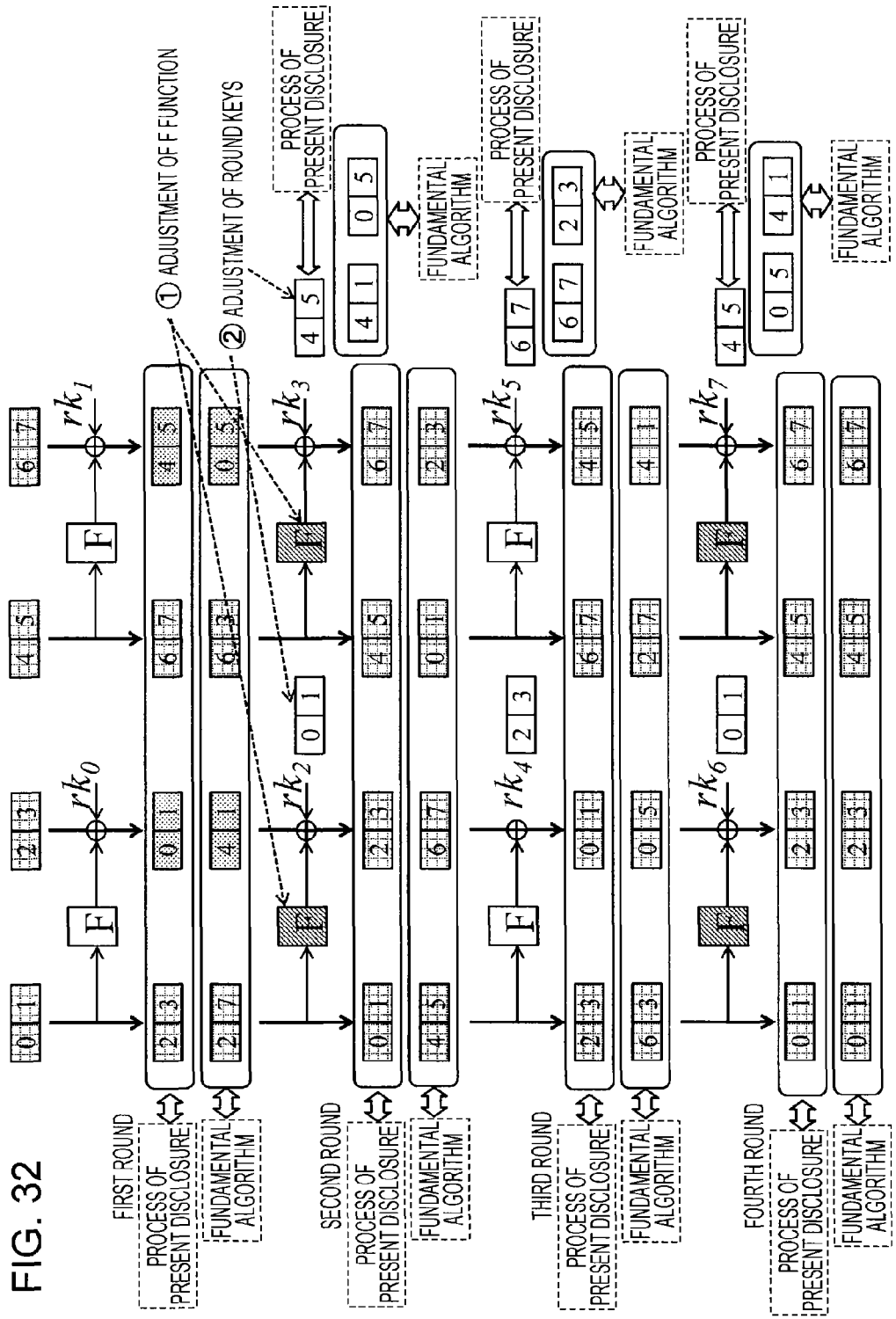
FIG. 32 is a diagram illustrating comparison between a process of the present disclosure and a fundamental algorithm of Piccolo.

FIG. 32 shows four rounds of the cryptographic algorithm [Piccolo] described above with reference to FIG. 6.

The comparison of setting examples of the round keys between the process according to the present disclosure and the input and output of each round of the process according to the fundamental cryptographic algorithm (Piccolo) is shown.

In addition, the process of the present disclosure shown in FIG. 32 corresponds to the process example in a case of not executing the round permutation.

For example, regarding the input, 16-bit data items which are data items obtained by dividing 64 bits by four, are input to four input lines, in both a case of the fundamental algorithm and a case of the process according to the present disclosure.

In the drawing, the 16 bits are divided into two parts of eight bits, and shown as [0], [1], [2], [3], [4], [5], [6], and [7] as described below.

However, in the process of the present disclosure, each of [0], [1], [2], [3], [4], [5], [6], and [7] corresponds to eight blocks of 16 64-bit plain text bit slice blocks.

Between the first round and the second round shown in FIG. 32, the round function including the XOR operation with the F functions or the round keys in the first round is executed, and an arrangement example of the input data items with respect to the second round after the permutation process is shown.

As shown in FIG. 32, the arrangement of the input data items to the second round is set as [2] [3] [0] [1] [6] [7] [4] [5] in the process of the present disclosure, and the arrangement thereof is set as [2] [7] [4] [1] [6] [3] [0] [5] in the fundamental algorithm.

As described above, the arrangement of the data items are different from each other, but after four rounds shown in FIG. 32, the arrangement thereof is set as [0] [1] [2] [3] [4] [5] [6] [7] in the process of the present disclosure and is set as [0] [1] [2] [3] [4] [5] [6] [7] in the fundamental algorithm, in the same manner.

In order to realize the setting described above, in the process of the present disclosure, for example, the setting of the linear conversion process (matrix) executed in the F functions and the round keys to be used in each round is set to be different from that of the fundamental algorithm.

For example, in the example shown in FIG. 32, the matrix to be used in the F function in the even round, and the matrix to be used in the F function in the odd round are changed.

This process corresponds to the process described above with reference to FIG. 26.

In addition, in the example shown in FIG. 32, regarding the round keys to be used in the second round, each 16-bit (in practice, 16 blocks) key of [0] [1] is input to an XOR operation unit on the left side and each key of [4] [5] is input to an XOR operation unit on the right side in the process of the present disclosure, whereas each 16-bit key of [4] [1] is input to an XOR operation unit on the left side and each key of [0] [5] is input to an XOR operation unit on the right side in the fundamental algorithm.

Further, the input round keys [0] [1] and the like with respect to the XOR operation unit show the arrangement of each round key when the key data items of the input keys are expressed as [0] [1] [2] [3] [4] [5] [6] [7] in the unit of eight bits from the head.

Also in the third and fourth rounds, the input aspect of the round keys of the present disclosure is set to be different from that of the fundamental algorithm.

As described above, by setting the linear conversion process (matrix) executed in the F function and the round keys to be used in each round to be different from those of the fundamental algorithm, the final output data items can be output as the data items having the same arrangement, in both cases of the process of the present disclosure and the fundamental algorithm.

[9. Configuration Example of Information Processing Apparatus and Cryptographic Processing Apparatus]

Finally, an apparatus configuration example of the information processing apparatus or the cryptographic processing apparatus which executes the cryptographic process according to the example described above, will be described. The information processing apparatus includes, for example, the server described above with reference to FIGS. 1 to 5.

The cryptographic process according to the example described above can be executed in a device, for example, the PC or the server which includes the data processing unit configured with the CPU or the like for executing the software (program) defining the cryptographic process algorithm, and the memory for storing the programs or the data.

Figure 33:
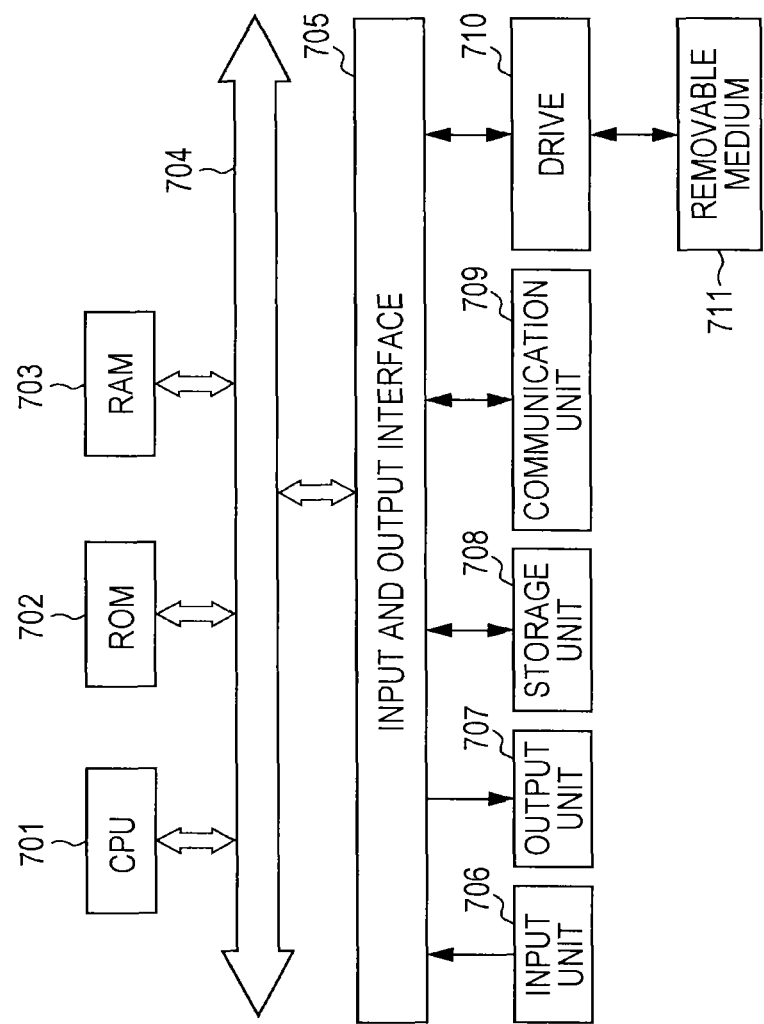
FIG. 33 is a diagram showing an apparatus configuration example for executing a cryptographic process.

FIG. 33 shows a configuration example of the information processing apparatus or the cryptographic processing apparatus which executes the cryptographic process of the present disclosure.

A central processing unit (CPU) 701 functions as the data processing unit which executes various processes according to programs stored in a read only memory (ROM) 702 or a storage unit 708. For example, the CPU executes the process according to the sequences described above.

A random access memory (RAM) 703 stores the program executed by the CPU 701 or the data. For example, the program defining the cryptographic process sequence described above is stored therein. The RAM also includes the registers storing the data to be used in each process described above, and the memory area used as the work area.

The CPU 701, the ROM 702, and the RAM 703 are connected to each other through a bus 704.

The CPU 701 is connected to an input and output interface 705 through the bus 704, and an input unit 706 configured with various switches, a keyboard, a mouse, or a microphone and an output unit 707 configured with a display or a speaker are connected to the input and output interface 705. The CPU 701 executes various processes in accordance with commands input from the input unit 706, and outputs the process results to the output unit 707, for example.

The storage unit 708 connected to the input and output interface 705 is configured with a hard disk, for example, and stores the program executed by the CPU 701 or various data items. A communication unit 709 communicates with an external device through a network such as the Internet or a local area network.

For example, in a case of the server described above with reference to FIGS. 1 to 5, the communication unit 709 executes a reception process of the encrypted data from the plurality of user terminals or sensors, or a transmission process of the encrypted data with respect to the plurality of user terminals or sensors.

A drive 710 connected to the input and output interface 705 drives a removable medium 711 such as a magnetic disk, an optical disk, a magnet-optical disk, or a semiconductor memory such as a memory card, and executes recording or reading of the data.

In addition, in the example described above, mainly the encryption process of encrypting the plain text as the input data has been described, but the process of the present disclosure can also be applied to the decryption process of restoring the cryptographic text as the input data to the plain text, not only the encryption process of encrypting the plain text as the input data.

[10. Summary of Configurations of Present Disclosure]

Hereinabove, the example of the present disclosure has been described in detail with reference to the specific examples. However, a person skilled in the art can, of course, perform correction or replacement of the examples within a range not departing from the gist of the present disclosure. That is, the present invention has been described with the examples, and the examples are not intended to limit the invention. In order to determine the gist of the present disclosure, it is necessary to refer to the claims.

In addition, in the decryption process according to one example of the present disclosure, the process is performed by the operation or movement process of the bit slice expression block unit stored in a register, and it is possible to perform the process of the mass data at a high speed. In detail, in a case where a cryptographic algorithm [Piccolo (key length of 80 bits)] is executed in an Intel Core i7 870 processor, a high speed of 5.59 cycles/byte is achieved.

In addition, in the examples described above, mainly the execution process example of the cryptographic algorithm [Piccolo (key length of 80 bits) has been described, but the process of the present disclosure can also be applied to the other algorithm. For example, in a case where a cryptographic algorithm [PRESENT (key length of 80 bits)] is executed, a high speed of 11.06 cycles/byte is achieved.

Particularly, the speed of Piccolo exceeds 6.92 cycles/byte, which is a speed record of Advanced Encryption Standard (AES) in the same platform (Intel Core i7 920) which is known in the related art.

In addition, since S-box is calculated by a logic operation without referring to a table in bit slice installation according to one example of the present disclosure, it is possible to increase durability with respect to the side channel attack such as a cache attack or a cross-virtual machine attack. Further, regarding the speed-up of the cryptographic process in the software in the cloud computing process, the cryptographic process can be completed with the smaller number of cycles, and this results in a decrease of power consumption of the cloud or a data center.

In addition, the technology disclosed in the present specification can have the following configurations.

(1) An information processing apparatus including:
a data processing unit which executes a data process according to a program defining a cryptographic process sequence,
in which the data processing unit, according to the program, executes
a data conversion process of generating bit slice expression data by performing a bit slice process with respect to a plurality of plain text data items which are encryption process targets,
a key conversion process of generating a bit slice expression key by performing a bit slice process with respect to each cryptographic key of the plurality of plain text data items,
a key scheduling process of inputting the bit slice expression key to generate a whitening key and a round key for each round to be used in the cryptographic process,
a cryptographic process in which the whitening key and the round key are applied with respect to the bit slice expression data, and
a reverse data conversion process of generating encrypted data corresponding to the plurality of plain text data items, by performing reverse conversion of the bit slice process with respect to the result of the cryptographic process, and
executes a cryptographic process according to a cryptographic algorithm Piccolo by using an operation process and a movement process of a bit slice expression data block unit configured with the same orders of bits or bits at every n bits of each plain text data configuring the bit slice expression data in the cryptographic process, and herein n is a power of 2.

(2) The information processing apparatus according to (1), in which the data processing unit
executes a process of storing a bit slice expression data block configured with the plain text data in registers as a processing unit, in the data conversion process,
executes a process of storing a bit slice expression key block configured with the same orders of bits or bits at every n bits of each cryptographic key configuring the bit slice expression key, in the register as a processing unit, in the key conversion process, and herein n is a power of 2, and
executes the cryptographic process using an operation process and a movement process of the block unit using the bit slice expression data block and the bit slice expression key block stored in the registers as a unit, in the cryptographic process.

(3) The information processing apparatus according to (1) or (2),
in which the data processing unit changes an aspect of a linear conversion process of F functions of each round depending on the round number in the cryptographic process.

(4) The information processing apparatus according to any one of (1) to (3),
in which the data processing unit executes a cryptographic process of setting a round keys to be input in each round to be different from setting defined in the cryptographic algorithm Piccolo, in the cryptographic process.

(5) The information processing apparatus according to any one of (1) to (4),
in which the data processing unit
executes a process of dispersing and storing a bit slice expression data block configured with the plain text data in a plurality of registers as a processing unit, in the data conversion process, and
performs the cryptographic process by executing an operation process between the plurality of registers with respect to the bit slice expression data block stored in the plurality of registers and a shifting and shuffling process of each register storage block, in the cryptographic process.

(6) The information processing apparatus according to (5),
in which the data processing unit further executes an unpacking process of storing a block selected from the storage blocks of the plurality of registers in one register again, in the cryptographic process.

(7) The information processing apparatus according to (5) or (6),
in which the data processing unit executes an exclusive-OR operation (XOR) with the whitening key or the round key in the register unit configuring the plurality of registers for storing the bit slice expression data blocks, in the cryptographic process.

(8) The information processing apparatus according to any one of (3) to (7),
in which the data processing unit executes a nonlinear conversion process (Sbox) defined in the cryptographic process sequence, by executing an operation according to a predetermined logical command example with respect to the bit slice expression blocks stored in the plurality of registers, in the cryptographic process.

(9) An information processing apparatus including:
a data processing unit which executes a data process according to a program defining a decryption process sequence,
in which the data processing unit, according to the program, executes
a data conversion process of generating bit slice expression data by performing a bit slice process with respect to the plurality of encrypted data items which are decryption process targets,
a key conversion process of generating a bit slice expression key by performing a bit slice process with respect to each cryptographic key of the plurality of encrypted data items, a key scheduling process of inputting the bit slice expression key to generate a whitening key and a round key for each round to be used in the decryption process, a decryption process in which the whitening key and the round key are applied with respect to the bit slice expression data, and a reverse data conversion process of generating a plurality of plain text data items corresponding to the plurality of encrypted data items, by performing reverse conversion of the bit slice process with respect to the result of the decryption process, and executes a decryption process according to a cryptographic algorithm Piccolo by using an operation process and a movement process of a bit slice expression data block unit configured with the same orders of bits or bits at every n bits of each encrypted data item configuring the bit slice expression data in the decryption process, and herein n is a power of 2.

(10) The information processing apparatus according to (9), in which the data processing unit executes a process of storing a bit slice expression data block configured with the encrypted data in a register as a processing unit, in the data conversion process, executes a process of storing a bit slice expression key block configured with the same orders of bits or bits at every n bits of each cryptographic key configuring the bit slice expression key, in the register as a processing unit, in the key conversion process, and herein n is a power of 2, and executes a decryption process using an operation process and a movement process of the block unit using the bit slice expression data block and the bit slice expression key block stored in the register as a unit, in the decryption process.

(11) The information processing apparatus according to (9) or (10), in which the data processing unit changes an aspect of a linear conversion process of F functions of each round depending on the round number in the decryption process.

(12) The information processing apparatus according to any one of (9) to (11), in which the data processing unit executes a cryptographic process of setting a round keys to be input in each round to be different from setting defined in the cryptographic algorithm Piccolo, in the decryption process.

In addition, the method of the process executed in the apparatus and the system described above or the program for executing the process is also included in the configuration of the present disclosure.

In addition, the sequence of the processes described above in the specification can be executed by the hardware, software, or a composite configuration of both. In a case of executing the process by the software, the program in which the process sequence is recorded can be installed in the memory in the computer embedded in the dedicated hardware to be executed, or the program can be installed in the general-purpose computer which can execute various processes, to be executed. For example, the program can be recorded in a recording medium, in advance. In addition to the installation of the program from the recording medium in the computer, the program can be received through the network such as a local area network (LAN) or the Internet, and can be installed in the recording medium such as the built-in hard disk.

In addition, various processes described in the specification are not only executed in time series according to the description, but may be executed in parallel or individually according to the process ability of the apparatus for executing the processes or if needed. Further, the system in the present specification is a logical assembly configuration of the plurality of apparatuses, and is not limited to the apparatuses having each configuration in the same housing.

REFERENCE SIGNS LIST

10 CLOUD
20 SENSOR NETWORK
30 SERVER
31 CRYPTOGRAPHIC KEY
32 SENSOR ID
33 ENCRYPTED DATA
70 PLAIN TEXT DATA
80 INPUT DATA
81 CRYPTOGRAPHIC KEY
82 PLAIN TEXT DATA
90 OUTPUT DATA
91 ENCRYPTED DATA
100 INFORMATION PROCESSING APPARATUS
110 CRYPTOGRAPHIC PROCESSING UNIT
701 CPU
702 ROM
703 RAM
704 BUS
705 INPUT AND OUTPUT INTERFACE
706 INPUT UNIT
707 OUTPUT UNIT
708 STORAGE UNIT
709 COMMUNICATION UNIT
710 DRIVE
711 REMOVABLE MEDIUM

The Invention claimed is:

1. An information processing apparatus comprising:
a data processing unit which executes a data process according to a program defining a cryptographic process sequence,
wherein the data processing unit, according to the program, executes
a data conversion process of generating bit slice expression data by performing a bit slice process with respect to a plain text data which is an encryption process target,
a key conversion process of generating a bit slice expression key by performing a bit slice process with respect to each cryptographic key of the plain text data,
a key scheduling process of inputting the bit slice expression key to generate a whitening key and a round key for each round to be used in a cryptographic process,
the cryptographic process in which the whitening key and the round key are applied with respect to the bit slice expression data, and
a reverse data conversion process of generating encrypted data corresponding to the plain text data, by performing reverse conversion of the bit slice process with respect to the result of the cryptographic process, and
executes the cryptographic process according to a cryptographic algorithm Piccolo by using an operation process and a movement process of a bit slice expression data block unit configured with the same orders of bits or bits at every n bits of each plain text data configuring the bit slice expression data in the cryptographic process, and herein n is a power of 2.

2. The information processing apparatus according to claim 1,
wherein the data processing unit
executes a process of storing a bit slice expression data block configured with the plain text data in a plurality of registers as a processing unit, in the data conversion process,
executes a process of storing a bit slice expression key block configured with the same orders of bits or bits at every n bits of each cryptographic key configuring the bit slice expression key, in the plurality of registers as a processing unit, in the key conversion process, and herein n is a power of 2, and
executes the cryptographic process using an operation process and a movement process of the block unit using the bit slice expression data block and the bit slice expression key block stored in the plurality of registers as a unit, in the cryptographic process.

3. The information processing apparatus according to claim 1,
wherein the data processing unit changes an aspect of a linear conversion process of F functions of each round depending on a round number in the cryptographic process.

4. The information processing apparatus according to claim 1,
wherein the data processing unit executes a cryptographic process of setting a round keys to be input in each round to be different from setting defined in the cryptographic algorithm Piccolo, in the cryptographic process.

5. The information processing apparatus according to claim 1,
wherein the data processing unit
executes a process of dispersing and storing a bit slice expression data block configured with the plain text data in a plurality of registers as a processing unit, in the data conversion process, and
performs the cryptographic process by executing an operation process between the plurality of registers with respect to the bit slice expression data block stored in the plurality of registers and a shifting and shuffling process of each register storage block, in the cryptographic process.

6. The information processing apparatus according to claim 5,
wherein the data processing unit further executes an unpacking process of storing a block selected from storage blocks of the plurality of registers in one register again, in the cryptographic process.

7. The information processing apparatus according to claim 5,
wherein the data processing unit executes an exclusive-OR operation (XOR) with the whitening key or the round key in a register unit configuring the plurality of registers for storing a plurality of bit slice expression data blocks, in the cryptographic process.

8. The information processing apparatus according to claim 3,
wherein the data processing unit executes a nonlinear conversion process (Sbox) defined in the cryptographic process sequence, by executing an operation according to a predetermined logical command example with respect to a plurality of bit slice expression blocks stored in a plurality of registers, in the cryptographic process.

9. An information processing apparatus comprising:
a data processing unit which executes a data process according to a program defining a decryption process sequence,
wherein the data processing unit, according to the program, executes
a data conversion process of generating bit slice expression data by performing a bit slice process with respect to encrypted data which is a decryption process target,
a key conversion process of generating a bit slice expression key by performing a bit slice process with respect to each cryptographic key of the encrypted data,
a key scheduling process of inputting the bit slice expression key to generate a whitening key and a round key for each round to be used in the decryption process,
a decryption process in which the whitening key and the round key are applied with respect to the bit slice expression data, and
a reverse data conversion process of generating plain text data corresponding to the encrypted data, by performing reverse conversion of the bit slice process with respect to the result of the decryption process, and
executes the decryption process according to a cryptographic algorithm Piccolo by using an operation process and a movement process of a bit slice expression data block unit configured with the same orders of bits or bits at every n bits of each encrypted data item configuring the bit slice expression data in the decryption process, and herein n is a power of 2.

10. The information processing apparatus according to claim 9,
wherein the data processing unit
executes a process of storing a bit slice expression data block configured with the encrypted data in a register as a processing unit, in the data conversion process,
executes a process of storing a bit slice expression key block configured with the same orders of bits or bits at every n bits of each cryptographic key configuring the bit slice expression key, in the register as a processing unit, in the key conversion process, and herein n is a power of 2, and
executes a decryption process using an operation process and a movement process of the block unit using the bit slice expression data block and the bit slice expression key block stored in the register as a unit, in the decryption process.

11. The information processing apparatus according to claim 9,
wherein the data processing unit changes an aspect of a linear conversion process of F functions of each round depending on a round number in the decryption process.

12. The information processing apparatus according to claim 9,
wherein the data processing unit executes a cryptographic process of setting a round keys to be input in each round to be different from setting defined in the cryptographic algorithm Piccolo, in the decryption process.

13. An information processing method which is a cryptographic process executed in an information processing apparatus, the method causing a data processing unit of the information processing apparatus, according to a program defining a cryptographic process sequence, to execute:

a data conversion process of generating bit slice expression data by performing a bit slice process with respect to a plain text data which is an encryption process target, a key conversion process of generating a bit slice expression key by performing a bit slice process with respect to each cryptographic key of the plain text data, a key scheduling process of inputting the bit slice expression key to generate a whitening key and a round key for each round to be used in the cryptographic process, the cryptographic process in which the whitening key and the round key are applied with respect to the bit slice expression data, and a reverse data conversion process of generating encrypted data corresponding to the plain text data, by performing reverse conversion of the bit slice process with respect to the result of the cryptographic process, wherein the data processing unit executes the cryptographic process according to a cryptographic algorithm Piccolo by using an operation process and a movement process of a bit slice expression data block unit configured with the same orders of bits or bits at every n bits of each plain text data configuring the bit slice expression data in the cryptographic process, and herein n is a power of 2.

14. An information processing method which is a decryption process executed in an information processing apparatus, the method causing a data processing unit of the information processing apparatus, according to a program defining a decryption process sequence, to execute:

a data conversion process of generating bit slice expression data by performing a bit slice process with respect to the encrypted data which is a decryption process target, a key conversion process of generating a bit slice expression key by performing a bit slice process with respect to each cryptographic key of the encrypted data, a key scheduling process of inputting the bit slice expression key to generate a whitening key and a round key for each round to be used in the decryption process, the decryption process in which the whitening key and the round key are applied with respect to the bit slice expression data, and a reverse data conversion process of generating plain text data corresponding to the encrypted data, by performing reverse conversion of the bit slice process with respect to the result of the decryption process, wherein the data processing unit executes the decryption process according to a cryptographic algorithm Piccolo by using an operation process and a movement process of a bit slice expression data block unit configured with the same orders of bits or bits at every n bits of each encrypted data item configuring the bit slice expression data in the decryption process, and herein n is a power of 2.

15. A non-transitory computer-readable storage medium having stored thereon, a set of computer-executable instructions for causing an information processing apparatus to execute a cryptographic process comprising:

causing a data processing unit of the information processing apparatus to execute a data conversion process of generating bit slice expression data by performing a bit slice process with respect to a plain text data which is an encryption process target, a key conversion process of generating a bit slice expression key by performing a bit slice process with respect to each cryptographic key of the plain text data, a key scheduling process of inputting the bit slice expression key to generate a whitening key and a round key for each round to be used in the cryptographic process, the cryptographic process in which the whitening key and the round key are applied with respect to the bit slice expression data, and a reverse data conversion process of generating encrypted data corresponding to the plain text data, by performing reverse conversion of the bit slice process with respect to the result of the cryptographic process, wherein the data processing unit executes the cryptographic process according to a cryptographic algorithm Piccolo by using an operation process and a movement process of a bit slice expression data block unit configured with the same orders of bits or bits at every n bits of each plain text data configuring the bit slice expression data in the cryptographic process, and herein n is a power of 2.

16. A non-transitory computer-readable storage medium having stored thereon, a set of computer-executable instructions for causing an information processing apparatus to execute a decryption process comprising:

causing a data processing unit of the information processing apparatus to execute a data conversion process of generating bit slice expression data by performing a bit slice process with respect to encrypted data which is a decryption process target, a key conversion process of generating a bit slice expression key by performing a bit slice process with respect to each cryptographic key of the encrypted data, a key scheduling process of inputting the bit slice expression key to generate a whitening key and a round key for each round to be used in the decryption process, the decryption process in which the whitening key and the round key are applied with respect to the bit slice expression data, and a reverse data conversion process of generating plain text data corresponding to the encrypted data, by performing reverse conversion of the bit slice process with respect to the result of the decryption process, wherein the data processing unit executes the decryption process according to a cryptographic algorithm Piccolo by using an operation process and a movement process of a bit slice expression data block unit configured with the same orders of bits or bits at every n bits of each encrypted data item configuring the bit slice expression data in the decryption process, and herein n is a power of 2.

* * * * *